(12) United States Patent
Stanley et al.

(10) Patent No.: US 9,815,258 B2
(45) Date of Patent: Nov. 14, 2017

(54) FLEXIBLE CONTAINERS

(71) Applicant: The Procter & Gamble Company, Cincinnati, OH (US)

(72) Inventors: Scott Kendyl Stanley, Mason, OH (US); Kenneth Stephen McGuire, Montgomery, OH (US); Lee Mathew Arent, Fairfield, OH (US); Jun You, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/888,679

(22) Filed: May 7, 2013

(65) Prior Publication Data

US 2013/0292353 A1 Nov. 7, 2013

Related U.S. Application Data

(60) Provisional application No. 61/643,813, filed on May 7, 2012, provisional application No. 61/782,219, filed
(Continued)

(51) Int. Cl.
*B65D 35/00* (2006.01)
*B32B 27/08* (2006.01)
(Continued)

(52) U.S. Cl.
CPC .............. *B32B 27/08* (2013.01); *B32B 1/02* (2013.01); *B32B 7/12* (2013.01); *B32B 27/30* (2013.01); *B32B 27/306* (2013.01); *B32B 27/32* (2013.01); *B32B 27/327* (2013.01); *B32B 27/34* (2013.01); *B32B 27/36* (2013.01); *B65D 1/42* (2013.01); *B65D 21/0201* (2013.01); *B65D 25/14* (2013.01); *B65D 27/00* (2013.01); *B65D 31/00* (2013.01); *B65D 31/16* (2013.01); *B65D 33/004* (2013.01); *B65D 33/02* (2013.01); *B65D 35/10* (2013.01); *B65D 37/00* (2013.01); *B65D 75/008* (2013.01); *B65D 75/525* (2013.01); *B65D 75/54* (2013.01); *B65D 85/00* (2013.01);
(Continued)

(58) Field of Classification Search
CPC .... B65D 75/54; B65D 75/525; B65D 75/008; B32B 27/08
USPC ........................................ 222/92, 94, 95, 107
See application file for complete search history.

(56) References Cited

U.S. PATENT DOCUMENTS 3,006,396 A 10/1961 Cushman
3,171,559 A 3/1965 Ferree
(Continued)

FOREIGN PATENT DOCUMENTS

CN 1640777 7/2005
CN 201272533 Y 7/2009
(Continued)

OTHER PUBLICATIONS

PCT International Search Report and Written Opinion for PCT/US2013/039800, dated Aug. 12, 2013.
(Continued)

*Primary Examiner* — Patrick M Buechner
*Assistant Examiner* — Jeremy W Carroll
(74) *Attorney, Agent, or Firm* — Charles R Ware; Jeffrey V Bamber

(57) ABSTRACT

Non-durable self-supporting flexible containers.

18 Claims, 39 Drawing Sheets

Related U.S. Application Data on Mar. 14, 2013, provisional application No. 61/643,823, filed on May 7, 2012, provisional application No. 61/782,757, filed on Mar. 14, 2013, provisional application No. 61/676,042, filed on Jul. 26, 2012, provisional application No. 61/727,961, filed on Nov. 19, 2012, provisional application No. 61/782,859, filed on Mar. 14, 2013, provisional application No. 61/680,045, filed on Aug. 6, 2012, provisional application No. 61/782,951, filed on Mar. 14, 2013, provisional application No. 61/780,039, filed on Mar. 13, 2013, provisional application No. 61/789,135, filed on Mar. 15, 2013.

(51) Int. Cl.
| | | |
|---|---|---|
| B65D 85/00 | (2006.01) | |
| B32B 1/02 | (2006.01) | |
| B65D 27/00 | (2006.01) | |
| B65D 37/00 | (2006.01) | |
| B65D 25/14 | (2006.01) | |
| B65D 1/42 | (2006.01) | |
| B65D 21/02 | (2006.01) | |
| B65D 35/10 | (2006.01) | |
| B65D 30/00 | (2006.01) | |
| B32B 7/12 | (2006.01) | |
| B32B 27/30 | (2006.01) | |
| B32B 27/32 | (2006.01) | |
| B32B 27/34 | (2006.01) | |
| B32B 27/36 | (2006.01) | |
| B65D 75/00 | (2006.01) | |
| B65D 75/52 | (2006.01) | |
| B65D 75/54 | (2006.01) | |
| B65D 33/00 | (2006.01) | |
| B65D 30/10 | (2006.01) | |
| B65D 33/02 | (2006.01) | |
| B65D 75/58 | (2006.01) | |
| B65D 75/20 | (2006.01) | |
| B65D 75/56 | (2006.01) | |

(52) U.S. Cl.
CPC ....... B32B 2250/24 (2013.01); B32B 2255/10 (2013.01); B32B 2270/00 (2013.01); B32B 2307/31 (2013.01); B32B 2307/7242 (2013.01); B32B 2307/7244 (2013.01); B32B 2307/7246 (2013.01); B32B 2439/40 (2013.01); B32B 2439/70 (2013.01); B65D 75/20 (2013.01); B65D 75/566 (2013.01); B65D 75/5866 (2013.01); B65D 75/5877 (2013.01); B65D 75/5883 (2013.01); Y10T 428/24942 (2015.01); Y10T 428/31746 (2015.04); Y10T 428/31797 (2015.04); Y10T 428/31913 (2015.04)

(56) References Cited

U.S. PATENT DOCUMENTS

| | | |
|---|---|---|
| 3,730,240 A | 5/1973 | Presnick |
| 3,742,994 A | 7/1973 | Pensak |
| 3,930,286 A | 1/1976 | McGowen |
| 4,044,867 A | 8/1977 | Fisher |
| 4,189,456 A | 2/1980 | Rausing |
| 4,384,603 A | 5/1983 | Tyrer et al. |
| 4,503,558 A | 3/1985 | Lief et al. |
| 4,615,926 A | 10/1986 | Hsu et al. |
| 4,700,531 A | 10/1987 | Hsu et al. |
| 4,700,871 A | 10/1987 | Matsuo |
| 4,704,314 A | 11/1987 | Hsu et al. |
| 4,854,481 A | 8/1989 | Bohl |
| 4,898,306 A | 2/1990 | Pardes |
| 4,918,904 A | 4/1990 | Pharo |
| 4,949,530 A * | 8/1990 | Pharo ............... 53/449 |
| 4,978,025 A | 12/1990 | Fougeres |
| 4,988,016 A | 1/1991 | Hawkins et al. |
| 4,997,107 A | 3/1991 | Snyder |
| 5,137,154 A | 8/1992 | Cohen |
| 5,174,458 A | 12/1992 | Segati |
| 5,261,881 A | 11/1993 | Riner |
| 5,263,587 A | 11/1993 | Elkin et al. |
| 5,427,830 A | 6/1995 | Pharo |
| 5,469,966 A | 11/1995 | Boyer |
| 5,489,464 A | 2/1996 | Bjorck |
| 5,622,283 A | 4/1997 | Morrison |
| 5,692,833 A | 12/1997 | DeLuca |
| 5,791,485 A | 8/1998 | Carbonneau |
| 5,823,391 A * | 10/1998 | Klauke et al. ............. 222/94 |
| 5,880,241 A | 3/1999 | Brookhart et al. |
| 5,950,833 A | 9/1999 | James |
| 5,960,975 A | 10/1999 | Lennartsson |
| 5,971,208 A | 10/1999 | Kennedy |
| 6,015,235 A | 1/2000 | Kraimer et al. |
| 6,176,613 B1 | 1/2001 | Chen |
| 6,206,569 B1 | 3/2001 | Kraimer et al. |
| 6,244,441 B1 | 6/2001 | Ahlgren |
| 6,244,466 B1 | 6/2001 | Naslund |
| 6,471,402 B1 | 10/2002 | Burns |
| 6,488,146 B1 | 12/2002 | Ootsikas |
| 6,520,332 B1 | 2/2003 | Barmore et al. |
| 6,581,972 B2 | 6/2003 | Nojima |
| 6,607,097 B2 | 8/2003 | Savage |
| 6,619,505 B1 * | 9/2003 | Decottignies ....... B05B 11/0043 222/105 |
| 6,673,301 B2 | 1/2004 | Cargile |
| 6,682,825 B1 | 1/2004 | Kennedy et al. |
| 6,913,803 B2 | 7/2005 | Peper |
| 6,978,893 B2 | 12/2005 | Peper |
| 6,982,113 B2 | 1/2006 | Kannankeril et al. |
| 7,021,505 B2 | 4/2006 | Franczyk |
| 7,056,593 B2 | 6/2006 | Kennedy et al. |
| 7,168,566 B2 | 1/2007 | Anderson et al. |
| 7,168,567 B2 | 1/2007 | Peper et al. |
| 7,207,717 B2 | 4/2007 | Steele |
| 7,344,038 B2 | 3/2008 | Elansary |
| 7,494,279 B2 | 2/2009 | Marquet et al. |
| 7,585,528 B2 * | 9/2009 | Ferri ............... B65D 81/052 206/522 |
| 7,722,254 B2 | 5/2010 | Murray |
| 7,883,268 B2 | 2/2011 | Steele |
| 8,028,502 B2 | 10/2011 | Murray |
| 8,181,428 B2 | 5/2012 | Gustafsson |
| 8,206,033 B2 | 6/2012 | Sato |
| 8,336,790 B2 | 12/2012 | Kolins |
| 8,464,499 B2 | 6/2013 | Asp |
| 8,500,330 B2 | 8/2013 | Nomura et al. |
| 8,661,772 B2 | 3/2014 | Yasuhira |
| 8,662,751 B2 | 3/2014 | Forss |
| 8,910,834 B2 | 12/2014 | Becker |
| 8,960,183 B2 | 2/2015 | Husson |
| 9,327,867 B2 | 5/2016 | Stanley et al. |
| 9,469,088 B2 | 10/2016 | Stanley et al. |
| 2003/0094394 A1 | 5/2003 | Anderson et al. |
| 2003/0094395 A1 | 5/2003 | Peper et al. |
| 2003/0096068 A1 | 5/2003 | Peper |
| 2003/0161999 A1 | 8/2003 | Kannankeril et al. |
| 2003/0192909 A1 | 10/2003 | Maskell |
| 2004/0035865 A1 | 2/2004 | Rosen |
| 2005/0126941 A1 | 6/2005 | Ferri et al. |
| 2005/0263426 A1 | 12/2005 | Ho |
| 2006/0021996 A1 | 2/2006 | Scott et al. |
| 2006/0113269 A1 | 6/2006 | Etesse et al. |
| 2006/0210773 A1 | 9/2006 | Kannankeril |
| 2007/0045342 A1 * | 3/2007 | Pigliacampo et al. ........ 222/129 |
| 2007/0084745 A1 | 4/2007 | Yoshifusa |
| 2007/0102316 A1 | 5/2007 | Van Der Krogt et al. |
| 2007/0181598 A1 * | 8/2007 | Cremeans et al. ............. 222/94 |
| 2007/0267378 A1 | 11/2007 | Piccinino et al. |
| 2008/0149666 A1 | 6/2008 | LaFlamme |

(56) References Cited

U.S. PATENT DOCUMENTS

| | | |
|---|---|---|
| 2008/0193055 A1 | 8/2008 | Cnen et al. |
| 2008/0230424 A1 | 9/2008 | Chawla et al. |
| 2008/0245804 A1 | 10/2008 | Weinberger |
| 2008/0277310 A1 | 11/2008 | Chacon |
| 2009/0307945 A1 | 12/2009 | Bopp |
| 2010/0061664 A1 | 3/2010 | Gustafsson et al. |
| 2010/0155396 A1 | 6/2010 | Warner |
| 2010/0308062 A1 | 12/2010 | Helou |
| 2011/0039098 A1 | 2/2011 | Forloni et al. |
| 2011/0062051 A1 | 3/2011 | Miller |
| 2011/0079608 A1 | 4/2011 | Mamiye |
| 2011/0290798 A1* | 12/2011 | Corbett et al. .............. 220/62.12 |
| 2012/0033897 A1 | 2/2012 | Lahr Yoder |
| 2012/0085782 A1* | 4/2012 | Futori ........................... 222/105 |
| 2012/0085785 A1 | 4/2012 | Sand |
| 2012/0097634 A1* | 4/2012 | Riedl ............................. 215/379 |
| 2012/0187069 A1 | 7/2012 | Harris |
| 2013/0015204 A1 | 1/2013 | Gol |
| 2013/0292287 A1 | 11/2013 | Stanley et al. |
| 2013/0292353 A1 | 11/2013 | Stanley et al. |
| 2013/0292395 A1 | 11/2013 | Stanley et al. |
| 2013/0292413 A1 | 11/2013 | Stanley et al. |
| 2013/0292415 A1 | 11/2013 | Stanley et al. |
| 2013/0294711 A1* | 11/2013 | Stanley ................. B65D 85/00 383/107 |
| 2013/0337244 A1 | 12/2013 | Stanley et al. |
| 2014/0033654 A1 | 2/2014 | Stanley et al. |
| 2014/0033655 A1* | 2/2014 | Stanley ...................... B65B 1/02 53/456 |
| 2014/0250834 A1 | 9/2014 | Yoshikane et al. |
| 2015/0028057 A1 | 1/2015 | Arent et al. |
| 2015/0033671 A1* | 2/2015 | Stanley ................ B65D 75/008 53/410 |
| 2015/0034662 A1* | 2/2015 | Stanley ................ B65D 75/008 220/666 |
| 2015/0034670 A1* | 2/2015 | Stanley .............. B65D 75/5883 222/105 |
| 2015/0036950 A1* | 2/2015 | Stanley ................ B65D 75/008 383/104 |
| 2015/0121810 A1* | 5/2015 | Bourgeois ............ B65D 75/008 53/434 |
| 2015/0122373 A1* | 5/2015 | Bourgeois ............... B65B 31/04 141/12 |
| 2015/0122840 A1* | 5/2015 | Cox ...................... B65D 75/008 222/159 |
| 2015/0122841 A1* | 5/2015 | McGuire .............. B65D 75/008 222/173 |
| 2015/0122842 A1* | 5/2015 | Berg, Jr. ............... B65D 75/008 222/173 |
| 2015/0122846 A1* | 5/2015 | Stanley ................ B65D 75/008 222/206 |
| 2015/0125099 A1* | 5/2015 | Ishihara ............... B65D 75/008 383/120 |
| 2015/0125574 A1* | 5/2015 | Arent ................... B65D 75/008 426/106 |
| 2015/0126349 A1* | 5/2015 | Ishihara ............... B65D 75/008 493/194 |
| 2016/0176578 A1* | 6/2016 | Stanley ................. B65D 25/56 206/459.5 |
| 2016/0176582 A1* | 6/2016 | McGuire ................ B65D 35/02 206/277 |
| 2016/0176583 A1* | 6/2016 | Ishihara .................... B65B 3/04 53/452 |
| 2016/0176584 A1* | 6/2016 | Ishihara ................. B31B 43/00 493/243 |
| 2016/0176597 A1* | 6/2016 | Ishihara ................. B31B 29/00 493/243 |
| 2016/0221727 A1* | 8/2016 | Stanley ................. B65D 35/04 |
| 2016/0297569 A1* | 10/2016 | Berg, Jr. ................ B65D 35/02 |
| 2016/0297589 A1* | 10/2016 | You ....................... B65D 75/52 |
| 2016/0297590 A1* | 10/2016 | You ..................... B65D 75/525 |
| 2016/0297591 A1* | 10/2016 | You ..................... B65D 75/008 |
| 2016/0325518 A1* | 11/2016 | Ishihara .................. B31B 37/00 |
| 2016/0362228 A1* | 12/2016 | McGuire ............ B65D 75/5872 |
| 2017/0001782 A1* | 1/2017 | Arent ..................... B65D 35/04 |

FOREIGN PATENT DOCUMENTS

| | | | |
|---|---|---|---|
| DE | 20 2005 016704 | 7/2006 | |
| DE | 102005002301 | 7/2006 | |
| DE | 102005002301 A1 | 7/2006 | |
| DE | 202010001261 | 5/2010 | |
| EP | 0 654 418 A1 | 5/1995 | |
| EP | 1964785 A2 | 9/2008 | |
| EP | 2631195 A1 * | 8/2013 | ........... B65D 75/008 |
| FR | 2638715 | 10/1990 | |
| FR | 2801287 | 4/2002 | |
| JP | H07-232744 | 9/1995 | |
| JP | A-H107159 | 1/1998 | |
| JP | 2001-270533 | 10/2001 | |
| JP | 2001-270533 A1 | 10/2001 | |
| JP | 2005-153980 | 6/2005 | |
| JP | 2005343492 | 12/2005 | |
| JP | 2006027697 | 2/2006 | |
| JP | 2006044714 | 2/2006 | |
| JP | 2006-240651 | 9/2006 | |
| JP | 2006240651 | 9/2006 | |
| JP | 2009-184690 A | 8/2009 | |
| JP | 2009184690 | 8/2009 | |
| JP | 4639677 | 2/2011 | |
| JP | 2012025394 | 2/2012 | |
| RU | 2038815 | 7/1995 | |
| WO | 96/01775 A1 | 1/1996 | |
| WO | WO9601775 | 1/1996 | |
| WO | WO02085729 | 10/2002 | |
| WO | WO03051740 | 6/2003 | |
| WO | 2005/063589 A1 | 7/2005 | |
| WO | WO2005063589 | 7/2005 | |
| WO | 2005/108065 A1 | 11/2005 | |
| WO | 2008/064508 A1 | 6/2008 | |
| WO | WO2008064508 | 6/2008 | |
| WO | 2012/062806 A1 | 3/2012 | |
| WO | WO2012073004 | 6/2012 | |
| WO | WO2013124201 | 8/2013 | |

OTHER PUBLICATIONS

PCT International Search Report and Written Opinion for PCT/US2013/039801, dated Aug. 12, 2013.

PCT International Search Report and Written Opinion for PCT/US2013/039809, dated Aug. 8, 2013.

PCT International Search Report and Written Opinion for PCT/US2013/039811, dated Aug. 14, 2013

PCT International Search Report and Written Opinion for PCT/US2013/039807, dated Aug. 12, 2013.

PCT International Search Report and Written Opinion for PCT/US2013/053204, dated Nov. 13, 2013.

PCT International Search Report and Written Opinion for PCT/US2013/053205, dated Nov. 22, 2013.

PCT International Search Report and Written Opinion for PCT/US2013/039804, dated Aug. 12, 2013.

PCT International Search Report and Written Opinion for PCT/US2013/039802, dated Aug. 12, 2013.

"The Rigidified Standing Pouch—A Concept for Flexible Packaging", Phillip John Campbell, A Thesis Written in Partial Fulfillment of the Requirements for the Degree of Master of Industrial Design, North Carolina State University School of Design Raleigh, 1993, pp. 1-35.

All Office Actions (dated Jun. 20, 2014, Jan. 30, 2015, Mar. 11, 2016, Feb. 21, 2017), U.S. Appl. No. 13/888,963, date of filing May 7, 2013, (P&G 12465M).

All Office Actions (dated Mar. 12, 2015, Nov. 27, 2015, Aug. 17, 2016, Dec. 28, 2016, May 30, 2017), U.S. Appl. No. 13/888,756, date of filing May 7, 2013, (P&G 12559M).

All Office Actions (dated Dec. 31, 2015, Sep. 9, 2016), U.S. Appl. No. 14/448,396, date of filing Jul. 31, 2014, (P&G 13016).

(56) References Cited

OTHER PUBLICATIONS

All Office Actions (dated Jun. 20, 2014, Jan. 30, 2015, Mar. 11, 2016, Feb. 21, 2017), U.S. Appl. No. 13/888,963, date of filing May 7, 2013, (P&G 13019).
U.S. Appl. No. 29/526,409, filed May 8, 2015, McGuire et al.
U.S. Appl. No. 15/094,118, filed Apr. 8, 2016, Stanley et al.
U.S. Appl. No. 15/466,898, filed Mar. 27, 2017, Arent et al.
U.S. Appl. No. 15/466,901, filed Mar. 27, 2017, McGuire et al.

* cited by examiner

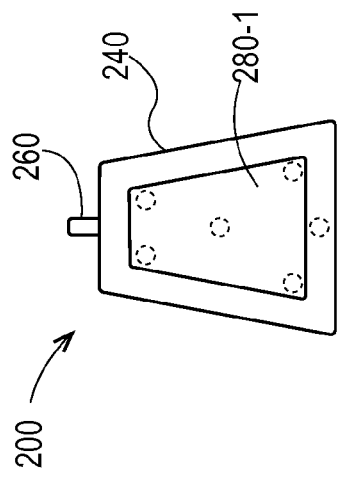
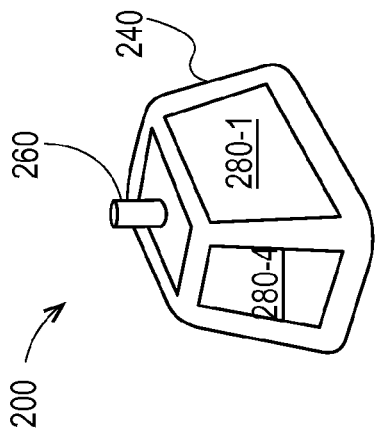
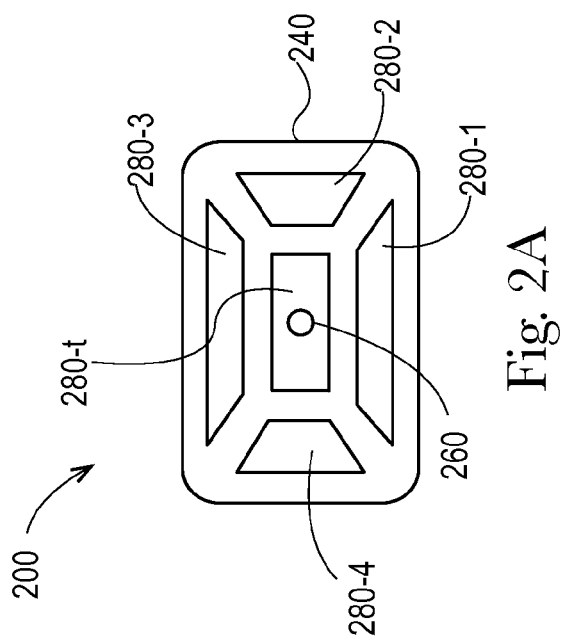
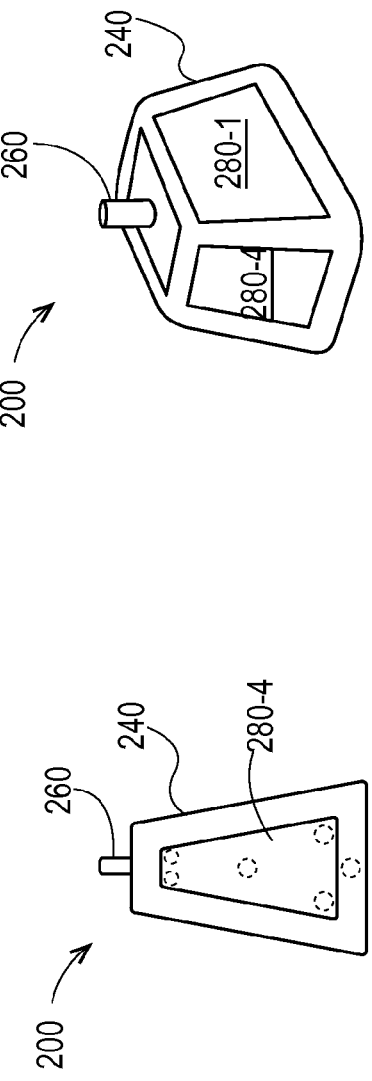

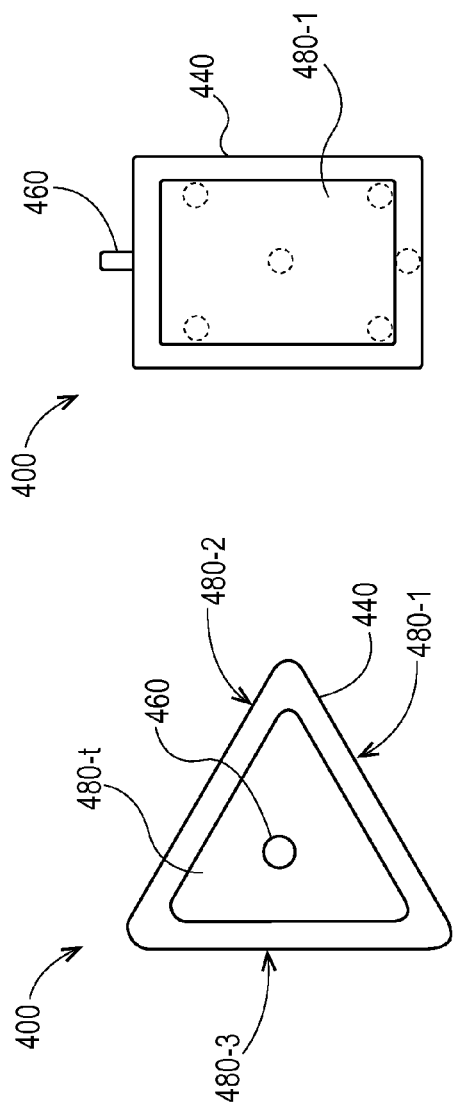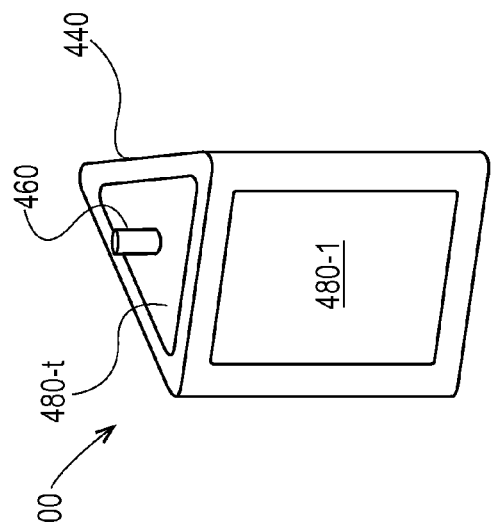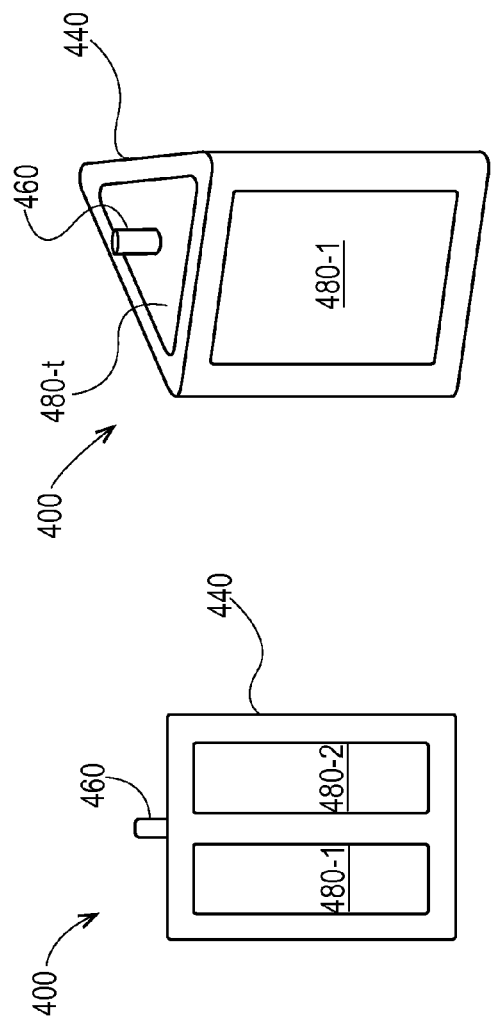

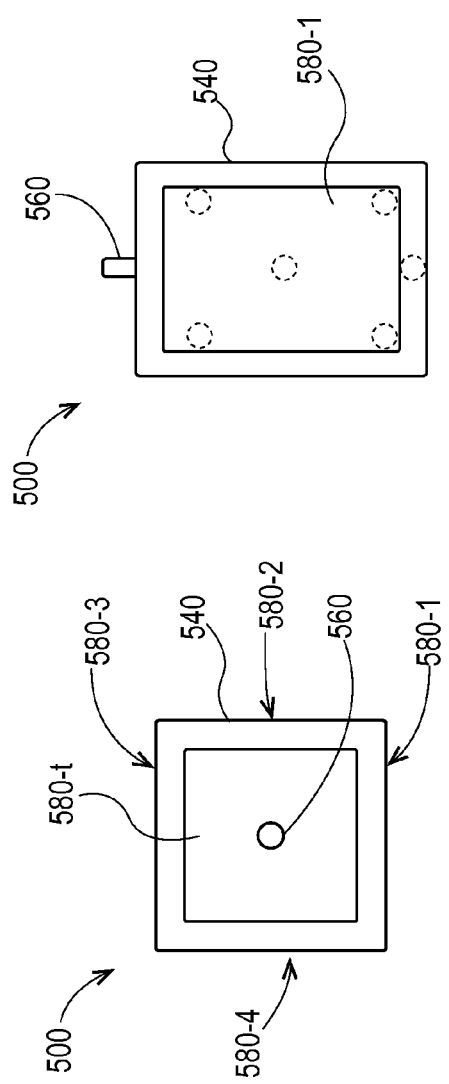
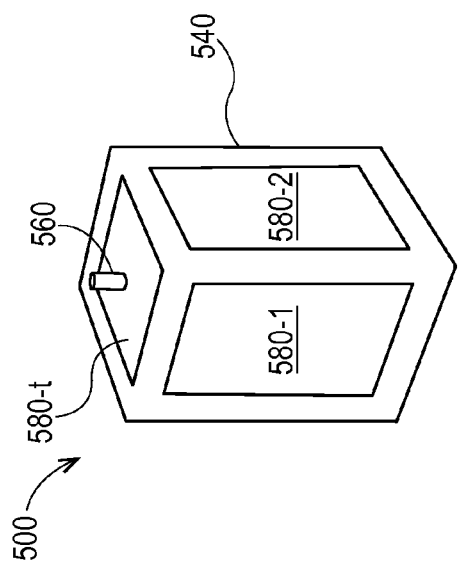
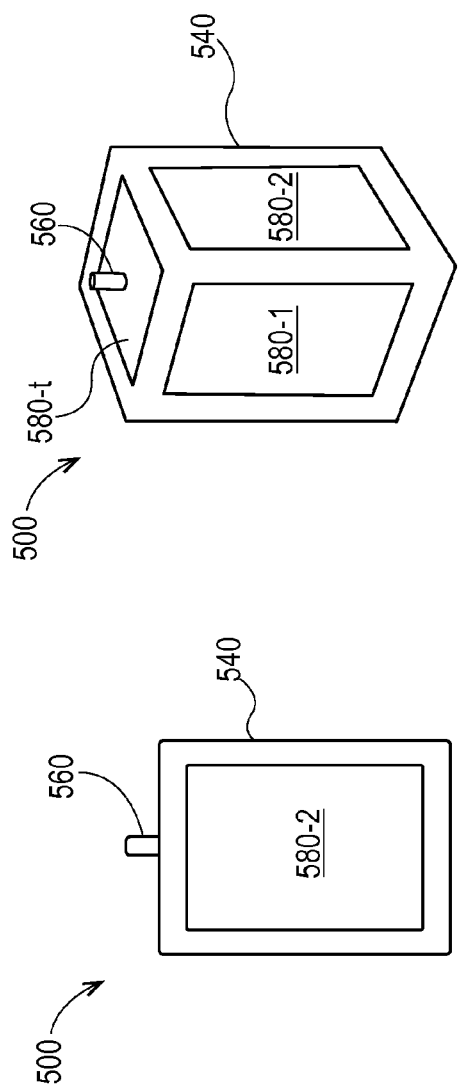

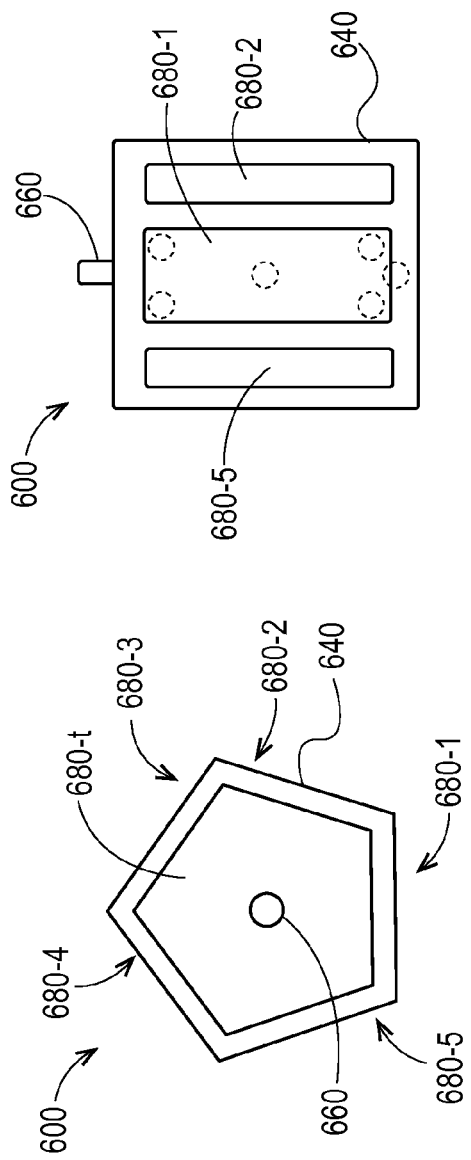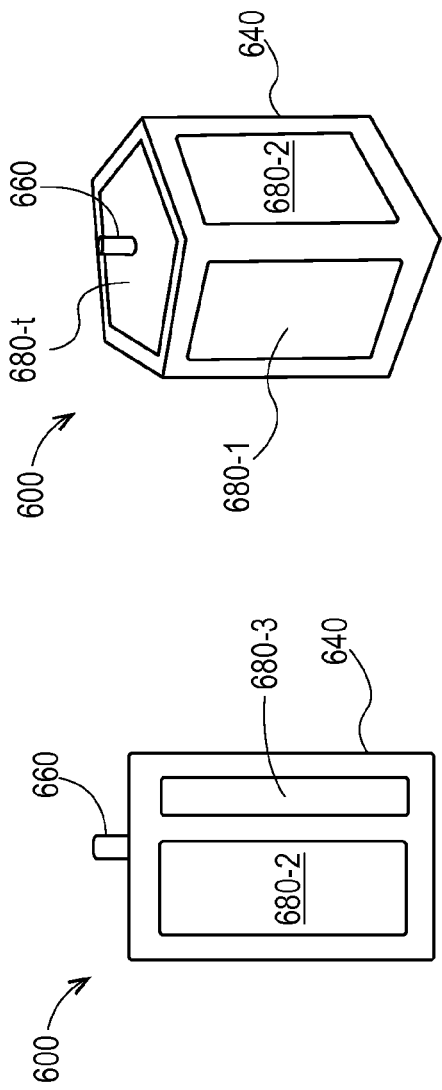

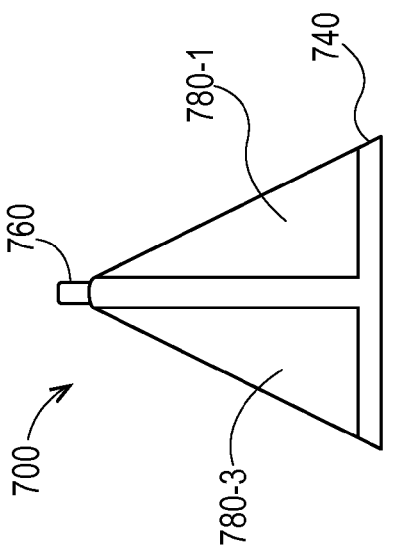
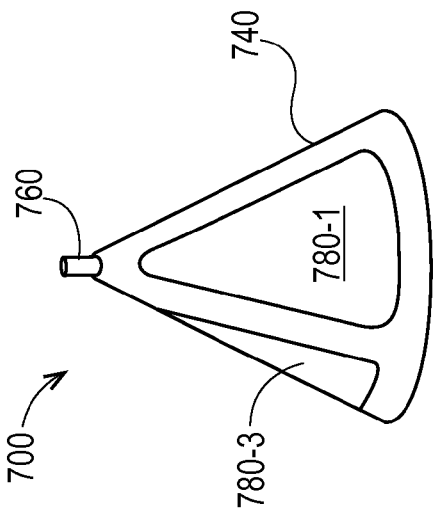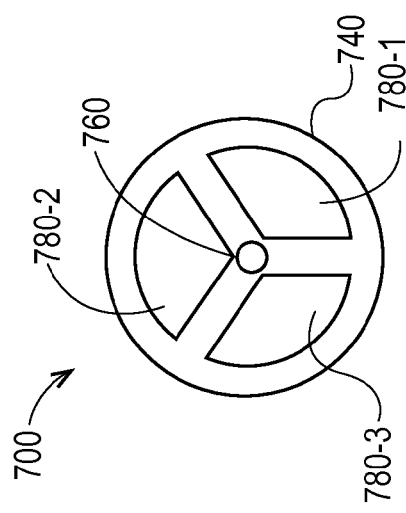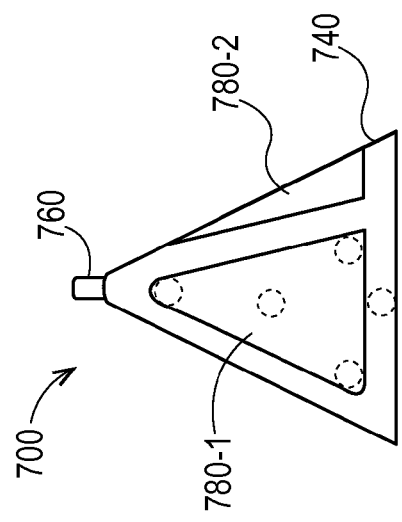

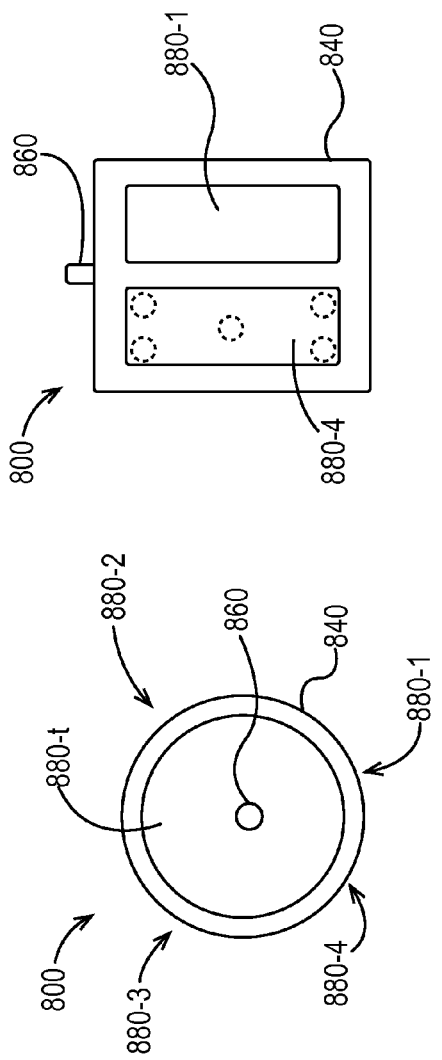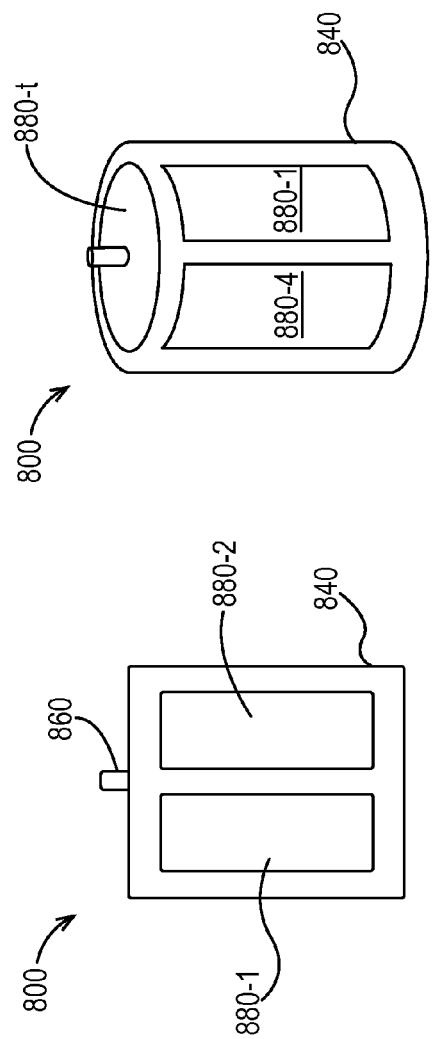

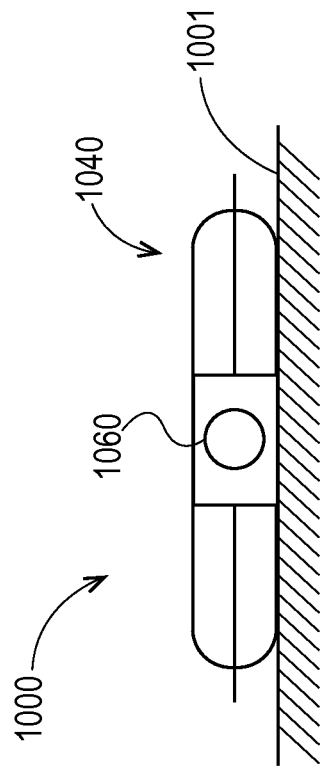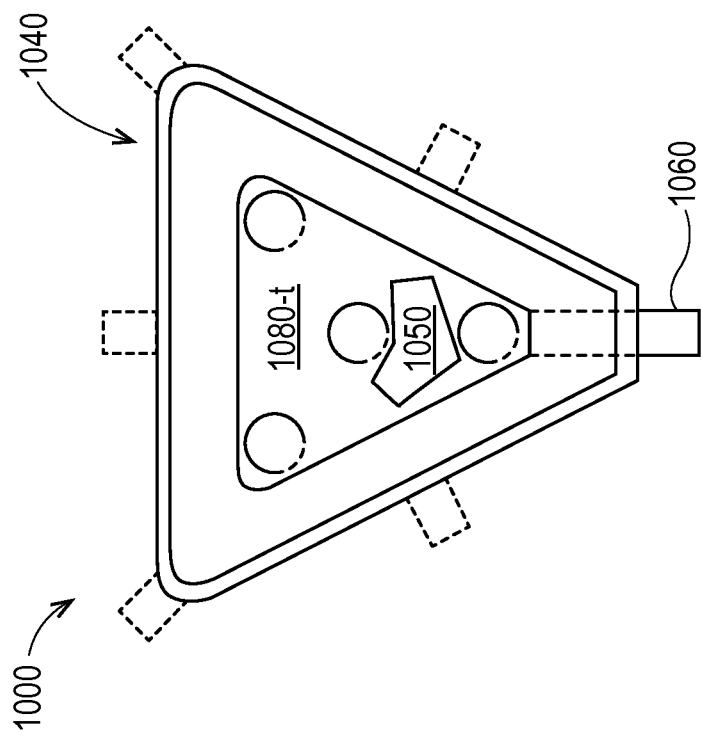

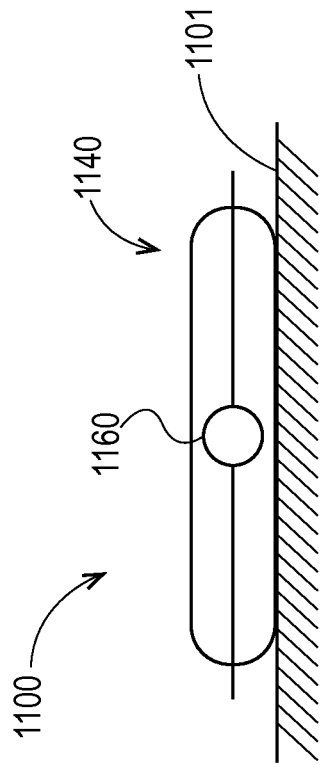
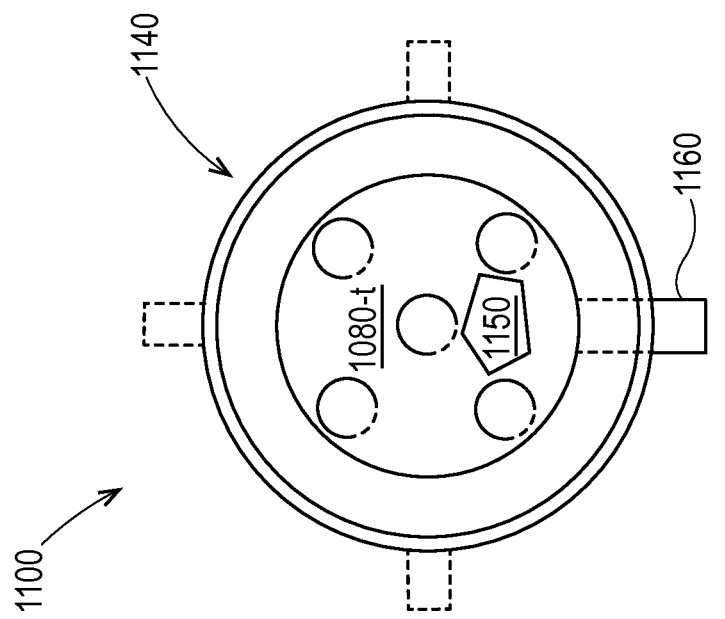
Fig 11B
Fig 11A

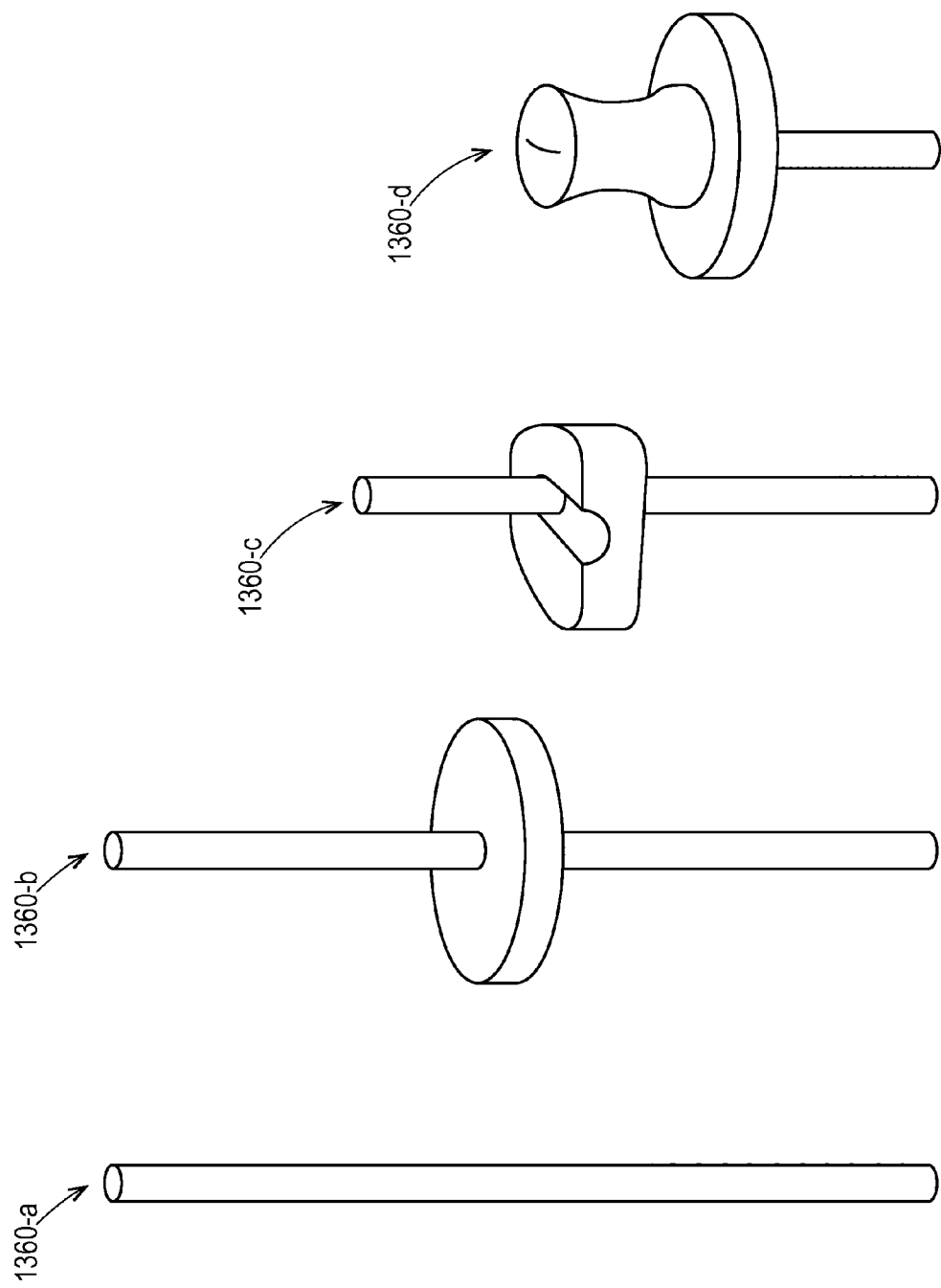

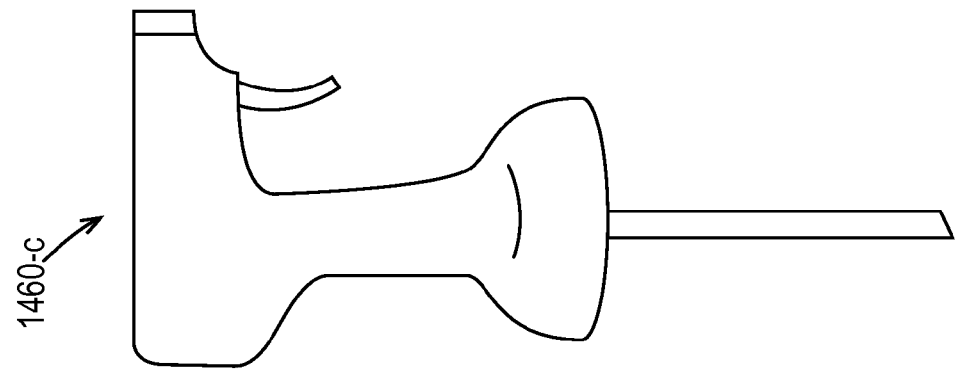
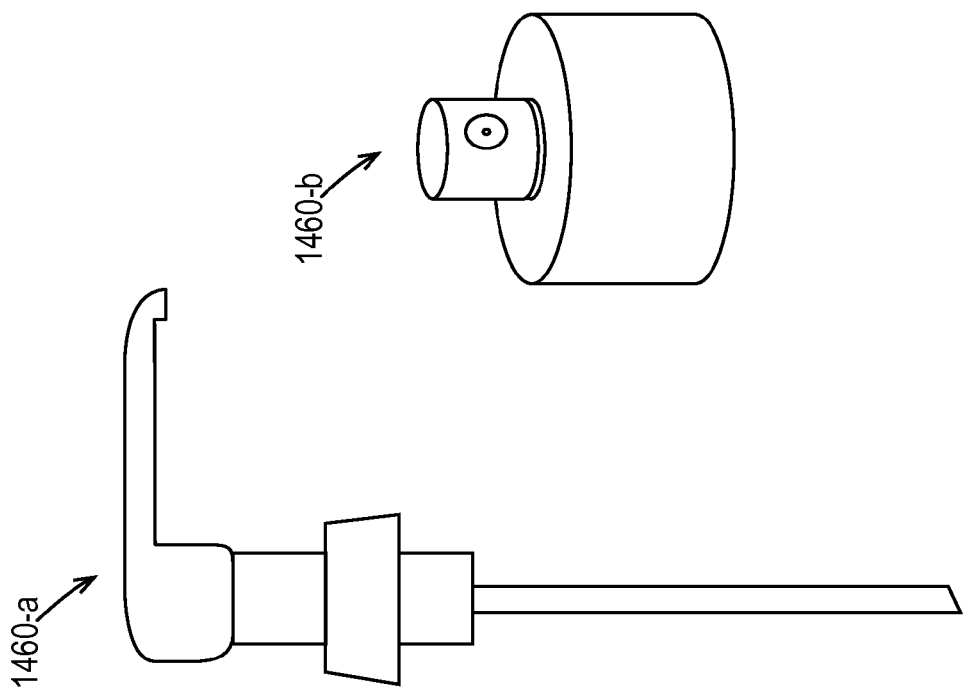
Fig 14A  Fig 14B  Fig 14C

FLEXIBLE CONTAINERS

FIELD

The present disclosure relates in general to containers, and in particular, to containers made from flexible material.

BACKGROUND

Fluent products include liquid products and/or pourable solid products. In various embodiments, a container can be used to receive, contain, and dispense one or more fluent products. And, in various embodiments, a container can be used to receive, contain, and/or dispense individual articles or separately packaged portions of a product. A container can include one or more product volumes. A product volume can be configured to be filled with one or more fluent products. A container receives a fluent product when its product volume is filled. Once filled to a desired volume, a container can be configured to contain the fluent product in its product volume, until the fluent product is dispensed. A container contains a fluent product by providing a barrier around the fluent product. The barrier prevents the fluent product from escaping the product volume. The barrier can also protect the fluent product from the environment outside of the container. A filled product volume is typically closed off by a cap or a seal. A container can be configured to dispense one or more fluent products contained in its product volume(s). Once dispensed, an end user can consume, apply, or otherwise use the fluent product(s), as appropriate. In various embodiments, a container may be configured to be refilled and reused or a container may be configured to be disposed of after a single fill or even after a single use. A container should be configured with sufficient structural integrity, such that it can receive, contain, and dispense its fluent product(s), as intended, without failure.

A container for fluent product(s) can be handled, displayed for sale, and put into use. A container can be handled in many different ways as it is made, filled, decorated, packaged, shipped, and unpacked. A container can experience a wide range of external forces and environmental conditions as it is handled by machines and people, moved by equipment and vehicles, and contacted by other containers and various packaging materials. A container for fluent product(s) should be configured with sufficient structural integrity, such that it can be handled in any of these ways, or in any other way known in the art, as intended, without failure.

A container can also be displayed for sale in many different ways as it is offered for purchase. A container can be offered for sale as an individual article of commerce or packaged with one or more other containers or products, which together form an article of commerce. A container can be offered for sale as a primary package with or without a secondary package. A container can be decorated to display characters, graphics, branding, and/or other visual elements when the container is displayed for sale. A container can be configured to be displayed for sale while laying down or standing up on a store shelf, while presented in a merchandising display, while hanging on a display hanger, or while loaded into a display rack or a vending machine. A container for fluent product(s) should be configured with a structure that allows it to be displayed in any of these ways, or in any other way known in the art, as intended, without failure.

A container can also be put into use in many different ways, by its end user. A container can be configured to be held and/or gripped by an end user, so a container should be appropriately sized and shaped for human hands; and for this purpose, a container can include useful structural features such as a handle and/or a gripping surface. A container can be stored while laying down or standing up on a support surface, while hanging on or from a projection such as a hook or a clip, or while supported by a product holder, or (for refillable or rechargeable containers) positioned in a refilling or recharging station. A container can be configured to dispense fluent product(s) while in any of these storage positions or while being held by the user. A container can be configured to dispense fluent product(s) through the use of gravity, and/or pressure, and/or a dispensing mechanism, such as a pump, or a straw, or through the use of other kinds of dispensers known in the art. Some containers can be configured to be filled and/or refilled by a seller (e.g. a merchant or retailer) or by an end user. A container for fluent product(s) should be configured with a structure that allows it to be put to use in any of these ways, or in any other way known in the art, as intended, without failure. A container can also be configured to be disposed of by the end user, as waste and/or recyclable material, in various ways.

One conventional type of container for fluent products is a rigid container made from solid material(s). Examples of conventional rigid containers include molded plastic bottles, glass jars, metal cans, cardboard boxes, etc. These conventional rigid containers are well-known and generally useful; however their designs do present several notable difficulties.

First, some conventional rigid containers for fluent products can be expensive to make. Some rigid containers are made by a process shaping one or more solid materials. Other rigid containers are made with a phase change process, where container materials are heated (to soften/melt), then shaped, then cooled (to harden/solidify). Both kinds of making are energy intensive processes, which can require complex equipment.

Second, some conventional rigid containers for fluent products can require significant amounts of material. Rigid containers that are designed to stand up on a support surface require solid walls that are thick enough to support the containers when they are filled. This can require significant amounts of material, which adds to the cost of the containers and can contribute to difficulties with their disposal.

Third, some conventional rigid containers for fluent products can be difficult to decorate. The sizes, shapes, (e.g. curved surfaces) and/or materials of some rigid containers, make it difficult to print directly on their outside surfaces. Labeling requires additional materials and processing, and limits the size and shape of the decoration. Overwrapping provides larger decoration areas, but also requires additional materials and processing, often at significant expense.

Fourth, some conventional rigid containers for fluent products can be prone to certain kinds of damage. If a rigid container is pushed against a rough surface, then the container can become scuffed, which may obscure printing on the container. If a rigid container is pressed against a hard object, then the container can become dented, which may look unsightly. And if a rigid container is dropped, then the container can rupture, which may cause its fluent product to be lost.

Fifth, some fluent products in conventional rigid containers can be difficult to dispense. When an end user squeezes a rigid container to dispense its fluent product, the end user must overcome the resistance of the rigid sides, to deform the container. Some users may lack the hand strength to easily overcome that resistance; these users may dispense less than their desired amount of fluent product. Other users may need to apply so much of their hand strength, that they cannot easily control how much they deform the container; these users may dispense more than their desired amount of fluent product.

SUMMARY

The present disclosure describes various embodiments of containers made from flexible material. Because these containers are made from flexible material, these containers can be less expensive to make, can use less material, and can be easier to decorate, when compared with conventional rigid containers. First, these containers can be less expensive to make, because the conversion of flexible materials (from sheet form to finished goods) generally requires less energy and complexity, than formation of rigid materials (from bulk form to finished goods). Second, these containers can use less material, because they are configured with novel support structures that do not require the use of the thick solid walls used in conventional rigid containers. Third, these flexible containers can be easier to print and/or decorate, because they are made from flexible materials, and flexible materials can be printed and/or decorated as conformable webs, before they are formed into containers. Fourth, these flexible containers can be less prone to scuffing, denting, and rupture, because flexible materials allow their outer surfaces to deform when contacting surfaces and objects, and then to bounce back. Fifth, fluent products in these flexible containers can be more readily and carefully dispensed, because the sides of flexible containers can be more easily and controllably squeezed by human hands. Even though the containers of the present disclosure are made from flexible material, they can be configured with sufficient structural integrity, such that they can receive, contain, and dispense fluent product(s), as intended, without failure. Also, these containers can be configured with sufficient structural integrity, such that they can withstand external forces and environmental conditions from handling, without failure. Further, these containers can be configured with structures that allow them to be displayed and put into use, as intended, without failure.

In one embodiment, a container has a first sheet assembly portion and a second sheet assembly portion. Each of the first and second sheet assembly portions includes a flexible outer sheet and a flexible inner sheet joined to the flexible outer sheet to form at least one expanded chamber and a multi-wall panel bounded by the expanded chamber. The flexible outer sheet and the flexible inner sheet overlap one another in the multi-wall panel. Portions of the flexible outer sheets and the flexible inner sheets are spaced apart from one another to maintain an expanded chamber volume in the expanded chambers. The first and second sheet assembly portions are joined to one another to at least partially form at least one product receiving volume.

In another embodiment, a container includes a first sheet assembly portion and a second sheet assembly portion joined together to at least partially form a product receiving volume. Each of the first and second sheet assembly portions include a flexible outer sheet and a flexible inner sheet joined to the flexible outer sheet to form an expanded chamber. Portions of the flexible inner and outer sheets are spaced apart from one another to maintain an expanded chamber volume in the expanded chamber. The container also includes a product dispensing path provided between the expanded chambers of the first and second sheet assembly portions. The container further includes a reclosable opening coupled to one or more of the first and second sheet assembly portions such that the reclosable opening is in fluid communication with the product receiving volume through the product dispensing path and the reclosable opening provides selective closure of the product receiving volume.

In yet another embodiment, a container includes a first sheet assembly portion and a second sheet assembly portion. Each of the first and second sheet assembly portions include a flexible outer sheet and a flexible inner sheet joined to the flexible outer sheet to form an expanded chamber. Portions of the flexible inner and outer sheets are spaced apart from one another to maintain an expanded chamber volume in the expanded chamber. The first and second sheet assembly portions are joined to one another to at least partially form a product receiving volume. The flexible inner sheets of the first and second sheet assembly portions are positioned inside the product receiving volume. A reclosable opening is in fluid communication with the product receiving volume. The expanded chambers contact one another at a position inside the product receiving volume.

These and additional features provided by the embodiments described herein will be more fully understood in view of the following detailed description, in conjunction with the drawings.

BRIEF DESCRIPTION OF THE DRAWINGS

FIG. 2A illustrates a top view of a stand up flexible container having a structural support frame that has an overall shape like a frustum.

FIG. 2B illustrates a front view of the container of FIG. 2A.

FIG. 2C illustrates a side view of the container of FIG. 2A.

FIG. 2D illustrates an isometric view of the container of FIG. 2A.

FIG. 4A illustrates a top view of a stand up flexible container having a structural support frame that has an overall shape like a trigonal prism.

FIG. 4B illustrates a front view of the container of FIG. 4A.

FIG. 4C illustrates a side view of the container of FIG. 4A.

FIG. 4D illustrates an isometric view of the container of FIG. 4A.

FIG. 5A illustrates a top view of a stand up flexible container having a structural support frame that has an overall shape like a tetragonal prism.

FIG. 5B illustrates a front view of the container of FIG. 5A.

FIG. 5C illustrates a side view of the container of FIG. 5A.

FIG. 5D illustrates an isometric view of the container of FIG. 5A.

FIG. 6A illustrates a top view of a stand up flexible container having a structural support frame that has an overall shape like a pentagonal prism.

FIG. 6B illustrates a front view of the container of FIG. 6A.

FIG. 6C illustrates a side view of the container of FIG. 6A.

FIG. 6D illustrates an isometric view of the container of FIG. 6A.

FIG. 7A illustrates a top view of a stand up flexible container having a structural support frame that has an overall shape like a cone.

FIG. 7B illustrates a front view of the container of FIG. 7A.

FIG. 7C illustrates a side view of the container of FIG. 7A.

FIG. 7D illustrates an isometric view of the container of FIG. 7A.

FIG. 8A illustrates a top view of a stand up flexible container having a structural support frame that has an overall shape like a cylinder.

FIG. 8B illustrates a front view of the container of FIG. 8A.

FIG. 8C illustrates a side view of the container of FIG. 8A.

FIG. 8D illustrates an isometric view of the container of FIG. 8A.

FIG. 10A illustrates a top view of an embodiment of a self-supporting flexible container, having an overall shape like a triangle.

FIG. 10B illustrates an end view of the flexible container of FIG. 10A.

FIG. 11A illustrates a top view of an embodiment of a self-supporting flexible container, having an overall shape like a circle.

FIG. 11B illustrates an end view of the flexible container of FIG. 11A.

FIG. 13A illustrates an isometric view of straw dispenser.

FIG. 13B illustrates an isometric view of straw dispenser with a lid.

FIG. 13C illustrates an isometric view of flip up straw dispenser.

FIG. 13D illustrates an isometric view of straw dispenser with bite valve.

FIG. 14A illustrates an isometric view of pump type dispenser.

FIG. 14B illustrates an isometric view of pump spray type dispenser.

FIG. 14C illustrates an isometric view of trigger spray type dispenser.

DETAILED DESCRIPTION

Figure 1A:
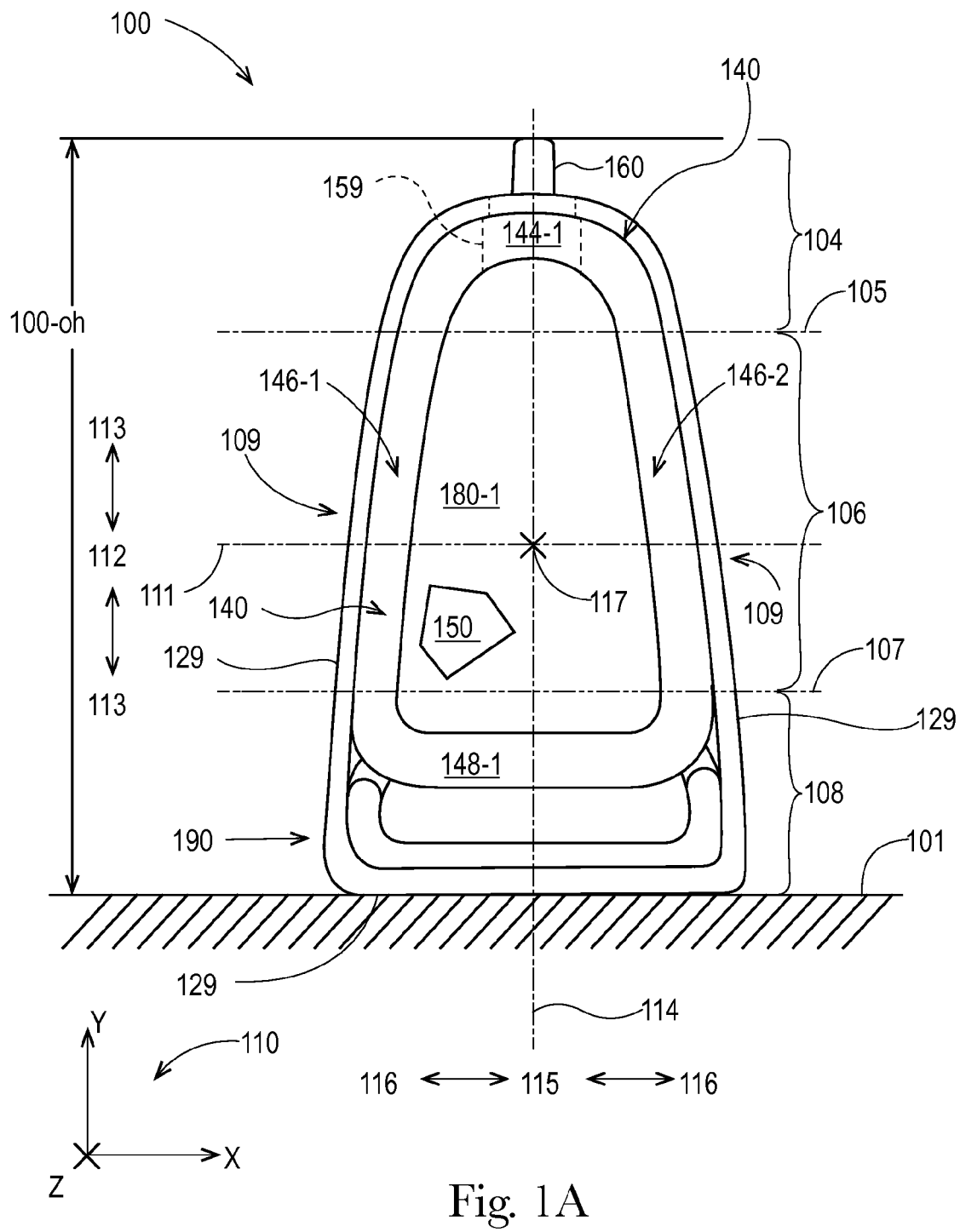
FIG. 1A illustrates a front view of an embodiment of a stand up flexible container.

The present disclosure describes various embodiments of containers made from flexible material. Because these containers are made from flexible material, these containers can be less expensive to make, can use less material, and can be easier to decorate, when compared with conventional rigid containers. First, these containers can be less expensive to make, because the conversion of flexible materials (from sheet form to finished goods) generally requires less energy and complexity, than formation of rigid materials (from bulk form to finished goods). Second, these containers can use less material, because they are configured with novel support structures that do not require the use of the thick solid walls used in conventional rigid containers. Third, these flexible containers can be easier to decorate, because their flexible materials can be easily printed before they are formed into containers. Fourth, these flexible containers can be less prone to scuffing, denting, and rupture, because flexible materials allow their outer surfaces to deform when contacting surfaces and objects, and then to bounce back. Fifth, fluent products in these flexible containers can be more readily and carefully dispensed, because the sides of flexible containers can be more easily and controllably squeezed by human hands.

Even though the containers of the present disclosure are made from flexible material, they can be configured with sufficient structural integrity, such that they can receive, contain, and dispense fluent product(s), as intended, without failure. Also, these containers can be configured with sufficient structural integrity, such that they can withstand external forces and environmental conditions from handling, without failure. Further, these containers can be configured with structures that allow them to be displayed for sale and put into use, as intended, without failure.

As used herein, the term "about" modifies a particular value, by referring to a range equal to the particular value, plus or minus twenty percent (+/−20%). For any of the embodiments of flexible containers, disclosed herein, any disclosure of a particular value, can, in various alternate embodiments, also be understood as a disclosure of a range equal to about that particular value (i.e. +/−20%).

As used herein, the term "ambient conditions" refers to a temperature within the range of 15-35 degrees Celsius and a relative humidity within the range of 35-75%.

As used herein, the term "approximately" modifies a particular value, by referring to a range equal to the particular value, plus or minus fifteen percent (+/−15%). For any of the embodiments of flexible containers, disclosed herein, any disclosure of a particular value, can, in various alternate embodiments, also be understood as a disclosure of a range equal to approximately that particular value (i.e. +/−15%).

As used herein, when referring to a sheet of material, the term "basis weight" refers to a measure of mass per area, in units of grams per square meter (gsm). For any of the embodiments of flexible containers, disclosed herein, in various embodiments, any of the flexible materials can be configured to have a basis weight of 10-1000 gsm, or any integer value for gsm from 10-1000, or within any range formed by any of these values, such as 20-800 gsm, 30-600 gsm, 40-400 gsm, or 50-200, etc.

As used herein, when referring to a flexible container, the term "bottom" refers to the portion of the container that is located in the lowermost 30% of the overall height of the container, that is, from 0-30% of the overall height of the container. As used herein, the term bottom can be further limited by modifying the term bottom with a particular percentage value, which is less than 30%. For any of the embodiments of flexible containers, disclosed herein, a reference to the bottom of the container can, in various alternate embodiments, refer to the bottom 25% (i.e. from 0-25% of the overall height), the bottom 20% (i.e. from 0-20% of the overall height), the bottom 15% (i.e. from 0-15% of the overall height), the bottom 10% (i.e. from 0-10% of the overall height), or the bottom 5% (i.e. from 0-5% of the overall height), or any integer value for percentage between 0% and 30%.

As used herein, the term "branding" refers to a visual element intended to distinguish a product from other products. Examples of branding include one or more of any of the following: trademarks, trade dress, logos, icons, and the like. For any of the embodiments of flexible containers, disclosed herein, in various embodiments, any surface of the flexible container can include one or more brandings of any size, shape, or configuration, disclosed herein or known in the art, in any combination.

As used herein, the term "character" refers to a visual element intended to convey information. Examples of characters include one or more of any of the following: letters, numbers, symbols, and the like. For any of the embodiments of flexible containers, disclosed herein, in various embodiments, any surface of the flexible container can include one or more characters of any size, shape, or configuration, disclosed herein or known in the art, in any combination.

As used herein, the term "closed" refers to a state of a product volume, wherein fluent products within the product volume are prevented from escaping the product volume (e.g. by one or more materials that form a barrier, and by a cap), but the product volume is not necessarily hermetically sealed. For example, a closed container can include a vent, which allows a head space in the container to be in fluid communication with air in the environment outside of the container.

As used herein, the term "directly connected" refers to a configuration wherein elements are attached to each other without any intermediate elements therebetween, except for any means of attachment (e.g. adhesive).

As used herein, when referring to a flexible container, the term "dispenser" refers to a structure configured to dispense fluent product(s) from a product volume and/or from a mixing volume to the environment outside of the container. For any of the flexible containers disclosed herein, any dispenser can be configured in any way disclosed herein or known in the art, including any suitable size, shape, and flow rate. For example, a dispenser can be a push-pull type dispenser, a dispenser with a flip-top cap, a dispenser with a screw-on cap, a rotatable type dispenser, dispenser with a cap, a pump type dispenser, a pump spray type dispenser, a trigger spray type dispenser, a straw dispenser, a flip up straw dispenser, a straw dispenser with bite valve, a dosing dispenser, etc. A dispenser can be a parallel dispenser, providing multiple flow channels in fluid communication with multiple product volumes, wherein those flow channels remain separate until the point of dispensing, thus allowing fluent products from multiple product volumes to be dispensed as separate fluent products, dispensed together at the same time. A dispenser can be a mixing dispenser, providing one or more flow channels in fluid communication with multiple product volumes, with multiple flow channels combined before the point of dispensing, thus allowing fluent products from multiple product volumes to be dispensed as the fluent products mixed together. As another example, a dispenser can be formed by a frangible opening. As further examples, a dispenser can utilize one or more valves and/or dispensing mechanisms disclosed in the art, such as those disclosed in: published US patent application 2003/0096068, entitled "One-way valve for inflatable package"; U.S. Pat. No. 4,988,016 entitled "Self-sealing container"; and U.S. Pat. No. 7,207,717, entitled "Package having a fluid actuated closure"; each of which is hereby incorporated by reference. Still further, any of the dispensers disclosed herein, may be incorporated into a flexible container either directly, or in combination with one or more other materials or structures (such as a fitment), or in any way known in the art. In some alternate embodiments, dispensers disclosed herein can be configured for both dispensing and filling, to allow filling of product volume(s) through one or more dispensers. In other alternate embodiments, a product volume can include one or more filling structure(s) (e.g. for adding water to a mixing volume) in addition to or instead of one or more dispenser(s). Any location for a dispenser, disclosed herein can alternatively be used as a location for a filling structure.

As used herein, when referring to a flexible container, the term "disposable" refers to a container which, after dispensing a product to an end user, is not configured to be refilled with an additional amount of the product, but is configured to be disposed of (i.e. as waste, compost, and/or recyclable material). Part, parts, or all of any of the embodiments of flexible containers, disclosed herein, can be configured to be disposable.

As used herein, when referring to a flexible container, the term "durable" refers to a container that is reusable more than non-durable containers.

As used herein, when referring to a flexible container, the term "effective base contact area" refers to a particular area defined by a portion of the bottom of the container, when the container (with all of its product volume(s) filled 100% with water) is standing upright and its bottom is resting on a horizontal support surface. The effective base contact area lies in a plane defined by the horizontal support surface. The effective base contact area is a continuous area bounded on all sides by an outer periphery.

The outer periphery is formed from an actual contact area and from a series of projected areas from defined cross-sections taken at the bottom of the container. The actual contact area is the one or more portions of the bottom of the container that contact the horizontal support surface, when the effective base contact area is defined. The effective base contact area includes all of the actual contact area. However, in some embodiments, the effective base contact area may extend beyond the actual contact area.

The series of projected area are formed from five horizontal cross-sections, taken at the bottom of the flexible container. These cross-sections are taken at 1%, 2%, 3%, 4%, and 5% of the overall height. The outer extent of each of these cross-sections is projected vertically downward onto the horizontal support surface to form five (overlapping) projected areas, which, together with the actual contact area, form a single combined area. This is not a summing up of the values for these areas, but is the formation of a single combined area that includes all of these (projected and actual) areas, overlapping each other, wherein any overlapping portion makes only one contribution to the single combined area.

The outer periphery of the effective base contact area is formed as described below. In the following description, the terms convex, protruding, concave, and recessed are understood from the perspective of points outside of the combined area. The outer periphery is formed by a combination of the outer extent of the combined area and any chords, which are straight line segments constructed as described below.

For each continuous portion of the combined area that has an outer perimeter with a shape that is concave or recessed, a chord is constructed across that portion. This chord is the shortest straight line segment that can be drawn tangent to the combined area on both sides of the concave/recessed portion.

For a combined area that is discontinuous (formed by two or more separate portions), one or more chords are constructed around the outer perimeter of the combined area, across the one or more discontinuities (open spaces disposed between the portions). These chords are straight lines segments drawn tangent to the outermost separate portions of the combined area. These chords are drawn to create the largest possible effective base contact area.

Thus, the outer periphery is formed by a combination of the outer extent of the combined area and any chords, constructed as described above, which all together enclose the effective base area. Any chords that are bounded by the combined area and/or one or more other chords, are not part of the outer periphery and should be ignored.

Any of the embodiments of flexible containers, disclosed herein, can be configured to have an effective base contact area from 1 to 50,000 square centimeters ($cm^2$), or any integer value for $cm^2$ between 1 and 50,000 $cm^2$, or within any range formed by any of the preceding values, such as: from 2 to 25,000 $cm^2$, 3 to 10,000 $cm^2$, 4 to 5,000 $cm^2$, 5 to 2,500 $cm^2$, from 10 to 1,000 $cm^2$, from 20 to 500 $cm^2$, from 30 to 300 $cm^2$, from 40 to 200 $cm^2$, or from 50 to 100 $cm^2$, etc.

As used herein, when referring to a flexible container, the term "expanded" refers to the state of one or more flexible materials that are configured to be formed into a structural support volume, after the structural support volume is made rigid by one or more expansion materials. An expanded structural support volume has an overall width that is significantly greater than the combined thickness of its one or more flexible materials, before the structural support volume is filled with the one or more expansion materials. Examples of expansion materials include liquids (e.g. water), gases (e.g. compressed air), fluent products, foams (that can expand after being added into a structural support volume), co-reactive materials (that produce gas), or phase change materials (that can be added in solid or liquid form, but which turn into a gas; for example, liquid nitrogen or dry ice), or other suitable materials known in the art, or combinations of any of these (e.g. fluent product and liquid nitrogen). In various embodiments, expansion materials can be added at atmospheric pressure, or added under pressure greater than atmospheric pressure, or added to provide a material change that will increase pressure to something above atmospheric pressure. For any of the embodiments of flexible containers, disclosed herein, its one or more flexible materials can be expanded at various points in time, with respect to its manufacture, sale, and use, including, for example: before or after its product volume(s) are filled with fluent product(s), before or after the flexible container is shipped to a seller, and before or after the flexible container is purchased by an end user.

As used herein, when referring to a product volume of a flexible container, the term "filled" refers to the state when the product volume contains an amount of fluent product(s) that is equal to a full capacity for the product volume, with an allowance for head space, under ambient conditions. As used herein, the term filled can be modified by using the term filled with a particular percentage value, wherein 100% filled represents the maximum capacity of the product volume.

As used herein, the term "flat" refers to a surface that is without significant projections or depressions.

As used herein, the term "flexible container" refers to a container configured to have a product volume, wherein one or more flexible materials form 50-100% of the overall surface area of the one or more materials that define the three-dimensional space of the product volume. For any of the embodiments of flexible containers, disclosed herein, in various embodiments, the flexible container can be configured to have a product volume, wherein one or more flexible materials form a particular percentage of the overall area of the one or more materials that define the three-dimensional space, and the particular percentage is any integer value for percentage between 50% and 100%, or within any range formed by any of these values, such as: 60-100%, or 70-100%, or 80-100%, or 90-100%, etc. One kind of flexible container is a film-based container, which is a flexible container made from one or more flexible materials, which include a film.

For any of the embodiments of flexible containers, disclosed herein, in various embodiments, the middle of the flexible container (apart from any fluent product) can be configured to have an overall middle mass, wherein one or more flexible materials form a particular percentage of the overall middle mass, and the particular percentage is any integer value for percentage between 50% and 100%, or within any range formed by any of the preceding values, such as: 60-100%, or 70-100%, or 80-100%, or 90-100%, etc.

For any of the embodiments of flexible containers, disclosed herein, in various embodiments, the entire flexible container (apart from any fluent product) can be configured to have an overall mass, wherein one or more flexible materials form a particular percentage of the overall mass, and the particular percentage is any integer value for percentage between 50% and 100%, or within any range formed by any of the preceding values, such as: 60-100%, or 70-100%, or 80-100%, or 90-100%, etc.

As used herein, when referring to a flexible container, the term "flexible material" refers to a thin, easily deformable, sheet-like material, having a flexibility factor within the range of 1,000-2,500,000 N/m. For any of the embodiments of flexible containers, disclosed herein, in various embodiments, any of the flexible materials can be configured to have a flexibility factor of 1,000-2,500,000 N/m, or any integer value for flexibility factor from 1,000-2,500,000 N/m, or within any range formed by any of these values, such as 1,000-1,500,000 N/m, 1,500-1,000,000 N/m, 2,500-800,000 N/m, 5,000-700,000 N/m, 10,000-600,000 N/m, 15,000-500,000 N/m, 20,000-400,000 N/m, 25,000-300,000 N/m, 30,000-200,000 N/m, 35,000-100,000 N/m, 40,000-90,000 N/m, or 45,000-85,000 N/m, etc. Throughout the present disclosure the terms "flexible material", "flexible sheet", "sheet", and "sheet-like material" are used interchangeably and are intended to have the same meaning. Examples of materials that can be flexible materials include one or more of any of the following: films (such as plastic films), elastomers, foamed sheets, foils, fabrics (including wovens and nonwovens), biosourced materials, and papers, in any configuration, as separate material(s), or as layer(s) of a laminate, or as part(s) of a composite material, in a microlayered or nanolayered structure, and in any combination, as described herein or as known in the art. In various embodiments, part, parts, or all of a flexible material can be coated or uncoated, treated or untreated, processed or unprocessed, in any manner known in the art. In various embodiments, parts, parts, or about all, or approximately all, or substantially all, or nearly all, or all of a flexible material can made of sustainable, bio-sourced, recycled, recyclable, and/or biodegradable material. Part, parts, or about all, or approximately all, or substantially all, or nearly all, or all of any of the flexible materials described herein can be partially or completely translucent, partially or completely transparent, or partially or completely opaque. The flexible materials used to make the containers disclosed herein can be formed in any manner known in the art, and can be joined together using any kind of joining or sealing method known in the art, including, for example, heat sealing (e.g. conductive sealing, impulse sealing, ultrasonic sealing, etc.), welding, crimping, bonding, adhering, and the like, and combinations of any of these.

As used herein, when referring to a flexible container, the term "flexibility factor" refers to a material parameter for a thin, easily deformable, sheet-like material, wherein the parameter is measured in Newtons per meter, and the flexibility factor is equal to the product of the value for the Young's modulus of the material (measured in Pascals) and the value for the overall thickness of the material (measured in meters).

As used herein, when referring to a flexible container, the term "fluent product" refers to one or more liquids and/or pourable solids, and combinations thereof. Examples of fluent products include one or more of any of the following: bites, bits, creams, chips, chunks, crumbs, crystals, emulsions, flakes, gels, grains, granules, jellies, kibbles, liquid solutions, liquid suspensions, lotions, nuggets, ointments, particles, particulates, pastes, pieces, pills, powders, salves, shreds, sprinkles, and the like, either individually or in any combination. Throughout the present disclosure the terms "fluent product" and "flowable product" are used interchangeably and are intended to have the same meaning. Any of the product volumes disclosed herein can be configured to include one or more of any fluent product disclosed herein, or known in the art, in any combination.

As used herein, when referring to a flexible container, the term "formed" refers to the state of one or more materials that are configured to be formed into a product volume, after the product volume is provided with its defined three-dimensional space.

As used herein, the term "graphic" refers to a visual element intended to provide a decoration or to communicate information. Examples of graphics include one or more of any of the following: colors, patterns, designs, images, and the like. For any of the embodiments of flexible containers, disclosed herein, in various embodiments, any surface of the flexible container can include one or more graphics of any size, shape, or configuration, disclosed herein or known in the art, in any combination.

As used herein, when referring to a flexible container, the term "height area ratio" refers to a ratio for the container, with units of per centimeter ($cm^{-1}$), which is equal to the value for the overall height of the container (with all of its product volume(s) filled 100% with water, and with overall height measured in centimeters) divided by the value for the effective base contact area of the container (with all of its product volume(s) filled 100% with water, and with effective base contact area measured in square centimeters). For any of the embodiments of flexible containers, disclosed herein, in various embodiments, any of the flexible containers, can be configured to have a height area ratio from 0.3 to 3.0 per centimeter, or any value in increments of 0.05 $cm^{-1}$ between 0.3 and 3.0 per centimeter, or within any range formed by any of the preceding values, such as: from 0.35 to 2.0 $cm^{-1}$, from 0.4 to 1.5 $cm^{-1}$, from 0.4 to 1.2 $cm^{-1}$, or from 0.45 to 0.9 $cm^1$, etc.

As used herein, the term "indicia" refers to one or more of characters, graphics, branding, or other visual elements, in any combination. For any of the embodiments of flexible containers, disclosed herein, in various embodiments, any surface of the flexible container can include one or more indicia of any size, shape, or configuration, disclosed herein or known in the art, in any combination.

As used herein, the term "indirectly connected" refers to a configuration wherein elements are attached to each other with one or more intermediate elements therebetween.

As used herein, the term "joined" refers to a configuration wherein elements are either directly connected or indirectly connected.

As used herein, the term "lateral" refers to a direction, orientation, or measurement that is parallel to a lateral centerline of a container, when the container is standing upright on a horizontal support surface, as described herein. A lateral orientation may also be referred to a "horizontal" orientation, and a lateral measurement may also be referred to as a "width."

As used herein, the term "like-numbered" refers to similar alphanumeric labels for corresponding elements, as described below. Like-numbered elements have labels with the same last two digits; for example, one element with a label ending in the digits 20 and another element with a label ending in the digits 20 are like-numbered. Like-numbered elements can have labels with a differing first digit, wherein that first digit matches the number for its figure; as an example, an element of FIG. 3 labeled 320 and an element of FIG. 4 labeled 420 are like-numbered. Like-numbered elements can have labels with a suffix (i.e. the portion of the label following the dash symbol) that is the same or possibly different (e.g. corresponding with a particular embodiment); for example, a first embodiment of an element in FIG. 3A labeled 320-*a* and a second embodiment of an element in FIG. 3B labeled 320-*b*, are like numbered.

As used herein, the term "longitudinal" refers to a direction, orientation, or measurement that is parallel to a longitudinal centerline of a container, when the container is standing upright on a horizontal support surface, as described herein. A longitudinal orientation may also be referred to a "vertical" orientation. When expressed in relation to a horizontal support surface for a container, a longitudinal measurement may also be referred to as a "height", measured above the horizontal support surface.

As used herein, when referring to a flexible container, the term "middle" refers to the portion of the container that is located in between the top of the container and the bottom of the container. As used herein, the term middle can be modified by describing the term middle with reference to a particular percentage value for the top and/or a particular percentage value for the bottom. For any of the embodiments of flexible containers, disclosed herein, a reference to the middle of the container can, in various alternate embodiments, refer to the portion of the container that is located between any particular percentage value for the top, disclosed herein, and/or any particular percentage value for the bottom, disclosed herein, in any combination.

As used herein, the term "mixing volume" refers to a type product volume that is configured to receive one or more fluent product(s) from one or more product volumes and/or from the environment outside of the container.

As used herein, when referring to a product volume, the term "multiple dose" refers to a product volume that is sized to contain a particular amount of product that is about equal to two or more units of typical consumption, application, or use by an end user. Any of the embodiments of flexible containers, disclosed herein, can be configured to have one or more multiple dose product volumes. A container with only one product volume, which is a multiple dose product volume, is referred to herein as a "multiple dose container."

As used herein, the term "nearly" modifies a particular value, by referring to a range equal to the particular value, plus or minus five percent (+/−5%). For any of the embodiments of flexible containers, disclosed herein, any disclosure of a particular value, can, in various alternate embodiments, also be understood as a disclosure of a range equal to approximately that particular value (i.e. +/−5%).

As used herein, when referring to a flexible container, the term "non-durable" refers to a container that is temporarily reusable, or disposable, or single use.

As used herein, when referring to a flexible container, the term "overall height" refers to a distance that is measured while the container is standing upright on a horizontal support surface, the distance measured vertically from the upper side of the support surface to a point on the top of the container, which is farthest away from the upper side of the support surface. Any of the embodiments of flexible containers, disclosed herein, can be configured to have an overall height from 2.0 cm to 100.0 cm, or any value in increments of 0.1 cm between 2.0 and 100.0 cm, or within any range formed by any of the preceding values, such as: from 4.0 to 90.0 cm, from 5.0 to 80.0 cm, from 6.0 to 70.0 cm, from 7.0 to 60.0 cm, from 8.0 to 50.0 cm, from 9.0 to 40.0 cm, or from 10.0 to 30.0, etc.

As used herein, when referring to a sheet of flexible material, the term "overall thickness" refers to a linear dimension measured perpendicular to the outer major surfaces of the sheet, when the sheet is lying flat. For any of the embodiments of flexible containers, disclosed herein, in various embodiments, any of the flexible materials can be configured to have an overall thickness 5-500 micrometers (μm), or any integer value for micrometers from 5-500, or within any range formed by any of these values, such as 10-500 μm, 20-400 μm, 30-300 μm, 40-200 μm, or 50-100 μm, etc.

As used herein, the term "product volume" refers to an enclosable three-dimensional space that is configured to receive and directly contain one or more fluent product(s), wherein that space is defined by one or more materials that form a barrier that prevents the fluent product(s) from escaping the product volume. By directly containing the one or more fluent products, the fluent products come into contact with the materials that form the enclosable three-dimensional space; there is no intermediate material or container, which prevents such contact. Throughout the present disclosure the terms "product volume" and "product receiving volume" are used interchangeably and are intended to have the same meaning. Any of the embodiments of flexible containers, disclosed herein, can be configured to have any number of product volumes including one product volume, two product volumes, three product volumes, four product volumes, five product volumes, six product volumes, or even more product volumes. In some embodiments, one or more product volumes can be enclosed within another product volume. Any of the product volumes disclosed herein can have a product volume of any size, including from 0.001 liters to 100.0 liters, or any value in increments of 0.001 liters between 0.001 liters and 3.0 liters, or any value in increments of 0.01 liters between 3.0 liters and 10.0 liters, or any value in increments of 1.0 liters between 10.0 liters and 100.0 liters, or within any range formed by any of the preceding values, such as: from 0.001 to 2.2 liters, 0.01 to 2.0 liters, 0.05 to 1.8 liters, 0.1 to 1.6 liters, 0.15 to 1.4 liters, 0.2 to 1.2 liters, 0.25 to 1.0 liters, etc. A product volume can have any shape in any orientation. A product volume can be included in a container that has a structural support frame, and a product volume can be included in a container that does not have a structural support frame.

As used herein, when referring to a flexible container, the term "resting on a horizontal support surface" refers to the container resting directly on the horizontal support surface, without other support.

As used herein, the term "sealed," when referring to a product volume, refers to a state of the product volume wherein fluent products within the product volume are prevented from escaping the product volume (e.g. by one or more materials that form a barrier, and by a seal), and the product volume is hermetically sealed.

As used herein, when referring to a flexible container, the term "self-supporting" refers to a container that includes a product volume and a structural support frame, wherein, when the container is resting on a horizontal support surface, in at least one orientation, the structural support frame is configured to prevent the container from collapsing and to give the container an overall height that is significantly greater than the combined thickness of the materials that form the container, even when the product volume is unfilled. Any of the embodiments of flexible containers, disclosed herein, can be configured to be self-supporting.

As used herein, when referring to a flexible container, the term "single use" refers to a closed container which, after being opened by an end user, is not configured to be reclosed. Any of the embodiments of flexible containers, disclosed herein, can be configured to be single use.

As used herein, when referring to a product volume, the term "single dose" refers to a product volume that is sized to contain a particular amount of product that is about equal to one unit of typical consumption, application, or use by an end user. Any of the embodiments of flexible containers, disclosed herein, can be configured to have one or more single dose product volumes. A container with only one product volume, which is a single dose product volume, is referred to herein as a "single dose container."

As used herein, when referring to a flexible container, the terms "stand up," "stands up," "standing up", "stand upright", "stands upright", and "standing upright" refer to a particular orientation of a self-supporting flexible container, when the container is resting on a horizontal support surface. This standing upright orientation can be determined from the structural features of the container and/or indicia on the container. In a first determining test, if the flexible container has a clearly defined base structure that is configured to be used on the bottom of the container, then the container is determined to be standing upright when this base structure is resting on the horizontal support surface. If the first test cannot determine the standing upright orientation, then, in a second determining test, the container is determined to be standing upright when the container is oriented to rest on the horizontal support surface such that the indicia on the flexible container are best positioned in an upright orientation. If the second test cannot determine the standing upright orientation, then, in a third determining test, the container is determined to be standing upright when the container is oriented to rest on the horizontal support surface such that the container has the largest overall height. If the third test cannot determine the standing upright orientation, then, in a fourth determining test, the container is determined to be standing upright when the container is oriented to rest on the horizontal support surface such that the container has the largest height area ratio. If the fourth test cannot determine the standing upright orientation, then, any orientation used in the fourth determining test can be considered to be a standing upright orientation.

As used herein, when referring to a flexible container, the term "stand up container" refers to a self-supporting container, wherein, when the container (with all of its product volume(s) filled 100% with water) is standing up, the container has a height area ratio from 0.4 to 1.5 $cm^{-1}$. Any of the embodiments of flexible containers, disclosed herein, can be configured to be stand up containers.

As used herein, when referring to a flexible container, the term "structural support frame" refers to a rigid structure formed of one or more structural support members, joined together, around one or more sizable empty spaces and/or one or more nonstructural panels, and generally used as a major support for the product volume(s) in the flexible container and in making the container self-supporting and/or standing upright. In each of the embodiments disclosed herein, when a flexible container includes a structural support frame and one or more product volumes, the structural support frame is considered to be supporting the product volumes of the container, unless otherwise indicated.

As used herein, when referring to a flexible container, the term "structural support member" refers to a rigid, physical structure, which includes one or more expanded structural support volumes, and which is configured to be used in a structural support frame, to carry one or more loads (from the flexible container) across a span. A structure that does not include at least one expanded structural support volume, is not considered to be a structural support member, as used herein.

A structural support member has two defined ends, a middle between the two ends, and an overall length from its one end to its other end. A structural support member can have one or more cross-sectional areas, each of which has an overall width that is less than its overall length.

A structural support member can be configured in various forms. A structural support member can include one, two, three, four, five, six or more structural support volumes, arranged in various ways. For example, a structural support member can be formed by a single structural support volume. As another example, a structural support member can be formed by a plurality of structural support volumes, disposed end to end, in series, wherein, in various embodiments, part, parts, or about all, or approximately all, or substantially all, or nearly all, or all of some or all of the structural support volumes can be partly or fully in contact with each other, partly or fully directly connected to each other, and/or partly or fully joined to each other. As a further example, a structural support member can be formed by a plurality of support volumes disposed side by side, in parallel, wherein, in various embodiments, part, parts, or about all, or approximately all, or substantially all, or nearly all, or all of some or all of the structural support volumes can be partly or fully in contact with each other, partly or fully directly connected to each other, and/or partly or fully joined to each other.

In some embodiments, a structural support member can include a number of different kinds of elements. For example, a structural support member can include one or more structural support volumes along with one or more mechanical reinforcing elements (e.g. braces, collars, connectors, joints, ribs, etc.), which can be made from one or more rigid (e.g. solid) materials.

Structural support members can have various shapes and sizes. Part, parts, or about all, or approximately all, or substantially all, or nearly all, or all of a structural support member can be straight, curved, angled, segmented, or other shapes, or combinations of any of these shapes. Part, parts, or about all, or approximately all, or substantially all, or nearly all, or all of a structural support member can have any suitable cross-sectional shape, such as circular, oval, square, triangular, star-shaped, or modified versions of these shapes, or other shapes, or combinations of any of these shapes. A structural support member can have an overall shape that is tubular, or convex, or concave, along part, parts, or about all, or approximately all, or substantially all, or nearly all, or all of a length. A structural support member can have any suitable cross-sectional area, any suitable overall width, and any suitable overall length. A structural support member can be substantially uniform along part, parts, or about all, or approximately all, or substantially all, or nearly all, or all of its length, or can vary, in any way described herein, along part, parts, or about all, or approximately all, or substantially all, or nearly all, or all of its length. For example, a cross-sectional area of a structural support member can increase or decrease along part, parts, or all of its length. Part, parts, or all of any of the embodiments of structural support members of the present disclosure, can be configured according to any embodiment disclosed herein, including any workable combination of structures, features, materials, and/or connections from any number of any of the embodiments disclosed herein.

As used herein, when referring to a flexible container, the term "structural support volume" refers to a fillable space made from one or more flexible materials, wherein the space is configured to be at least partially filled with one or more expansion materials, which create tension in the one or more flexible materials, and form an expanded structural support volume. One or more expanded structural support volumes can be configured to be included in a structural support member. A structural support volume is distinct from structures configured in other ways, such as: structures without a fillable space (e.g. an open space), structures made from inflexible (e.g. solid) materials, structures with spaces that are not configured to be filled with an expansion material (e.g. an unattached area between adjacent layers in a multi-layer panel), and structures with flexible materials that are not configured to be expanded by an expansion material (e.g. a space in a structure that is configured to be a non-structural panel). Throughout the present disclosure the terms "structural support volume" and "expandable chamber" are used interchangeably and are intended to have the same meaning.

In some embodiments, a structural support frame can include a plurality of structural support volumes, wherein some of or all of the structural support volumes are in fluid communication with each other. In other embodiments, a structural support frame can include a plurality of structural support volumes, wherein some of or none of the structural support volumes are in fluid communication with each other. Any of the structural support frames of the present disclosure can be configured to have any kind of fluid communication disclosed herein.

As used herein, the term "substantially" modifies a particular value, by referring to a range equal to the particular value, plus or minus ten percent (+/−10%). For any of the embodiments of flexible containers, disclosed herein, any disclosure of a particular value, can, in various alternate embodiments, also be understood as a disclosure of a range equal to approximately that particular value (i.e. +/−10%).

As used herein, when referring to a flexible container, the term "temporarily reusable" refers to a container which, after dispensing a product to an end user, is configured to be refilled with an additional amount of a product, up to ten times, before the container experiences a failure that renders it unsuitable for receiving, containing, or dispensing the product. As used herein, the term temporarily reusable can be further limited by modifying the number of times that the container can be refilled before the container experiences such a failure. For any of the embodiments of flexible containers, disclosed herein, a reference to temporarily reusable can, in various alternate embodiments, refer to temporarily reusable by refilling up to eight times before failure, by refilling up to six times before failure, by refilling up to four times before failure, or by refilling up to two times before failure, or any integer value for refills between one and ten times before failure. Any of the embodiments of flexible containers, disclosed herein, can be configured to be temporarily reusable, for the number of refills disclosed herein.

As used herein, the term "thickness" refers to a measurement that is parallel to a third centerline of a container, when the container is standing upright on a horizontal support surface, as described herein. A thickness may also be referred to as a "depth."

As used herein, when referring to a flexible container, the term "top" refers to the portion of the container that is located in the uppermost 20% of the overall height of the container, that is, from 80-100% of the overall height of the container. As used herein, the term top can be further limited by modifying the term top with a particular percentage value, which is less than 20%. For any of the embodiments of flexible containers, disclosed herein, a reference to the top of the container can, in various alternate embodiments, refer to the top 15% (i.e. from 85-100% of the overall height), the top 10% (i.e. from 90-100% of the overall height), or the top 5% (i.e. from 95-100% of the overall height), or any integer value for percentage between 0% and 20%.

As used herein, when referring to a flexible container, the term "unexpanded" refers to the state of one or more materials that are configured to be formed into a structural support volume, before the structural support volume is made rigid by an expansion material.

As used herein, when referring to a product volume of a flexible container, the term "unfilled" refers to the state of the product volume when it does not contain a fluent product.

As used herein, when referring to a flexible container, the term "unformed" refers to the state of one or more materials that are configured to be formed into a product volume, before the product volume is provided with its defined three-dimensional space. For example, an article of manufacture could be a container blank with an unformed product volume, wherein sheets of flexible material, with portions joined together, are laying flat against each other.

Flexible containers, as described herein, may be used across a variety of industries for a variety of products. For example, flexible containers, as described herein, may be used across the consumer products industry, including the following products: soft surface cleaners, hard surface cleaners, glass cleaners, ceramic tile cleaners, toilet bowl cleaners, wood cleaners, multi-surface cleaners, surface disinfectants, dishwashing compositions, laundry detergents, fabric conditioners, fabric dyes, surface protectants, surface disinfectants, cosmetics, facial powders, body powders, hair treatment products (e.g. mousse, hair spray, styling gels), shampoo, hair conditioner (leave-in or rinse-out), cream rinse, hair dye, hair coloring product, hair shine product, hair serum, hair anti-frizz product, hair split-end repair products, permanent waving solution, antidandruff formulation, bath gels, shower gels, body washes, facial cleaners, skin care products (e.g. sunscreen, sun block lotions, lip balm, skin conditioner, cold creams, moisturizers), body sprays, soaps, body scrubs, exfoliants, astringent, scrubbing lotions, depilatories, antiperspirant compositions, deodorants, shaving products, pre-shaving products, after shaving products, toothpaste, mouthwash, etc. As further examples, flexible containers, as described herein, may be used across other industries, including foods, beverages, pharmaceuticals, commercial products, industrial products, medical, etc.

FIGS. 1A-1D illustrates various views of an embodiment of a stand up flexible container 100. FIG. 1A illustrates a front view of the container 100. The container 100 is standing upright on a horizontal support surface 101.

In FIG. 1A, a coordinate system 110, provides lines of reference for referring to directions in the figure. The coordinate system 110 is a three-dimensional Cartesian coordinate system with an X-axis, a Y-axis, and a Z-axis, wherein each axis is perpendicular to the other axes, and any two of the axes define a plane. The X-axis and the Z-axis are parallel with the horizontal support surface 101 and the Y-axis is perpendicular to the horizontal support surface 101.

FIG. 1A also includes other lines of reference, for referring to directions and locations with respect to the container 100. A lateral centerline 111 runs parallel to the X-axis. An XY plane at the lateral centerline 111 separates the container 100 into a front half and a back half. An XZ plane at the lateral centerline 111 separates the container 100 into an upper half and a lower half. A longitudinal centerline 114 runs parallel to the Y-axis. A YZ plane at the longitudinal centerline 114 separates the container 100 into a left half and a right half. A third centerline 117 runs parallel to the Z-axis. The lateral centerline 111, the longitudinal centerline 114, and the third centerline 117 all intersect at a center of the container 100.

A disposition with respect to the lateral centerline 111 defines what is longitudinally inboard 112 and longitudinally outboard 113. When a first location is nearer to the lateral centerline 111 than a second location, the first location is considered to be disposed longitudinally inboard 112 to the second location. And, the second location is considered to be disposed longitudinally outboard 113 from the first location. The term lateral refers to a direction, orientation, or measurement that is parallel to the lateral centerline 111. A lateral orientation may also be referred to a horizontal orientation, and a lateral measurement may also be referred to as a width.

A disposition with respect to the longitudinal centerline 114 defines what is laterally inboard 115 and laterally outboard 116. When a first location is nearer to the longitudinal centerline 114 than a second location, the first location is considered to be disposed laterally inboard 115 to the second location. And, the second location is considered to be disposed laterally outboard 116 from the first location. The term longitudinal refers to a direction, orientation, or measurement that is parallel to the longitudinal centerline 114. A longitudinal orientation may also be referred to a vertical orientation.

A longitudinal direction, orientation, or measurement may also be expressed in relation to a horizontal support surface for the container 100. When a first location is nearer to the support surface than a second location, the first location can be considered to be disposed lower than, below, beneath, or under the second location. And, the second location can be considered to be disposed higher than, above, or upward from the first location. A longitudinal measurement may also be referred to as a height, measured above the horizontal support surface 100.

A measurement that is made parallel to the third centerline 117 is referred to a thickness or depth. A disposition in the direction of the third centerline 117 and toward a front 102-1 of the container is referred to as forward 118 or in front of. A disposition in the direction of the third centerline 117 and toward a back 102-2 of the container is referred to as backward 119 or behind.

These terms for direction, orientation, measurement, and disposition, as described above, are used for all of the embodiments of the present disclosure, whether or not a support surface, reference line, or coordinate system is shown in a figure.

The container 100 includes a top 104, a middle 106, and a bottom 108, the front 102-1, the back 102-2, and left and right sides 109. The top 104 is separated from the middle 106 by a reference plane 105, which is parallel to the XZ plane. The middle 106 is separated from the bottom 108 by a reference plane 107, which is also parallel to the XZ plane. The container 100 has an overall height of 100-oh. In the embodiment of FIG. 1A, the front 102-1 and the back 102-2 of the container are joined together at a seal 129, which extends around the outer periphery of the container 100, across the top 104, down the side 109, and then, at the bottom of each side 109, splits outward to follow the front and back portions of the base 190, around their outer extents.

The container 100 includes a structural support frame 140, a product volume 150, a dispenser 160, panels 180-1 and 180-2, and a base structure 190. A portion of panel 180-1 is illustrated as broken away, in order to show the product volume 150. The product volume 150 is configured to contain one or more fluent products. The dispenser 160 allows the container 100 to dispense these fluent product(s) from the product volume 150 through a flow channel 159 then through the dispenser 160, to the environment outside of the container 100. In the embodiment of FIGS. 1A-1D, the dispenser 160 is disposed in the center of the uppermost part of the top 104, however, in various alternate embodiments, the dispenser 160 can be disposed anywhere else on the top 140, middle 106, or bottom 108, including anywhere on either of the sides 109, on either of the panels 180-1 and 180-2, and on any part of the base 190 of the container 100. The structural support frame 140 supports the mass of fluent product(s) in the product volume 150, and makes the container 100 stand upright. The panels 180-1 and 180-2 are relatively flat surfaces, overlaying the product volume 150, and are suitable for displaying any kind of indicia. However, in various embodiments, part, parts, or about all, or approximately all, or substantially all, or nearly all, or all of either or both of the panels 180-1 and 180-2 can include one or more curved surfaces. The base structure 190 supports the structural support frame 140 and provides stability to the container 100 as it stands upright.

The structural support frame 140 is formed by a plurality of structural support members. The structural support frame 140 includes top structural support members 144-1 and 144-2, middle structural support members 146-1, 146-2, 146-3, and 146-4, as well as bottom structural support members 148-1 and 148-2.

The top structural support members 144-1 and 144-2 are disposed on the upper part of the top 104 of the container 100, with the top structural support member 144-1 disposed in the front 102-1 and the top structural support member 144-2 disposed in the back 102-2, behind the top structural support member 144-1. The top structural support members 144-1 and 144-2 are adjacent to each other and can be in contact with each other along the laterally outboard portions of their lengths. In various embodiments, the top structural support members 144-1 and 144-2 can be in contact with each other at one or more relatively smaller locations and/or at one or more relatively larger locations, along part, or parts, or about all, or approximately all, or substantially all, or nearly all, or all of their overall lengths, so long as there is a flow channel 159 between the top structural support members 144-1 and 144-2, which allows the container 100 to dispense fluent product(s) from the product volume 150 through the flow channel 159 then through the dispenser 160. The top structural support members 144-1 and 144-2 are not directly connected to each other. However, in various alternate embodiments, the top structural support members 144-1 and 144-2 can be directly connected and/or joined together along part, or parts, or about all, or approximately all, or substantially all, or nearly all, or all of their overall lengths.

The top structural support members 144-1 and 144-2 are disposed substantially above the product volume 150. Overall, each of the top structural support members 144-1 and 144-2 is oriented about horizontally, but with its ends curved slightly downward. And, overall each of the top structural support members 144-1 and 144-2 has a cross-sectional area that is substantially uniform along its length; however the cross-sectional area at their ends are slightly larger than the cross-sectional area in their middles.

The middle structural support members 146-1, 146-2, 146-3, and 146-4 are disposed on the left and right sides 109, from the top 104, through the middle 106, to the bottom 108. The middle structural support member 146-1 is disposed in the front 102-1, on the left side 109; the middle structural support member 146-4 is disposed in the back 102-2, on the left side 109, behind the middle structural support member 146-1. The middle structural support members 146-1 and 146-4 are adjacent to each other and can be in contact with each other along substantially all of their lengths. In various embodiments, the middle structural support members 146-1 and 146-4 can be in contact with each other at one or more relatively smaller locations and/or at one or more relatively larger locations, along part, or parts, or about all, or approximately all, or substantially all, or nearly all, or all of their overall lengths. The middle structural support members 146-1 and 146-4 are not directly connected to each other. However, in various alternate embodiments, the middle structural support members 146-1 and 146-4 can be directly connected and/or joined together along part, or parts, or about all, or approximately all, or substantially all, or nearly all, or all of their overall lengths.

The middle structural support member 146-2 is disposed in the front 102-1, on the right side 109; the middle structural support member 146-3 is disposed in the back 102-2, on the right side 109, behind the middle structural support member 146-2. The middle structural support members 146-2 and 146-3 are adjacent to each other and can be in contact with each other along substantially all of their lengths. In various embodiments, the middle structural support members 146-2 and 146-3 can be in contact with each other at one or more relatively smaller locations and/or at one or more relatively larger locations, along part, or parts, or about all, or approximately all, or substantially all, or nearly all, or all of their overall lengths. The middle structural support members 146-2 and 146-3 are not directly connected to each other. However, in various alternate embodiments, the middle structural support members 146-2 and 146-3 can be directly connected and/or joined together along part, or parts, or about all, or approximately all, or substantially all, or nearly all, or all of their overall lengths.

The middle structural support members 146-1, 146-2, 146-3, and 146-4 are disposed substantially laterally outboard from the product volume 150. Overall, each of the middle structural support members 146-1, 146-2, 146-3, and 146-4 is oriented about vertically, but angled slightly, with its upper end laterally inboard to its lower end. And, overall each of the middle structural support members 146-1, 146-2, 146-3, and 146-4 has a cross-sectional area that changes along its length, increasing in size from its upper end to its lower end.

The bottom structural support members 148-1 and 148-2 are disposed on the bottom 108 of the container 100, with the bottom structural support member 148-1 disposed in the front 102-1 and the bottom structural support member 148-2 disposed in the back 102-2, behind the top structural support member 148-1. The bottom structural support members 148-1 and 148-2 are adjacent to each other and can be in contact with each other along substantially all of their lengths. In various embodiments, the bottom structural support members 148-1 and 148-2 can be in contact with each other at one or more relatively smaller locations and/or at one or more relatively larger locations, along part, or parts, or about all, or approximately all, or substantially all, or nearly all, or all of their overall lengths. The bottom structural support members 148-1 and 148-2 are not directly connected to each other. However, in various alternate embodiments, the bottom structural support members 148-1 and 148-2 can be directly connected and/or joined together along part, or parts, or about all, or approximately all, or substantially all, or nearly all, or all of their overall lengths.

The bottom structural support members 148-1 and 148-2 are disposed substantially below the product volume 150, but substantially above the base structure 190. Overall, each of the bottom structural support members 148-1 and 148-2 is oriented about horizontally, but with its ends curved slightly upward. And, overall each of the bottom structural support members 148-1 and 148-2 has a cross-sectional area that is substantially uniform along its length.

In the front portion of the structural support frame 140, the left end of the top structural support member 144-1 is joined to the upper end of the middle structural support member 146-1; the lower end of the middle structural support member 146-1 is joined to the left end of the bottom structural support member 148-1; the right end of the bottom structural support member 148-1 is joined to the lower end of the middle structural support member 146-2; and the upper end of the middle structural support member 146-2 is joined to the right end of the top structural support member 144-1. Similarly, in the back portion of the structural support frame 140, the left end of the top structural support member 144-2 is joined to the upper end of the middle structural support member 146-4; the lower end of the middle structural support member 146-4 is joined to the left end of the bottom structural support member 148-2; the right end of the bottom structural support member 148-2 is joined to the lower end of the middle structural support member 146-3; and the upper end of the middle structural support member 146-3 is joined to the right end of the top structural support member 144-2. In the structural support frame 140, the ends of the structural support members, which are joined together, are directly connected, all around the periphery of their walls. However, in various alternative embodiments, any of the structural support members 144-1, 144-2, 146-1, 146-2, 146-3, 146-4, 148-1, and 148-2 can be joined together in any way described herein or known in the art.

In alternative embodiments of the structural support frame 140, adjacent structural support members can be combined into a single structural support member, wherein the combined structural support member can effectively substitute for the adjacent structural support members, as their functions and connections are described herein. In other alternative embodiments of the structural support frame 140, one or more additional structural support members can be added to the structural support members in the structural support frame 140, wherein the expanded structural support frame can effectively substitute for the structural support frame 140, as its functions and connections are described herein. Also, in some alternative embodiments, a flexible container may not include a base structure.

Figure 1B:
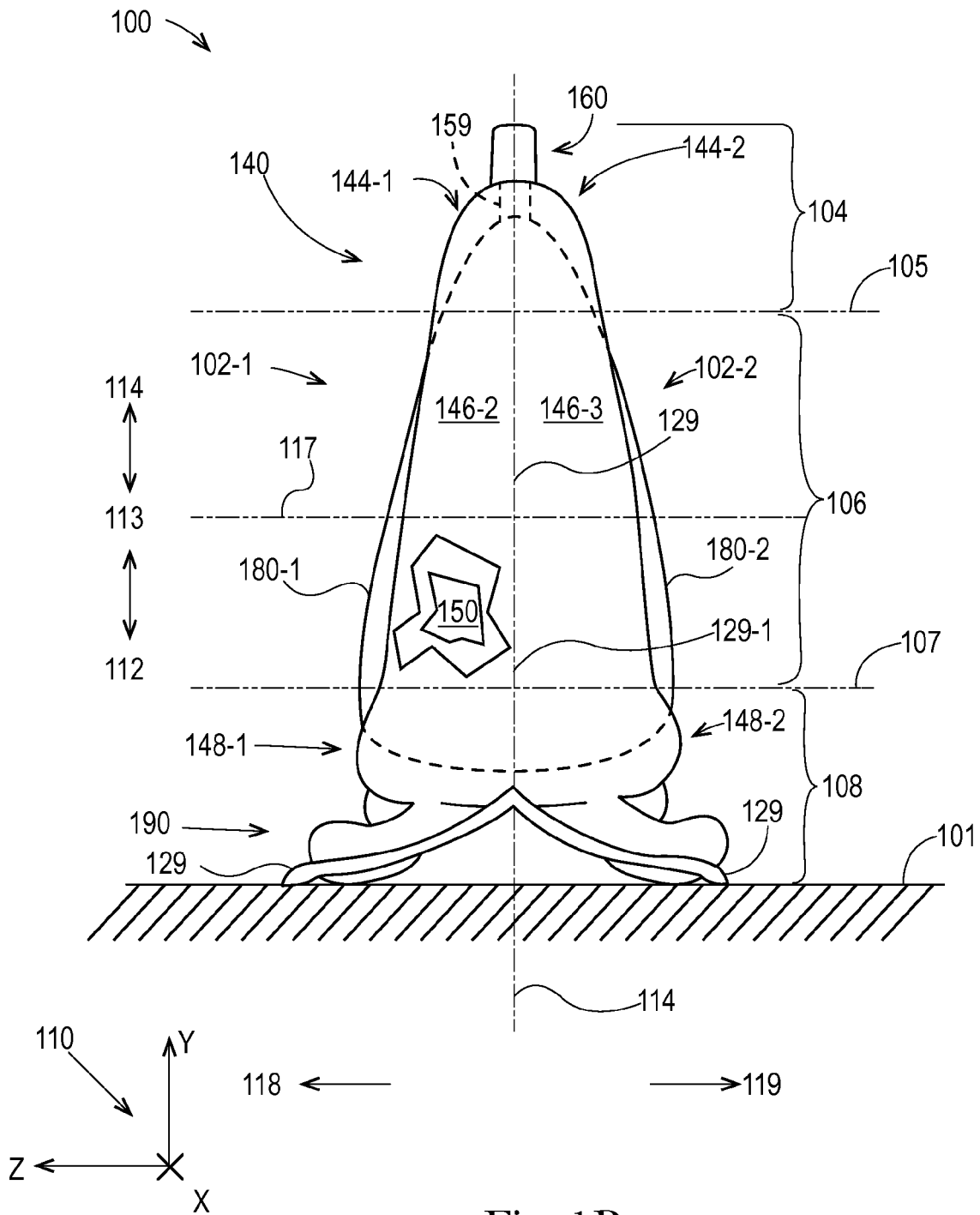
FIG. 1B illustrates a side view of the stand up flexible container of FIG. 1A.

FIG. 1B illustrates a side view of the stand up flexible container 100 of FIG. 1A.

Figure 1C:
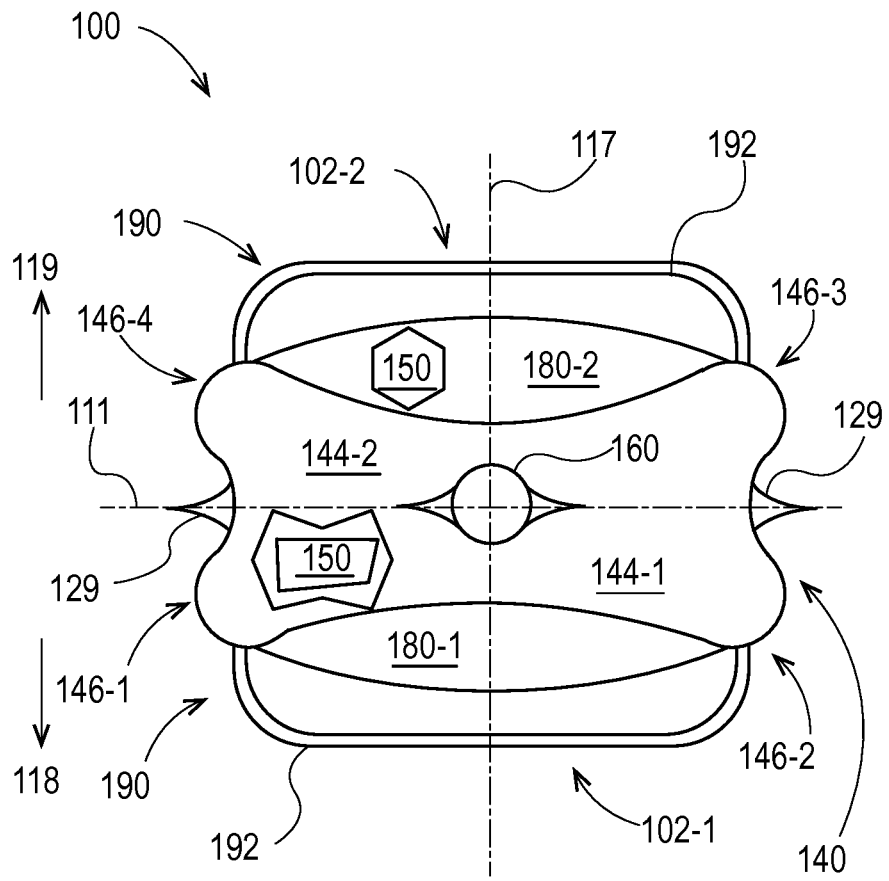
FIG. 1C illustrates a top view of the stand up flexible container of FIG. 1A.

FIG. 1C illustrates a top view of the stand up flexible container 100 of FIG. 1A.

Figure 1D:
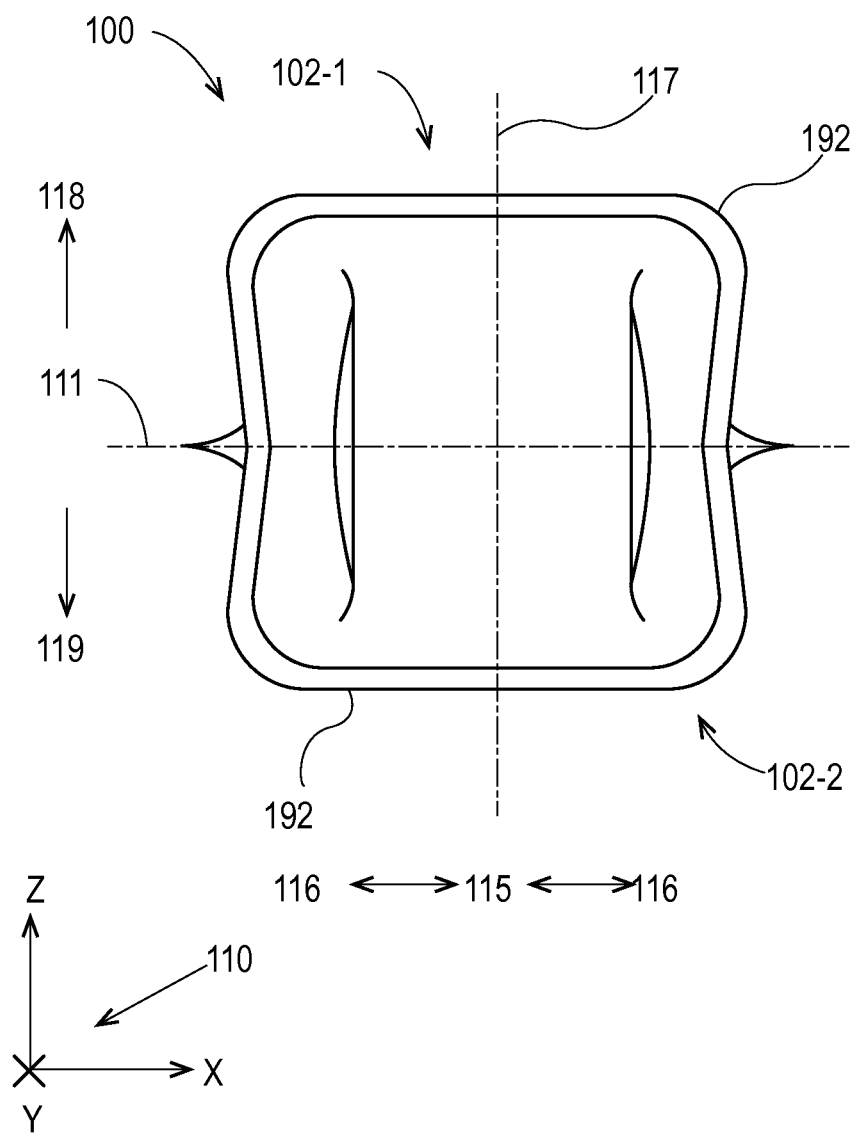
FIG. 1D illustrates a bottom view of the stand up flexible container of FIG. 1A.

FIG. 1D illustrates a bottom view of the stand up flexible container 100 of FIG. 1A.

FIGS. 2A-8D illustrate embodiments of stand up flexible containers having various overall shapes. Any of the embodiments of FIGS. 2A-8D can be configured according to any of the embodiments disclosed herein, including the embodiments of FIGS. 1A-1D. Any of the elements (e.g. structural support frames, structural support members, panels, dispensers, etc.) of the embodiments of FIGS. 2A-8D, can be configured according to any of the embodiments disclosed herein. While each of the embodiments of FIGS. 2A-8D illustrates a container with one dispenser, in various embodiments, each container can include multiple dispensers, according to any embodiment described herein. FIGS. 2A-8D illustrate exemplary additional/alternate locations for dispenser with phantom line outlines. Part, parts, or about all, or approximately all, or substantially all, or nearly all, or all of each of the panels in the embodiments of FIGS. 2A-8D is suitable to display any kind of indicia. Each of the side panels in the embodiments of FIGS. 2A-8D is configured to be a nonstructural panel, overlaying product volume(s) disposed within the flexible container, however, in various embodiments, one or more of any kind of decorative or structural element (such as a rib, protruding from an outer surface) can be joined to part, parts, or about all, or approximately all, or substantially all, or nearly all, or all of any of these side panels. For clarity, not all structural details of these flexible containers are shown in FIGS. 2A-8D, however any of the embodiments of FIGS. 2A-8D can be configured to include any structure or feature for flexible containers, disclosed herein. For example, any of the embodiments of FIGS. 2A-8D can be configured to include any kind of base structure disclosed herein.

FIG. 2A illustrates a front view of a stand up flexible container 200 having a structural support frame 240 that has an overall shape like a frustum. In the embodiment of FIG. 2A, the frustum shape is based on a four-sided pyramid, however, in various embodiments, the frustum shape can be based on a pyramid with a different number of sides, or the frustum shape can be based on a cone. The support frame 240 is formed by structural support members disposed along the edges of the frustum shape and joined together at their ends. The structural support members define a rectangular shaped top panel 280-t, trapezoidal shaped side panels 280-1, 280-2, 280-3, and 280-4, and a rectangular shaped bottom panel (not shown). Each of the side panels 280-1, 280-2, 280-3, and 280-4 is about flat, however in various embodiments, part, parts, or about all, or approximately all, or substantially all, or nearly all, or all of any of the side panels can be approximately flat, substantially flat, nearly flat, or completely flat. The container 200 includes a dispenser 260, which is configured to dispense one or more fluent products from one or more product volumes disposed within the container 200. In the embodiment of FIG. 2A, the dispenser 260 is disposed in the center of the top panel 280-t, however, in various alternate embodiments, the dispenser 260 can be disposed anywhere else on the top, sides, or bottom, of the container 200, according to any embodiment described or illustrated herein. FIG. 2B illustrates a front view of the container 200 of FIG. 2A, including exemplary additional/alternate locations for a dispenser, any of which can also apply to the back of the container. FIG. 2C illustrates a side view of the container 200 of FIG. 2A, including exemplary additional/alternate locations for a dispenser (shown as phantom lines), any of which can apply to either side of the container. FIG. 2D illustrates an isometric view of the container 200 of FIG. 2A.

Figure 3A:
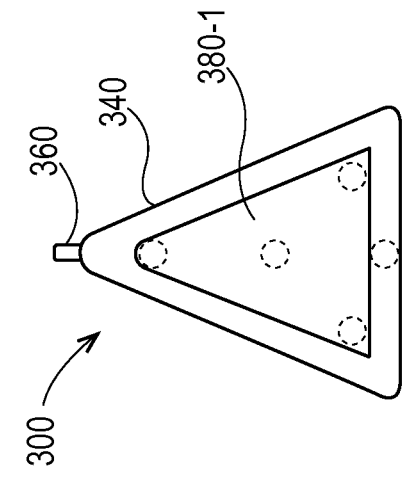
FIG. 3A illustrates a top view of a stand up flexible container having a structural support frame that has an overall shape like a pyramid.
Figure 3B:
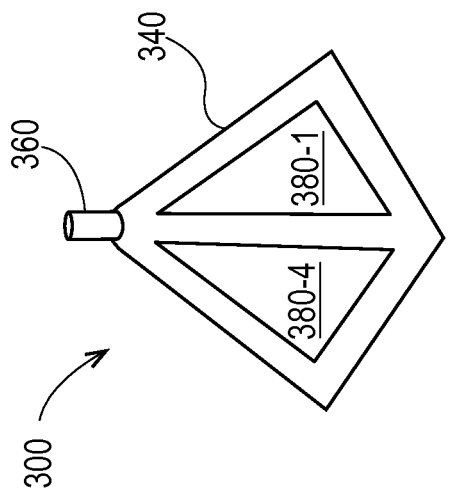
FIG. 3B illustrates a front view of the container of FIG. 3A.
Figure 3C:
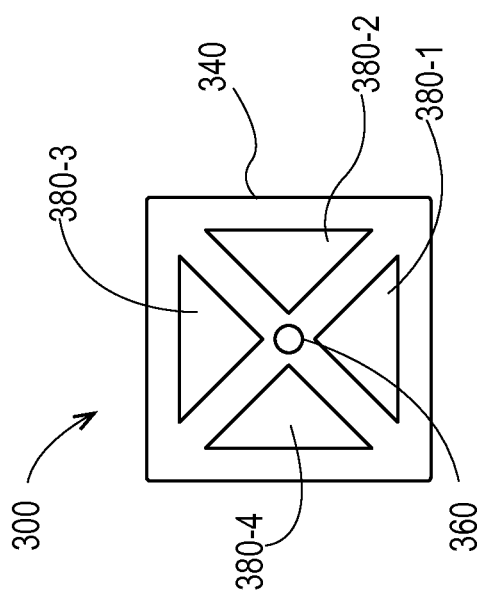
FIG. 3C illustrates a side view of the container of FIG. 3A.
Figure 3D:
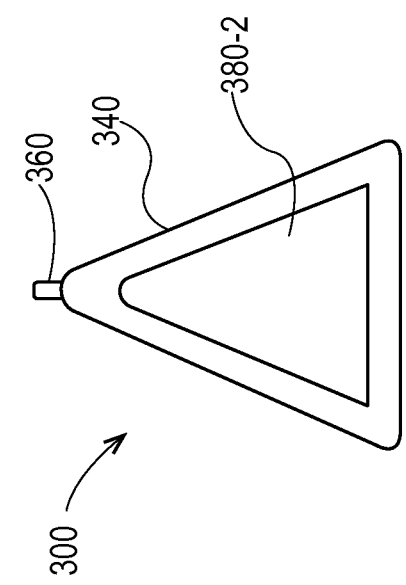
FIG. 3D illustrates an isometric view of the container of FIG. 3A.

FIG. 3A illustrates a front view of a stand up flexible container 300 having a structural support frame 340 that has an overall shape like a pyramid. In the embodiment of FIG. 3A, the pyramid shape is based on a four-sided pyramid, however, in various embodiments, the pyramid shape can be based on a pyramid with a different number of sides. The support frame 340 is formed by structural support members disposed along the edges of the pyramid shape and joined together at their ends. The structural support members define triangular shaped side panels 380-1, 380-2, 380-3, and 380-4, and a square shaped bottom panel (not shown). Each of the side panels 380-1, 380-2, 380-3, and 380-4 is about flat, however in various embodiments, part, parts, or about all, or approximately all, or substantially all, or nearly all, or all of any of the side panels can be approximately flat, substantially flat, nearly flat, or completely flat. The container 300 includes a dispenser 360, which is configured to dispense one or more fluent products from one or more product volumes disposed within the container 300. In the embodiment of FIG. 3A, the dispenser 360 is disposed at the apex of the pyramid shape, however, in various alternate embodiments, the dispenser 360 can be disposed anywhere else on the top, sides, or bottom, of the container 300. FIG. 3B illustrates a front view of the container 300 of FIG. 3A, including exemplary additional/alternate locations for a dispenser (shown as phantom lines), any of which can also apply to any side of the container. FIG. 3C illustrates a side view of the container 300 of FIG. 3A. FIG. 3D illustrates an isometric view of the container 300 of FIG. 3A.

FIG. 4A illustrates a front view of a stand up flexible container 400 having a structural support frame 440 that has an overall shape like a trigonal prism. In the embodiment of FIG. 4A, the prism shape is based on a triangle. The support frame 440 is formed by structural support members disposed along the edges of the prism shape and joined together at their ends. The structural support members define a triangular shaped top panel 480-t, rectangular shaped side panels 480-1, 480-2, and 480-3, and a triangular shaped bottom panel (not shown). Each of the side panels 480-1, 480-2, and 480-3 is about flat, however in various embodiments, part, parts, or about all, or approximately all, or substantially all, or nearly all, or all of the side panels can be approximately flat, substantially flat, nearly flat, or completely flat. The container 400 includes a dispenser 460, which is configured to dispense one or more fluent products from one or more product volumes disposed within the container 400. In the embodiment of FIG. 4A, the dispenser 460 is disposed in the center of the top panel 480-t, however, in various alternate embodiments, the dispenser 460 can be disposed anywhere else on the top, sides, or bottom, of the container 400. FIG. 4B illustrates a front view of the container 400 of FIG. 4A, including exemplary additional/alternate locations for a dispenser (shown as phantom lines), any of which can also apply to any side of the container 400. FIG. 4C illustrates a side view of the container 400 of FIG. 4A. FIG. 4D illustrates an isometric view of the container 400 of FIG. 4A.

FIG. 5A illustrates a front view of a stand up flexible container 500 having a structural support frame 540 that has an overall shape like a tetragonal prism. In the embodiment of FIG. 5A, the prism shape is based on a square. The support frame 540 is formed by structural support members disposed along the edges of the prism shape and joined together at their ends. The structural support members define a square shaped top panel 580-t, rectangular shaped side panels 580-1, 580-2, 580-3, and 580-4, and a square shaped bottom panel (not shown). Each of the side panels 580-1, 580-2, 580-3, and 580-4 is about flat, however in various embodiments, part, parts, or about all, or approximately all, or substantially all, or nearly all, or all of any of the side panels can be approximately flat, substantially flat, nearly flat, or completely flat. The container 500 includes a dispenser 560, which is configured to dispense one or more fluent products from one or more product volumes disposed within the container 500. In the embodiment of FIG. 5A, the dispenser 560 is disposed in the center of the top panel 580-t, however, in various alternate embodiments, the dispenser 560 can be disposed anywhere else on the top, sides, or bottom, of the container 500. FIG. 5B illustrates a front view of the container 500 of FIG. 5A, including exemplary additional/alternate locations for a dispenser (shown as phantom lines), any of which can also apply to any side of the container 500. FIG. 5C illustrates a side view of the container 500 of FIG. 5A. FIG. 5D illustrates an isometric view of the container 500 of FIG. 5A.

FIG. 6A illustrates a front view of a stand up flexible container 600 having a structural support frame 640 that has an overall shape like a pentagonal prism. In the embodiment of FIG. 6A, the prism shape is based on a pentagon. The support frame 640 is formed by structural support members disposed along the edges of the prism shape and joined together at their ends. The structural support members define a pentagon shaped top panel 680-t, rectangular shaped side panels 680-1, 680-2, 680-3, 680-4, and 680-5, and a pentagon shaped bottom panel (not shown). Each of the side panels 680-1, 680-2, 680-3, 680-4, and 680-5 is about flat, however in various embodiments, part, parts, or about all, or approximately all, or substantially all, or nearly all, or all of any of the side panels can be approximately flat, substantially flat, nearly flat, or completely flat. The container 600 includes a dispenser 660, which is configured to dispense one or more fluent products from one or more product volumes disposed within the container 600. In the embodiment of FIG. 6A, the dispenser 660 is disposed in the center of the top panel 680-t, however, in various alternate embodiments, the dispenser 660 can be disposed anywhere else on the top, sides, or bottom, of the container 600. FIG. 6B illustrates a front view of the container 600 of FIG. 6A, including exemplary additional/alternate locations for a dispenser (shown as phantom lines), any of which can also apply to any side of the container 600. FIG. 6C illustrates a side view of the container 600 of FIG. 6A. FIG. 6D illustrates an isometric view of the container 600 of FIG. 6A.

FIG. 7A illustrates a front view of a stand up flexible container 700 having a structural support frame 740 that has an overall shape like a cone. The support frame 740 is formed by curved structural support members disposed around the base of the cone and by straight structural support members extending linearly from the base to the apex, wherein the structural support members are joined together at their ends. The structural support members define curved somewhat triangular shaped side panels 780-1, 780-2, and 780-3, and a circular shaped bottom panel (not shown). Each of the side panels 780-1, 780-2, and 780-3, is curved, however in various embodiments, part, parts, or about all, or approximately all, or substantially all, or nearly all, or all of any of the side panels can be approximately flat, substantially flat, nearly flat, or completely flat. The container 700 includes a dispenser 760, which is configured to dispense one or more fluent products from one or more product volumes disposed within the container 700. In the embodiment of FIG. 7A, the dispenser 760 is disposed at the apex of the conical shape, however, in various alternate embodiments, the dispenser 760 can be disposed anywhere else on the top, sides, or bottom, of the container 700. FIG. 7B illustrates a front view of the container 700 of FIG. 7A. FIG. 7C illustrates a side view of the container 700 of FIG. 7A, including exemplary additional/alternate locations for a dispenser (shown as phantom lines), any of which can also apply to any side panel of the container 700. FIG. 7D illustrates an isometric view of the container 700 of FIG. 7A.

FIG. 8A illustrates a front view of a stand up flexible container 800 having a structural support frame 840 that has an overall shape like a cylinder. The support frame 840 is formed by curved structural support members disposed around the top and bottom of the cylinder and by straight structural support members extending linearly from the top to the bottom, wherein the structural support members are joined together at their ends. The structural support members define a circular shaped top panel **880-*t*, curved somewhat rectangular shaped side panels 880-1, 880-2, 880-3, and 880-4, and a circular shaped bottom panel (not shown). Each of the side panels 880-1, 880-2, 880-3, and 880-4, is curved, however in various embodiments, part, parts, or about all, or approximately all, or substantially all, or nearly all, or all of any of the side panels can be approximately flat, substantially flat, nearly flat, or completely flat. The container 800 includes a dispenser 860, which is configured to dispense one or more fluent products from one or more product volumes disposed within the container 800. In the embodiment of FIG. 8A, the dispenser 860 is disposed in the center of the top panel 880-*t*, however, in various alternate embodiments, the dispenser 860 can be disposed anywhere else on the top, sides, or bottom, of the container 800. FIG. 8B illustrates a front view of the container 800 of FIG. 8A, including exemplary additional/alternate locations for a dispenser (shown as phantom lines), any of which can also apply to any side panel of the container 800. FIG. 8C illustrates a side view of the container 800 of FIG. 8A. FIG. 8D illustrates an isometric view of the container 800** of FIG. 8A.

In additional embodiments, any stand up flexible container with a structural support frame, as disclosed herein, can be configured to have an overall shape that corresponds with any other known three-dimensional shape, including any kind of polyhedron, any kind of prismatoid, and any kind of prism (including right prisms and uniform prisms).

Figures 9A, 9B:
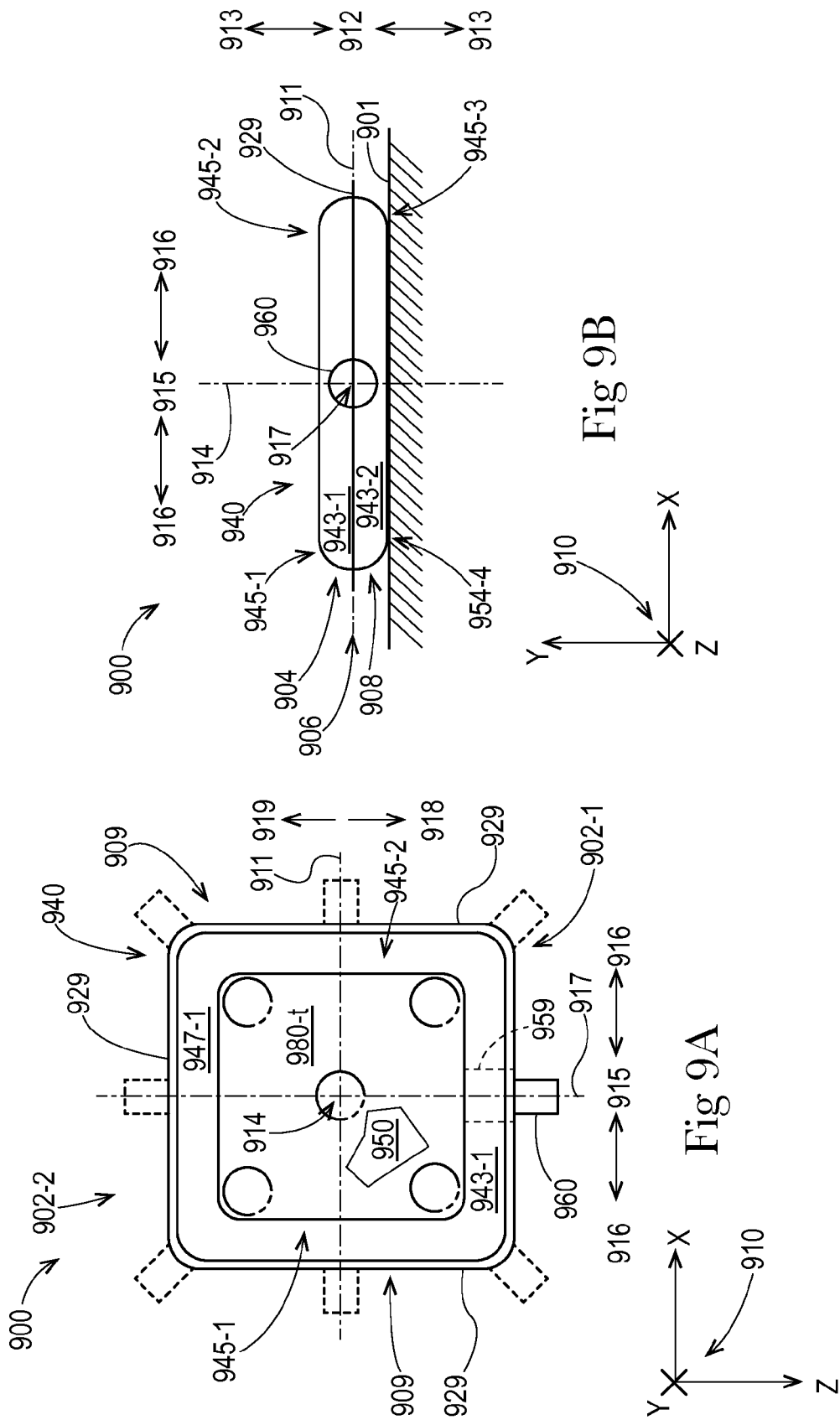
FIG. 9A illustrates a top view of an embodiment of a self-supporting flexible container, having an overall shape like a square.
FIG. 9B illustrates an end view of the flexible container of FIG. 9A.

FIG. 9A illustrates a top view of an embodiment of a self-supporting flexible container 900, having an overall shape like a square. FIG. 9B illustrates an end view of the flexible container 900 of FIG. 9A. The container 900 is resting on a horizontal support surface 901.

In FIG. 9B, a coordinate system 910, provides lines of reference for referring to directions in the figure. The coordinate system 910 is a three-dimensional Cartesian coordinate system, with an X-axis, a Y-axis, and a Z-axis. The X-axis and the Z-axis are parallel with the horizontal support surface 901 and the Y-axis is perpendicular to the horizontal support surface 901.

FIG. 9A also includes other lines of reference, for referring to directions and locations with respect to the container 100. A lateral centerline 911 runs parallel to the X-axis. An XY plane at the lateral centerline 911 separates the container 100 into a front half and a back half. An XZ plane at the lateral centerline 911 separates the container 100 into an upper half and a lower half. A longitudinal centerline 914 runs parallel to the Y-axis. A YZ plane at the longitudinal centerline 914 separates the container 900 into a left half and a right half. A third centerline 917 runs parallel to the Z-axis. The lateral centerline 911, the longitudinal centerline 914, and the third centerline 917 all intersect at a center of the container 900. These terms for direction, orientation, measurement, and disposition, in the embodiment of FIGS. 9A-9B are the same as the like-numbered terms in the embodiment of FIGS. 1A-1D.

The container 900 includes a top 904, a middle 906, and a bottom 908, the front 902-1, the back 902-2, and left and right sides 909. In the embodiment of FIGS. 9A-9B, the upper half and the lower half of the container are joined together at a seal 929, which extends around the outer periphery of the container 900. The bottom of the container 900 is configured in the same way as the top of the container 900.

The container 900 includes a structural support frame 940, a product volume 950, a dispenser 960, a top panel **980-*t* and a bottom panel (not shown). A portion of the top panel 980-*t* is illustrated as broken away, in order to show the product volume 950. The product volume 950 is configured to contain one or more fluent products. The dispenser 960 allows the container 900 to dispense these fluent product(s) from the product volume 950 through a flow channel 959 then through the dispenser 960, to the environment outside of the container 900. The structural support frame 940 supports the mass of fluent product(s) in the product volume 950. The top panel 980-*t* and the bottom panel are relatively flat surfaces, overlaying the product volume 950**, and are suitable for displaying any kind of indicia.

The structural support frame 940 is formed by a plurality of structural support members. The structural support frame 940 includes front structural support members 943-1 and 943-2, intermediate structural support members 945-1, 945-2, 945-3, and 945-4, as well as back structural support members 947-1 and 947-2. Overall, each of the structural support members in the container 900 is oriented horizontally. And, each of the structural support members in the container 900 has a cross-sectional area that is substantially uniform along its length, although in various embodiments, this cross-sectional area can vary.

Upper structural support members 943-1, 945-1, 945-2, and 947-1 are disposed in an upper part of the middle 906 and in the top 904, while lower structural support members 943-2, 945-4, 945-3, and 947-2 are disposed in a lower part of the middle 906 and in the bottom 908. The upper structural support members 943-1, 945-1, 945-2, and 947-1 are disposed above and adjacent to the lower structural support members 943-2, 945-4, 945-3, and 947-2, respectively.

In various embodiments, adjacent upper and lower structural support members can be in contact with each other at one or more relatively smaller locations and/or at one or more relatively larger locations, along part, or parts, or about all, or approximately all, or substantially all, or nearly all, or all of their overall lengths, so long as there is a gap in the contact for the flow channel 959, between the structural support members 943-1 and 943-2. In the embodiment of FIGS. 9A-9B, the upper and lower structural support members are not directly connected to each other. However, in various alternate embodiments, adjacent upper and lower structural support members can be directly connected and/or joined together along part, or parts, or about all, or approximately all, or substantially all, or nearly all, or all of their overall lengths.

The ends of structural support members 943-1, 945-2, 947-1, and 945-1 are joined together to form a top square that is outward from and surrounding the product volume 950, and the ends of structural support members 943-2, 945-3, 947-2, and 945-4 are also joined together to form a bottom square that is outward from and surrounding the product volume 950. In the structural support frame 940, the ends of the structural support members, which are joined together, are directly connected, all around the periphery of their walls. However, in various alternative embodiments, any of the structural support members of the embodiment of FIGS. 9A-9B can be joined together in any way described herein or known in the art.

In alternative embodiments of the structural support frame 940, adjacent structural support members can be combined into a single structural support member, wherein the combined structural support member can effectively substitute for the adjacent structural support members, as their functions and connections are described herein. In other alternative embodiments of the structural support frame 940, one or more additional structural support members can be added to the structural support members in the structural support frame 940, wherein the expanded structural support frame can effectively substitute for the structural support frame 940, as its functions and connections are described herein.

FIGS. 10A-11B illustrate embodiments of self-supporting flexible containers (that are not stand up containers) having various overall shapes. Any of the embodiments of FIGS. 10A-11B can be configured according to any of the embodiments disclosed herein, including the embodiments of FIGS. 9A-9B. Any of the elements (e.g. structural support frames, structural support members, panels, dispensers, etc.) of the embodiments of FIGS. 10A-11B, can be configured according to any of the embodiments disclosed herein. While each of the embodiments of FIGS. 10A-11B illustrates a container with one dispenser, in various embodiments, each container can include multiple dispensers, according to any embodiment described herein. Part, parts, or about all, or approximately all, or substantially all, or nearly all, or all of each of the panels in the embodiments of FIGS. 10A-11B is suitable to display any kind of indicia. Each of the top and bottom panels in the embodiments of FIGS. 10A-11B is configured to be a nonstructural panel, overlaying product volume(s) disposed within the flexible container, however, in various embodiments, one or more of any kind of decorative or structural element (such as a rib, protruding from an outer surface) can be joined to part, parts, or about all, or approximately all, or substantially all, or nearly all, or all of any of these panels. For clarity, not all structural details of these flexible containers are shown in FIGS. 10A-11B, however any of the embodiments of FIGS. 10A-11B can be configured to include any structure or feature for flexible containers, disclosed herein.

FIG. 10A illustrates a top view of an embodiment of a self-supporting flexible container 1000 (that is not a stand up flexible container) having a product volume 1050 and an overall shape like a triangle. However, in various embodiments, a self-supporting flexible container can have an overall shape like a polygon having any number of sides. The support frame 1040 is formed by structural support members disposed along the edges of the triangular shape and joined together at their ends. The structural support members define a triangular shaped top panel 1080-t, and a triangular shaped bottom panel (not shown). The top panel 1080-t and the bottom panel are about flat, however in various embodiments, part, parts, or about all, or approximately all, or substantially all, or nearly all, or all of any of the side panels can be approximately flat, substantially flat, nearly flat, or completely flat. The container 1000 includes a dispenser 1060, which is configured to dispense one or more fluent products from one or more product volumes disposed within the container 1000. In the embodiment of FIG. 10A, the dispenser 1060 is disposed in the center of the front, however, in various alternate embodiments, the dispenser 1060 can be disposed anywhere else on the top, sides, or bottom, of the container 1000. FIG. 10A includes exemplary additional/alternate locations for a dispenser (shown as phantom lines). FIG. 10B illustrates an end view of the flexible container 1000 of FIG. 10B, resting on a horizontal support surface 1001.

FIG. 11A illustrates a top view of an embodiment of a self-supporting flexible container 1100 (that is not a stand up flexible container) having a product volume 1150 and an overall shape like a circle. The support frame 1140 is formed by structural support members disposed around the circumference of the circular shape and joined together at their ends. The structural support members define a circular shaped top panel 1180-t, and a circular shaped bottom panel (not shown). The top panel 1180-t and the bottom panel are about flat, however in various embodiments, part, parts, or about all, or approximately all, or substantially all, or nearly all, or all of any of the side panels can be approximately flat, substantially flat, nearly flat, or completely flat. The container 1100 includes a dispenser 1160, which is configured to dispense one or more fluent products from one or more product volumes disposed within the container 1100. In the embodiment of FIG. 11A, the dispenser 1160 is disposed in the center of the front, however, in various alternate embodiments, the dispenser 1160 can be disposed anywhere else on the top, sides, or bottom, of the container 1100. FIG. 11A includes exemplary additional/alternate locations for a dispenser (shown as phantom lines). FIG. 11B illustrates an end view of the flexible container 1100 of FIG. 10B, resting on a horizontal support surface 1101.

In additional embodiments, any self-supporting container with a structural support frame, as disclosed herein, can be configured to have an overall shape that corresponds with any other known three-dimensional shape. For example, any self-supporting container with a structural support frame, as disclosed herein, can be configured to have an overall shape (when observed from a top view) that corresponds with a rectangle, a polygon (having any number of sides), an oval, an ellipse, a star, or any other shape, or combinations of any of these.

Figure 12A:
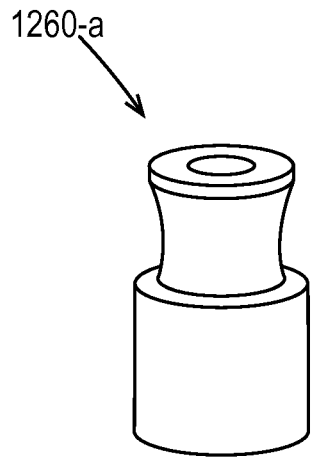
FIG. 12A illustrates an isometric view of push-pull type dispenser.
Figure 12B:
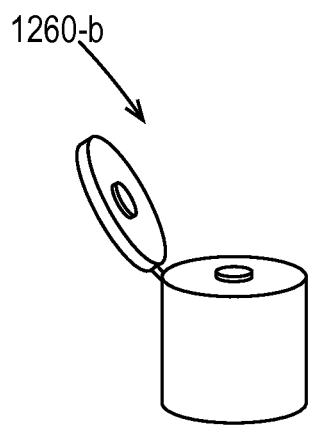
FIG. 12B illustrates an isometric view of dispenser with a flip-top cap.
Figure 12C:
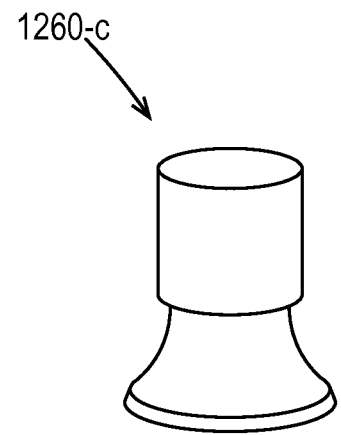
FIG. 12C illustrates an isometric view of dispenser with a screw-on cap.
Figure 12D:
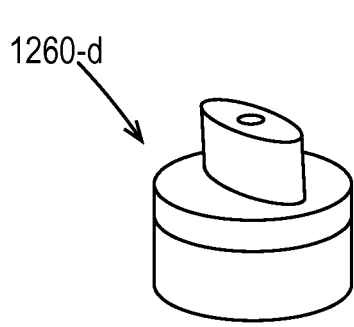
FIG. 12D illustrates an isometric view of rotatable type dispenser.
Figure 12E:
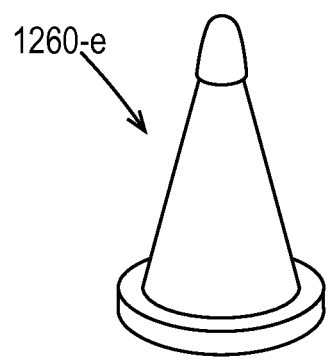
FIG. 12E illustrates an isometric view of nozzle type dispenser with a cap.

FIGS. 12A-14C illustrate various exemplary dispensers, which can be used with the flexible containers disclosed herein. FIG. 12A illustrates an isometric view of push-pull type dispenser 1260-a. FIG. 12B illustrates an isometric view of dispenser with a flip-top cap 1260-b. FIG. 12C illustrates an isometric view of dispenser with a screw-on cap 1260-c. FIG. 12D illustrates an isometric view of rotatable type dispenser 1260-d. FIG. 12E illustrates an isometric view of nozzle type dispenser with a cap 1260-d. FIG. 13A illustrates an isometric view of straw dispenser 1360-a. FIG. 13B illustrates an isometric view of straw dispenser with a lid 1360-b. FIG. 13C illustrates an isometric view of flip up straw dispenser 1360-c. FIG. 13D illustrates an isometric view of straw dispenser with bite valve 1360-d. FIG. 14A illustrates an isometric view of pump type dispenser 1460-a, which can, in various embodiments be a foaming pump type dispenser. FIG. 14B illustrates an isometric view of pump spray type dispenser 1460-b. FIG. 14C illustrates an isometric view of trigger spray type dispenser 1460-c.

Figure 15:
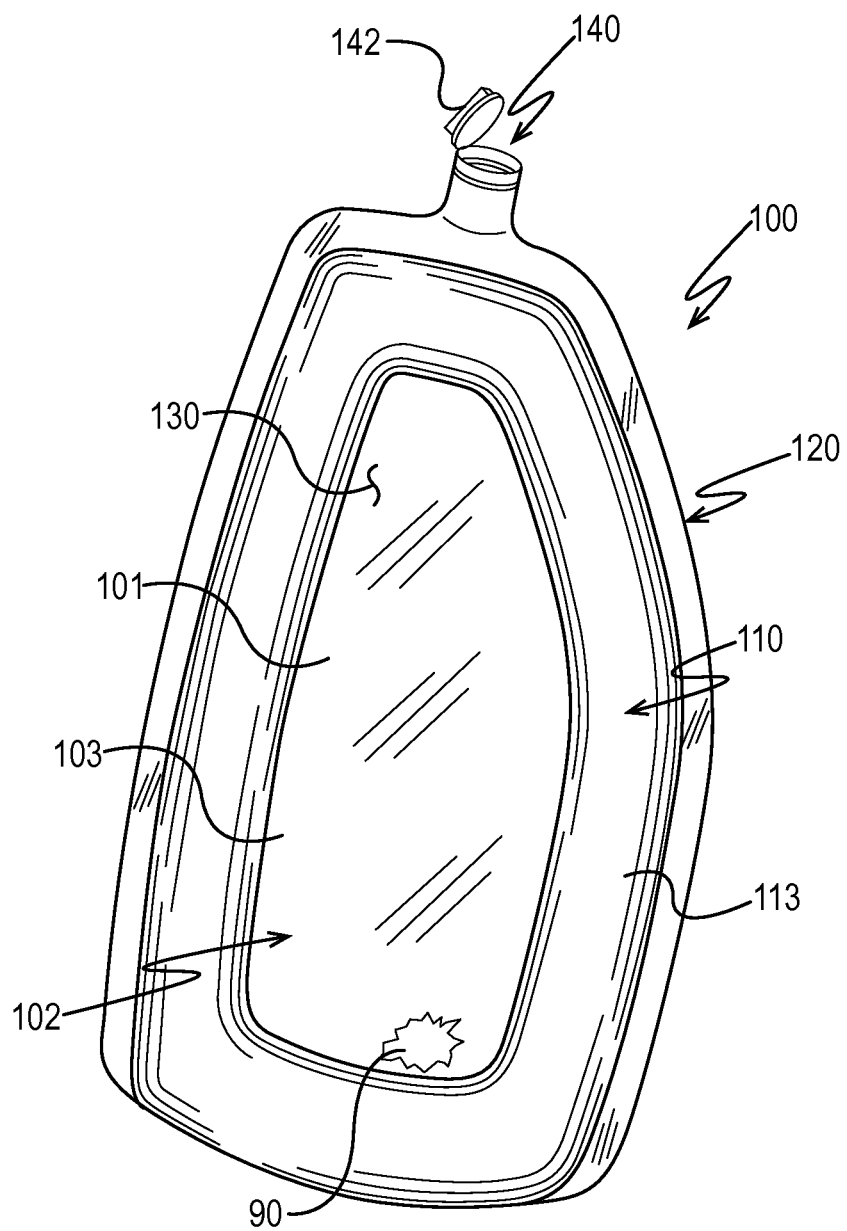
FIG. 15 schematically depicts a front view of a film-based container according to one or more embodiments shown or described herein.

Referring to the drawings in detail where like numerals indicate the same element throughout the views, FIG. 15 generally depicts a film-based container for dispensing flowable products. The container may include at least two sheet assembly portions that are assembled to form a product receiving volume. Each of the sheet assembly portions may include a flexible outer sheet and a flexible inner sheet joined to the flexible outer sheet. At least part of the flexible outer sheets and the flexible inner sheets form an expandable chamber. When a material is introduced to the expandable chambers to increase the expanded chamber volume, the expandable chambers provide structure to the container. The container may take a variety of forms including tubes, cartons, thermoformed trays, blister packs, and the like for containing flowable materials. The containers will be described in more detail herein with specific reference to the appended drawings.

Referring now to FIG. 15, a front view of the container 100 is depicted. The container 100 includes a first sheet assembly portion 110 and a second sheet assembly portion 120. The first sheet assembly portion 110 and the second sheet assembly portion 120 are joined to one another to form a product receiving volume 130. Flowable product 90, for example, liquids or flowable solids, may be introduced to the product receiving volume 130. In some embodiments, the flowable product 90 is dispensed from the container 100 by compressing the container 100, thereby reducing the internal volume of the product receiving volume 130, and pressurizing the flowable product 90. The pressurized flowable product 90 is directed along a product dispensing path 132 (see FIG. 22) that is in fluid communication with the product receiving volume 130 and a product dispensing opening 140. In other embodiments, the flowable product 90 is dispensed from the container 100 by a user inverting the container 100.

Figure 16:
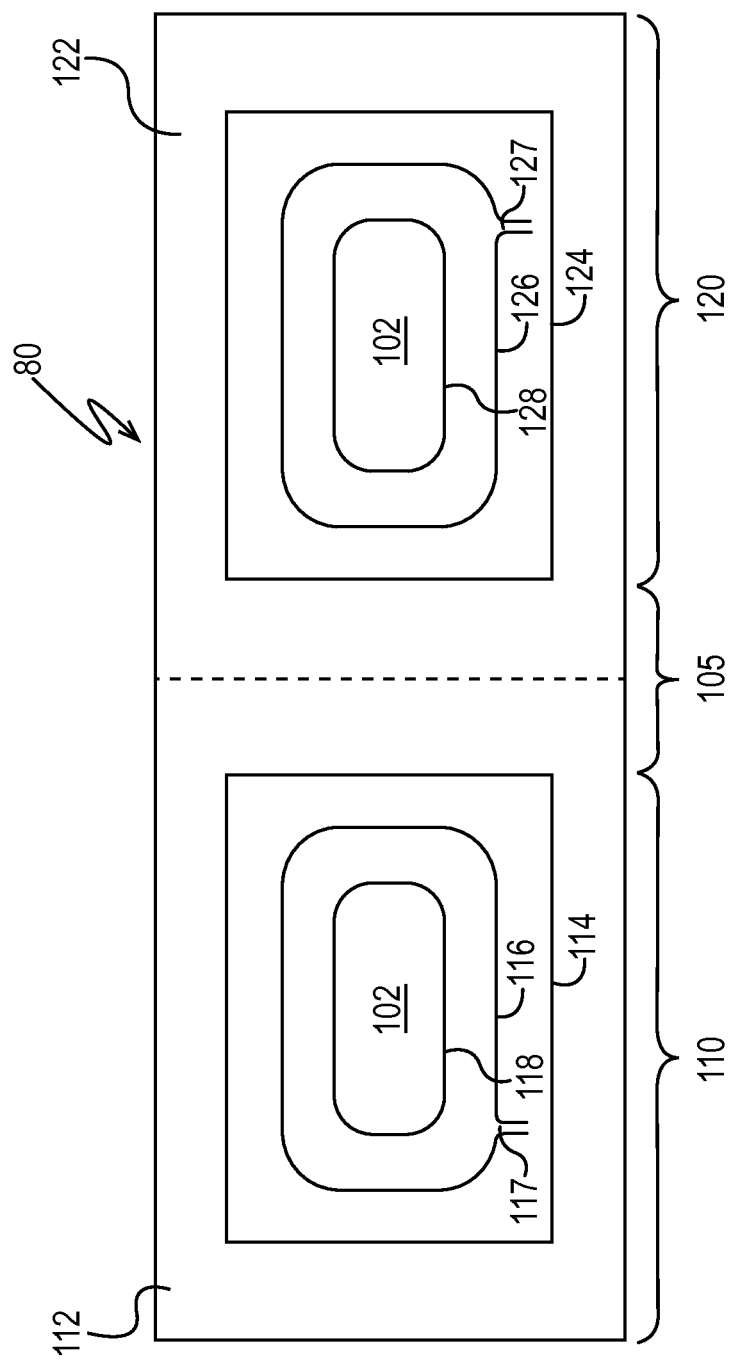
FIG. 16 schematically depicts a top view of an unfurled package preform for a film-based container according to one or more embodiments shown or described herein.

Referring now to FIGS. 16-22, one embodiment of the container 100 is depicted in an assembly process. Referring to FIG. 16, the container begins as a package preform 80. The package preform 80 includes first sheet assembly portion 110 and a second sheet assembly portion 120. The first sheet assembly portion 110 includes a flexible outer sheet 112 and a flexible inner sheet 114. The flexible inner and outer sheets 112, 114 of the first sheet assembly portion 110 are joined to one another at an interior seam 118 and an exterior seam 116. One or more of the interior seam 118 or the exterior seam 116 may include a seam opening 117. The seam opening 117 interrupts the interior seam 118 and/or exterior seam 116 from forming a sealed volume between the flexible outer and inner sheets 112, 114. As depicted in FIG. 16, the seam opening 117 may take the form of a narrow, elongated channel. Other embodiments of the seam opening 117 are envisioned, as described in further detail below. The interior seam 118 also defines an interior panel 102 of the first sheet assembly portion 110.

Similarly to the first sheet assembly portion 110, the second sheet assembly portion 120 includes a flexible outer sheet 122 and a flexible inner sheet 124. The flexible inner and outer sheets 124, 122 of the second sheet assembly portion 120 are joined to one another at an interior seam 128 and an exterior seam 126. One or more of the interior seam 128 or the exterior seam 126 may include a seam opening 127. The seam opening 127 interrupts the interior seam 128 and/or exterior seam 126 from forming a sealed volume between the flexible outer and inner sheets 122, 124. The interior seam 128 also defines an interior panel 102 of the second sheet assembly portions 120.

In the embodiment depicted in FIGS. 16-22, the interior panel 102 of the first and second sheet assembly portions 110, 120 is a multi-wall panel 101 that is formed by the flexible inner sheets 114, 124 and flexible outer sheets 112, 122. In this embodiment, the flexible outer sheets 112, 122 are disconnected from the flexible inner sheets 114, 124 at positions along the interior panel 102 inside of the interior seams 118, 128. Further, the flexible outer sheet 112 and the flexible inner sheet 114 of the first sheet assembly portion 110 contact one another along substantially all of the interior panel 102. Similarly, the flexible outer sheet 122 and the flexible inner sheet 124 of the second sheet assembly portion 120 contact one another along substantially all of the interior panel 102. In some embodiments, the interior panel 102 of the first and second sheet assembly portions 110, 120 may be free from expanded chambers, and are thus independent of expanded chambers. Other configurations of the interior panels 102 are contemplated, as will be discussed below.

In some embodiments a material may be placed between the flexible inner and outer sheets 112, 114 that form the interior panel 102. In some embodiments, the material may be a flowable substance that is present for consumer use or for decorative purposes. In other embodiments, articles, for example and without limitation, wipes or other dry or wetted substrates may be present between the flexible inner and outer sheets 112, 114. Separate dispensing structures would also be present for embodiments having the articles positioned between the flexible inner and outer sheets 112, 114.

The flexible outer sheets 112, 122 and the flexible inner sheets 114, 124 may be made from a variety of materials that will contain a flowable product that will be stored by the assembled container 100. Such materials may include, for example and without limitation, polyethylene, polyester, polyethylene terephthalate, nylon, polyproplene, polyvinyl chloride, and the like. The flexible outer sheets 112, 122 and the flexible inner sheets 114, 124 may be coated with a dissimilar material. The flexible outer sheets 112, 122 and the flexible inner sheets 114, 124 may be a laminate construction of a plurality of layers of dissimilar films, such that the flexible outer sheets 112, 122 and/or the flexible inner sheets 114, 124 are a composite construction. Examples of such coatings include, without limitation, polymer coatings, metalized coatings, ceramic coatings, and/or diamond coatings. Such coating materials and/or laminate construction may reduce permeability of the flowable product 90 stored in the container 100 and/or material in the expanded chambers 113, 123. The flexible outer sheets 112, 122 and the flexible inner sheets 114, 124 may be plastic film having a thickness such that the flexible outer sheets 112, 122 and the flexible inner sheets 114, 124 are compliant and readily deformable by an application of force by a human. In some embodiments, the thicknesses of the flexible outer sheets 112, 122 and the flexible inner sheets 114, 124 may be approximately equivalent. In other embodiments, the thickness of the flexible outer sheets 112, 122 may be greater than or less than the thickness of the flexible inner sheets 114, 124. In yet other embodiments, the thickness of the flexible outer and inner sheets 112, 114 of the first sheet assembly portion 110 may be greater than or less than the thickness of the flexible outer and inner sheets 122, 124 of the second sheet assembly portion 120.

In some embodiments, the materials of the flexible outer sheets 112, 122 and flexible inner sheets 114, 124 may be film laminates that include multiple layers of different types of materials to provide desired properties such as strength, flexibility, the ability to be joined, imperviousness to the flowable product contained in the assembled container 100, and the ability to accept printing and/or labeling. In some embodiments, the film materials may have a thickness that is less than about 200 microns (0.0078 inches). One example of a film laminate includes a tri-layer low-density polyethylene (LDPE)/Nylon/LDPE with a total thickness of 0.003 inches.

Other types of laminate structures may be suitable for certain embodiments. For example, laminates created from co-extrusion, or coat extrusion, of multiple layers or laminates produced from adhesive lamination of different layers. Furthermore, coated paper film materials may be used for some embodiments. Additionally, laminating nonwoven or woven materials to film materials may be used in certain embodiments. Other examples of structures which may be used in certain embodiments include: 48ga polyethylene terephthalate (PET)/ink/adh/3.5 mil ethylene vinyl alcohol (EVOH)-Nylon film; 48ga PET/Ink/adh/48ga MET PET/adh/3 mil PE; 48ga PET/Ink/adh/0.00035 foil/adh/3 mil PE; 48ga PET/Ink/adh/48ga SiOx PET/adh/3 mil PE; 3.5mil EVOH/PE film; 48ga PET/adh/3.5 mil EVOH film; and 48ga MET PET/adh/3mil PE.

Materials of the flexible outer sheets 112, 122 and flexible inner sheets 114, 124 may be made from sustainable, bio-sourced, recycled, recyclable, and/or biodegradable materials. As used herein, "sustainable" refers to a material having an improvement of greater than 10% in some aspect of its Life Cycle Assessment or Life Cycle Inventory, when compared to the relevant virgin, petroleum-based material that would otherwise have been used for manufacture. As used herein, "Life Cycle Assessment" (LCA) or "Life Cycle Inventory" (LCI) refers to the investigation and evaluation of the environmental impacts of a given product or service caused or necessitated by its existence. The LCA or LCI can involve a "cradle-to-grave" analysis, which refers to the full Life Cycle Assessment or Life Cycle Inventory from manufacture ("cradle") to use phase and disposal phase ("grave"). For example, high density polyethylene (HDPE) containers can be recycled into HDPE resin pellets, and then used to form containers, films, or injection molded articles, for example, saving a significant amount of fossil-fuel energy. At the end of its life, the polyethylene can be disposed of by incineration, for example. All inputs and outputs are considered for all the phases of the life cycle. As used herein, "End of Life" (EoL) scenario refers to the disposal phase of the LCA or LCI. For example, polyethylene can be recycled, incinerated for energy (e.g., 1 kilogram of polyethylene produces as much energy as 1 kilogram of diesel oil), chemically transformed to other products, and recovered mechanically. Alternatively, LCA or LCI can involve a "cradle-to-gate" analysis, which refers to an assessment of a partial product life cycle from manufacture ("cradle") to the factory gate (i.e., before it is transported to the customer) as a pellet. Alternatively, this second type of analysis is also termed "cradle-to-cradle". The film-based containers of the present disclosure may also be desirable because any virgin polymer used in the manufacture of the container may be derived from a renewable resource, or may be made from petro-based polymers, recycled polymers (post consumer or industrially recycled, where both petro- and renewable polymers are included), or a combination thereof.

As used herein, the prefix "bio-" is used to designate a material that has been derived from a renewable resource. As used herein, a "renewable resource" is one that is produced by a natural process at a rate comparable to its rate of consumption (e.g., within a 100 year time frame). The resource can be replenished naturally, or via agricultural techniques. Nonlimiting examples of renewable resources include plants (e.g., sugar cane, beets, corn, potatoes, citrus fruit, woody plants, lignocellulosics, hemicellulosics, cellulosic waste), animals, fish, bacteria, fungi, and forestry products. These resources can be naturally occurring, hybrids, or genetically engineered organisms. Natural resources such as crude oil, coal, natural gas, and peat, which take longer than 100 years to form, are not considered renewable resources. Because at least part of the flexible barrier of containers of the present disclosure is derived from a renewable resource, which can sequester carbon dioxide, use of the flexible barrier may reduce global warming potential and fossil fuel consumption. For example, some LCA or LCI studies on HDPE resin have shown that about one ton of polyethylene made from virgin, petroleum-based sources results in the emission of up to about 2.5 tons of carbon dioxide to the environment. Because sugar cane, for example, takes up carbon dioxide during growth, one ton of polyethylene made from sugar cane removes up to about 2.5 tons of carbon dioxide from the environment. Thus, use of about one ton of polyethylene from a renewable resource, such as sugar cane, results in a decrease of up to about 5 tons of environmental carbon dioxide versus using one ton of polyethylene derived from petroleum-based resources.

Nonlimiting examples of renewable polymers include polymers directly produced from organisms, such as polyhydroxyalkanoates (e.g., poly(beta-hydroxyalkanoate), poly(3-hydroxybutyrate-co-3-hydroxyvalerate, NODAX™), and bacterial cellulose; polymers extracted from plants and biomass, such as polysaccharides and derivatives thereof (e.g., gums, cellulose, cellulose esters, chitin, chitosan, starch, chemically modified starch), proteins (e.g., zein, whey, gluten, collagen), lipids, lignins, and natural rubber; and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The film-based containers described herein may further be desirable because their properties can be tuned by varying the amount of bio-material and recycled material (post consumer recycled or industrially recycled) or reground material used to form the components of the flexible barrier container, or by the introduction of additives, fillers, pigments, and/or dyes. For example, increasing the amount of bio-material at the expense of recycled material (when comparing like-for-like, e.g., homopolymer versus copolymer), tends to result in containers with improved mechanical properties. Increasing the amount of specific types of recycled material can decrease the overall costs of producing the containers, but at the expense of the desirable mechanical properties of the container because recycled material tends to be more brittle with a lower modulus, resulting from a lower average molecular weight of the recycled material.

A suitable method to assess materials derived from renewable resources is through ASTM D6866, which allows the determination of the biobased content of materials using radiocarbon analysis by accelerator mass spectrometry, liquid scintillation counting, and isotope mass spectrometry. Other techniques for assessing the biobased content of materials are described in U.S. Pat. Nos. 3,885,155, 4,427,884, 4,973,841, 5,438,194, and 5,661,299, WO 2009/155086, each incorporated herein by reference.

The flexible outer and inner sheets 112, 122, 114, 124 may be provided in a variety of colors and designs, as to appeal to a consumer interested in purchasing the product held in the container 100. Additionally, materials forming the flexible outer and inner sheets 112, 122, 114, 124 may be pigmented, colored, transparent, semitransparent, or opaque. Such optical characteristics may be modified through the use of additives or masterbatch during the film making process. Additionally, other decoration techniques may be present on any surface of the sheets such as lenses, holograms, security features, cold foils, hot foils, embossing, metallic inks, transfer printing, varnishes, coatings, and the like. The flexible outer and inner sheets 112, 122, 114, 124 may include indicia such that a consumer interested in purchasing the product can readily identify the product held in the container 100, along with the brand name of the producer of the product held in the container 100. The indicia may contain decorative elements. The indicia may also provide comment or instruction on use of the product and/or container 100. In particular, the interior panel 102 of the first and second sheet assembly portions 110, 120 may be generally flat and free from interruptions. Accordingly, a variety of branded indicia may be applied to the interior panel 102 of the container 100 for viewing by a consumer.

Flexible film materials forming the flexible outer and inner sheets 112, 122, 114, 124 may be colored or pigmented. Flexible film materials may also pre-printed with artwork, color, and or indicia before forming a package preform 80 using any printing methods (gravure, flexographic, screen, ink jet, laser jet, and the like) Additionally, assembled container 100 may be printed after forming using digital printing. Any and all surfaces of the flexible outer and inner sheets 112, 122, 114, 124 may be printed or left unprinted. Additionally, as is conventionally known, certain laminates of a laminated film forming the flexible outer and inner sheets 112, 122, 114, 124 may be surface printed or reverse printed. In some embodiments, functional inks are printed on the flexible materials. Functional inks are meant to include inks providing decoration benefits, texture coatings, or other benefits including, for example and without limitation, printed sensors, printed electronics, printed RFID, and light-sensitive dies. Additionally, or in the alternative, labels, for example and without limitation, flexible labeling, or heat shrink sleeves may be applied to the assembled containers 100 to provide the desired visual appearance of the container 100. Because films can be printed flat and then formed into three dimensional objects in certain embodiments, artwork conforms precisely to the container 100.

As discussed hereinabove, the flexible inner sheets 114, 124 are joined to the flexible outer sheets 112, 122 at interior seams 118, 128 and exterior seams 116, 126. The interior and exterior seams 118, 128, 116, 126 may be formed through a variety of conventional attachment, joining or sealing methods including, for example and without limitation, heat sealing using, for example, conductive sealing, impulse sealing, ultrasonic sealing, or welding, mechanical crimping, sewing, and adhering after application of an adhesive.

Figure 17:
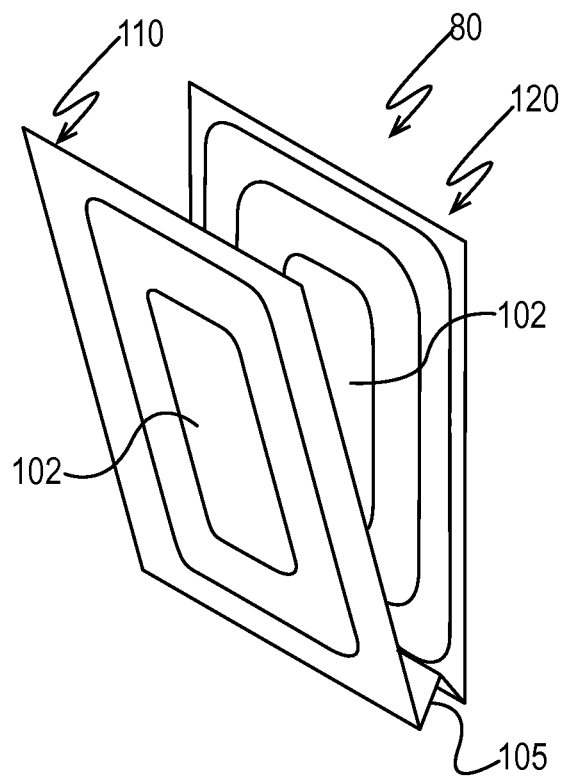
FIG. 17 schematically depicts a perspective view of an intermediately folded package preform for a film-based container according to one or more embodiments shown or described herein.

As depicted in FIGS. 16-17, the first and second sheet assembly portions 110, 120 are formed using a continuous sheet of material defining the flexible outer sheet 112, 122. However, it should be understood that the flexible outer sheets 112, 122 of the first and second sheet assembly portions 110, 120 may be discrete, non-continuous components (i.e., components that are independent of one another) that are joined to one another during the assembly process.

Referring now to FIG. 17, the package preform 80 is depicted in the assembly operation where the first and second sheet assembly portions 110, 120 are "bookmatch" to one another, transitioning the package preform 80 from a flat laminar assembly, as depicted in FIG. 16. As depicted in FIG. 17, the first and second sheet assembly portions 110, 120 are brought towards one another such that the flexible outer sheets 112, 122 of the first and second sheet assembly portions 110, 120 may be joined to one another. In the embodiment depicted in FIGS. 16-22, the flexible outer sheets 112, 122 of the first and second sheet assembly portions 110, 120 are joined to one another at a position outside of the exterior seams 116, 126 of the respective first and second sheet assembly portions 110, 120. Further, a gusset panel portion 105 formed in the flexible outer sheets 112, 122 between the first and second sheet assembly portions 110, 120 is arranged such that the gusset panel portion 105 is positioned interior to the first and second sheet assembly portions 110, 120. In other embodiments of the package preform, for example the embodiment depicted in FIG. 38, the flexible inner sheets 114, 124 may be formed from a continuous sheet of material. The additional material joining the flexible inner sheets 114, 124 is incorporated into the gusset panel portion 105 when the container 100 is formed.

It should be understood that some embodiments of the container 100 may have the first and second assembly sheet portions 110, 120 arranged in a skewed alignment, such that the first and second sheet assembly portions 110, 120 are not symmetrical relative to one another. Containers 100 having first and second sheet portions 110, 120 arranged in skewed alignment may be referred to as "asymmetrical." Such asymmetrical containers 100 may have three-dimensional shapes that are contoured over a characteristic length-scale (e.g., the container 100 includes a contour that extends along a substantial portion of the height, width, or thickness of the container 100).

Referring again to FIG. 17, the gusset panel portion 105 may increase the product receiving volume 130 of the container 100, as described below. The gusset panel portion 105 may also stabilize the container 100. While specific reference has been made herein to the position of the gusset panel portion 105 relative to the position of the first and second sheet assembly portions 110, 120, it should be understood that any such gusset panel portion 105 may be positioned at any location of the container 100 without departing from the present disclosure. It should be understood that gusset panels, pleats, or tucks may be incorporated into the container 100 in a variety of locations to form a particular design. Such gusset panels, pleats, or tucks may be positioned along the sides or top of the container 100.

Figure 18:
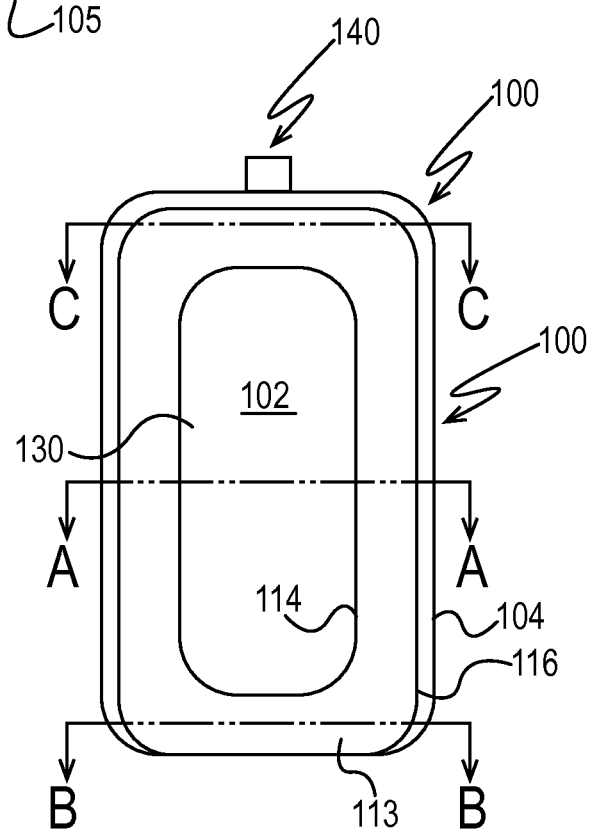
FIG. 18 schematically depicts a front view of a film-based container according to one or more embodiments shown or described herein.

Referring now to FIG. 18, an enclosure seam 104 is positioned around the outside of the exterior seam 116 of the first sheet assembly portion 110 (e.g., and around the exterior seam 126 of the second sheet assembly portion 120). The enclosure seam 104 joins the first and second sheet assembly portions 110, 120 to one another, thereby forming the container 100 having a product receiving volume 130. The product receiving volume 130 is therefore enclosed by the enclosure seam 104 between the flexible outer sheets 112, 122 and the gusset panel portion 105. The container 100 further includes a product dispensing opening 140, as will be discussed in greater detail below, in fluid communication with the product receiving volume 130 and the environment, thereby allowing filling and dispensing of a flowable product to and from the product receiving volume 130 of the container 100.

Figure 19:
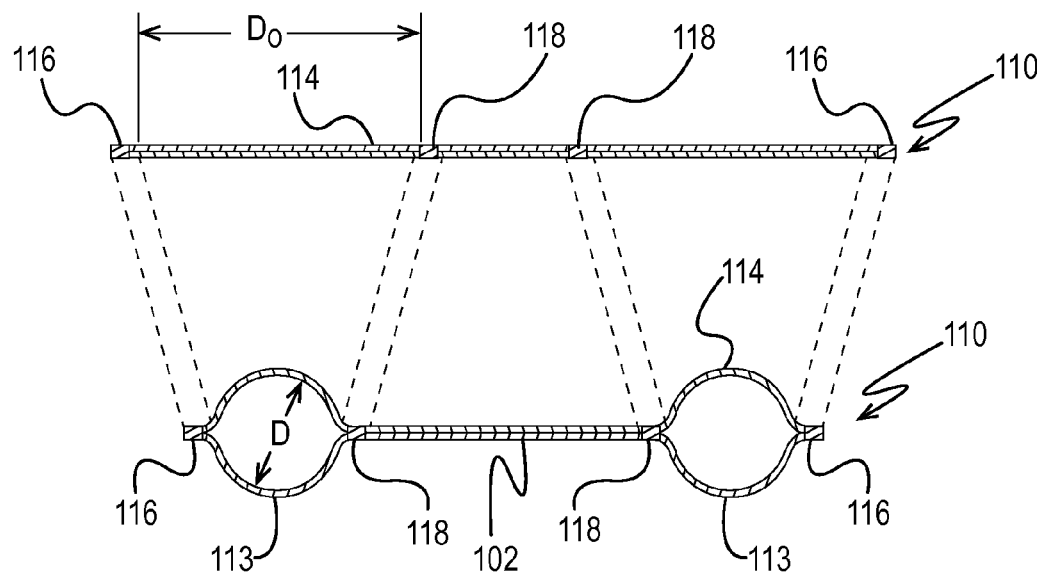
FIG. 19 schematically depicts a top sectional view of a first sheet assembly portion of the container shown along line A-A of FIG. 18 undergoing an assembly operation according to one or more embodiments shown or described herein.
Figure 20:
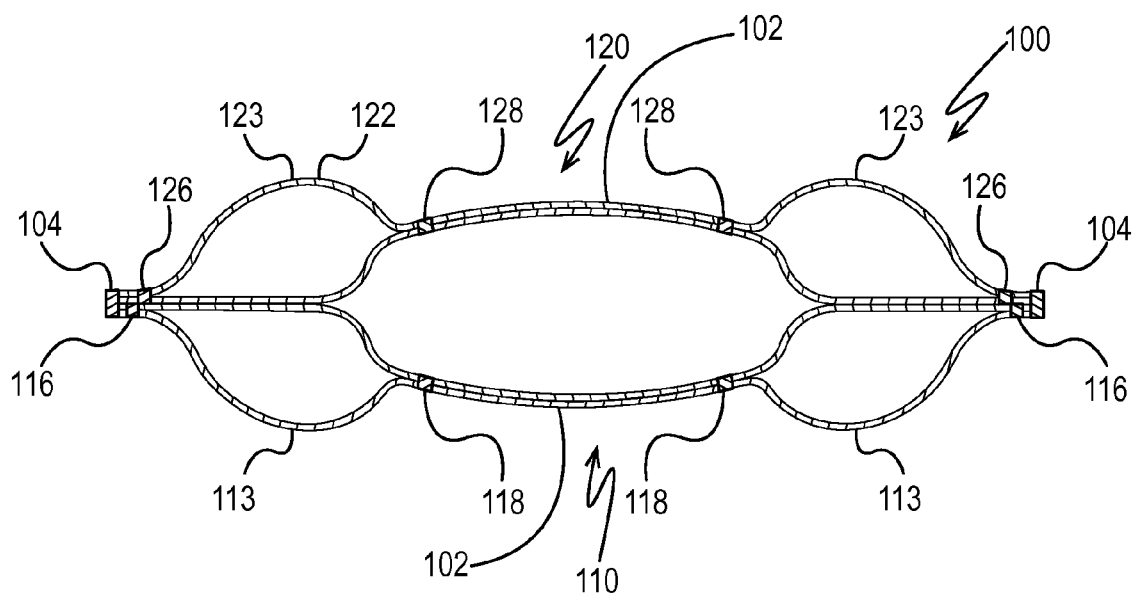
FIG. 20 schematically depicts a top sectional view of a film-based container according to one or more embodiments shown or described herein shown along line A-A of FIG. 18.
Figure 21:
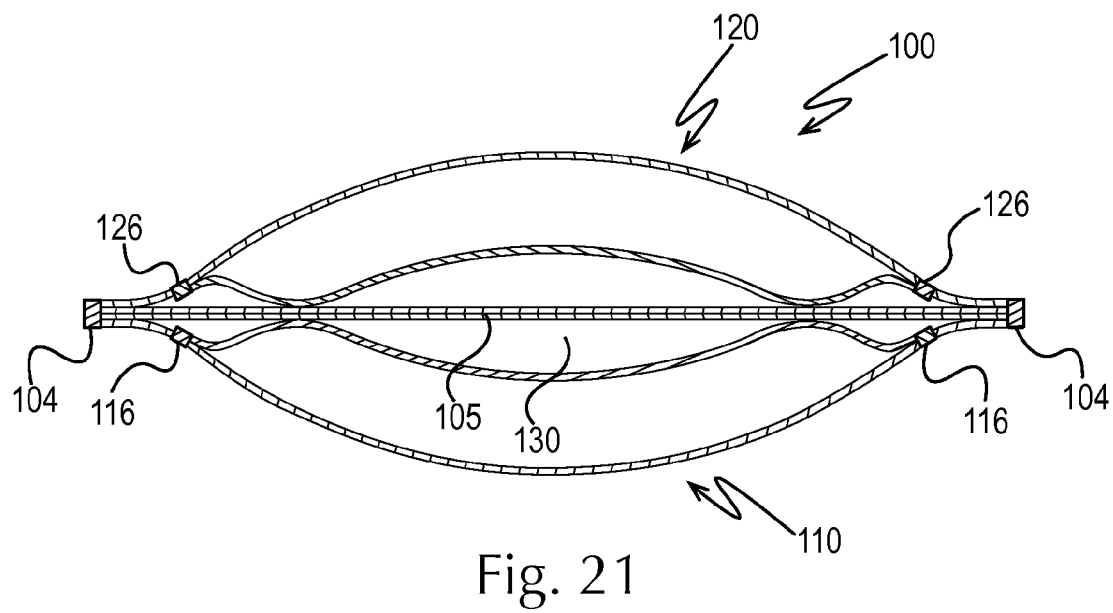
FIG. 21 schematically depicts a top sectional view of a film-based container according to one or more embodiments shown or described herein shown along line B-B of FIG. 18.
Figure 22:
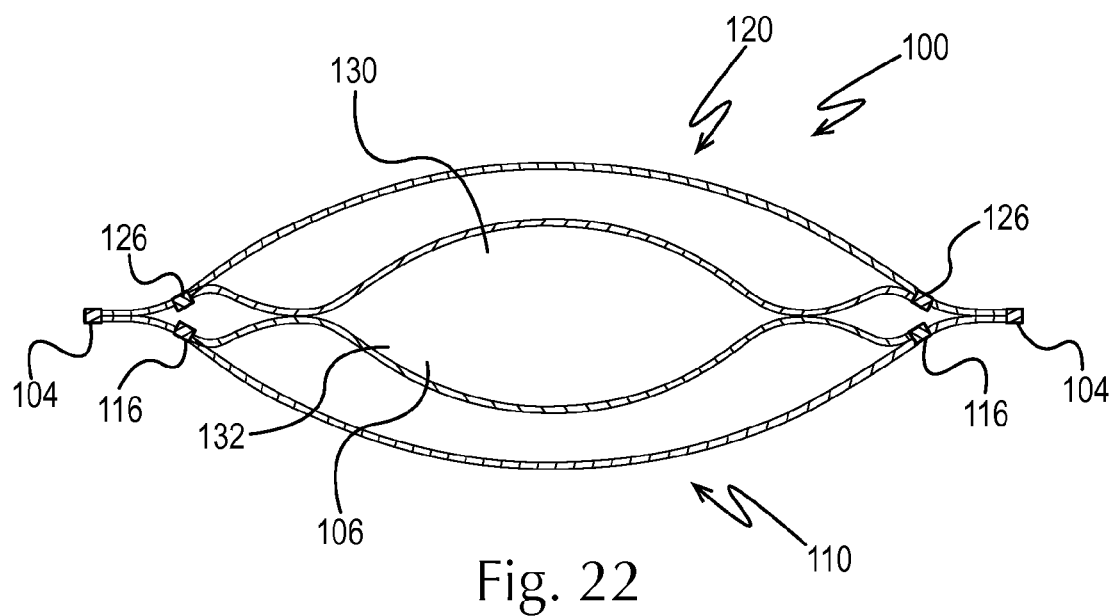
FIG. 22 schematically depicts a top sectional view of a film-based container according to one or more embodiments shown or described herein shown along line C-C of FIG. 18.

Referring now to FIG. 19, a portion of the first sheet assembly portion 110 is depicted in cross section. While FIG. 19 explicitly depicts the first sheet assembly portion 110, it should be understood that the second sheet assembly portion 120 may include corresponding components that form similar expanded chambers, as depicted in FIGS. 20-22. FIG. 5 depicts an expansion step in an assembly operation in which the regions of flexible inner and outer sheets 112, 114 positioned between the interior and exterior seams 118, 116 are expanded to form an expanded chamber 113. A fluid is introduced through the seam opening 117, as discussed hereinabove, into the region between the flexible inner and outer sheets 112, 114. The fluid increases the spacing between the flexible inner and outer sheets 112, 114 at positions of the first sheet assembly portion 110 between the interior and exterior seams 118, 116. The introduction of the fluid through the seam opening 117 thereby forms the expanded chamber 113 in the first sheet assembly portion 110 and maintains an expanded chamber volume in the expanded chamber 113, such that the expanded chamber volume is greater than the chamber volume when collapsed onto itself, for example, when configured as the package preform 80 of FIG. 17. Because of the narrow, elongated shape of the seam opening 117, fluid introduced between the flexible inner and outer sheets 112, 114 that separates the flexible inner and outer sheets 112, 114 to form the expanded chamber 113 may be restricted from flowing out of the expanded chamber 113. The restriction in flow of the fluid may allow for a subsequent sealing operation of the expanded chamber 113 that closes the seam opening 117 and maintains the shape of the expanded chamber 113.

A variety of fluids may be introduced through the seam opening 117 to form the expanded chamber 113. In some embodiments, the fluid is a gas that introduced through the seam opening 117 and maintains fluid pressure in the expanded chamber 113 that is greater than the ambient pressure. In some embodiments, pressure in the expanded chamber 113 is maintained following the expansion operation without connection of a pressure source. In these embodiments, the pressure source may be removed prior to closing the seam opening 117. The seam opening 117 may be closed with minimal escape of fluid from the expanded chamber 113. In other embodiments, a pressure source remains in fluid communication with the expanded chamber throughout an operation that closes the seam opening 117. In one embodiment, the gas in the expanded chamber 113 is maintained at a pressure from about 15 psi to about 18 psi above ambient. In other embodiments, the fluid is a liquid that is introduced through the seam opening 117. The fluid pressure within the expanded chamber 113 is approximately equal to the ambient pressure, and the increase in density of the fluid spaces the flexible inner and outer sheets 112, 114 from one another. In yet another embodiment, the fluid is a solidifying foam or other solid material that is introduced through the seam opening 117 as a fluid and hardens as a solid. In some embodiments, the foam may be an expandable foam that increases in volume as the foam solidifies. When solidified, the foam spaces the flexible inner and outer sheets 112, 114 from one another. An example of such foams includes, without limitation, a two-part liquid mixture of isocyanate and a polyol that, when combined under appropriate conditions, solidify to form a solid foam. In other embodiments, the expanded chamber 113 may include stiffeners (not shown) positioned between the flexible inner and flexible outer sheets 112, 114. The stiffeners may modify the shape of the expanded chamber 113 and may provide additional structure to the assembled container 100. Such stiffeners may be formed from a variety of materials and manufacturing methods, for example and without limitation, plastic stiffeners produced by injection molding or extrusion.

In yet other embodiments, an expansion in the expanded chamber 113 may be caused by a phase change of a fluid introduced between the flexible inner and outer sheets 112, 114. Examples of the phase change may include injecting a quantity of cooled material, for example and without limitation, liquid nitrogen or dry ice, between the flexible inner and outer sheets 112, 114. By sealing the flexible inner and outer sheets 112, 114 around the cooled material and allowing the cooled material to vaporize and/or sublimate when reaching an ambient temperature, pressures between the flexible inner and outer sheets 112, 114 may cause the separation of the flexible inner and outer sheets 112, 114 between the interior and exterior seams 118, 116 to separate the flexible inner and outer sheets 112, 114 to form the expanded chamber 113. In another embodiment, chemically reactive materials, for example and without limitation, a weak acid, such as citric acid, to a weak base, such as sodium bicarbonate, may be introduced between the flexible inner and outer sheets 112, 114. The chemically reactive materials may react in the enclosed environment to separate the flexible inner and outer sheets 112, 114 to form the expanded chamber 113. Therefore, it should be understood that for some embodiments of the container 100, a seam opening may not be present.

In yet another embodiment, separation of the flexible inner and outer sheets 112, 114 may be triggered at a later point in the assembly process after forming enclosed interior and exterior seams 118, 116 that will later define the expanded chamber 113 by introducing chemically reactive materials that are stored separately from one another. When separation of the flexible inner and outer sheets 112, 114 is desired, the chemically reactive materials may be selected to be introduced to one another. In some embodiments, the chemically reactive materials may be separated from one another using a frangible seal, which may be broken to induce a reaction that causes expansion of the expanded chamber 113. In other embodiments, the chemically reactive materials may be non-reactive with one another at certain environmental conditions, for example at certain temperatures. When separation of the flexible inner and outer sheets 112, 114 is desired, the container 100 may be exposed to the environmental conditions, for example, by increasing the ambient temperature, causing the chemically reactive materials to react with one another to cause the expansion of the expanded chamber 113. In yet other embodiments, the chemically reactive materials may be non-reactive with one another unless subject to electromagnetic energy including, for example and without limitation UV light or microwave energy. When separation of the flexible inner and outer sheets 112, 114 is desired, the container 100 may be exposed to the electromagnetic energy, causing the chemically reactive materials to react with one another to cause the expansion of the expanded chamber 113

Still referring to FIG. 19, the introduction of the fluid between the interior and exterior seams 118, 116 causes the first sheet assembly portion 110 to change shape in a variety of directions. The introduction of fluid leads to expansion of the expanded chamber 113 in a direction normal to the thickness of the first sheet assembly portion 110. The expansion of the first sheet assembly portion 110 also leads to a change in shape of the first sheet assembly portion 110 in orientations transverse to the thickness of the first sheet assembly portion 110. As depicted in FIG. 19, the expanded chamber 113 separates the flexible inner and outer sheets 112, 114 from one another at positions between the interior and exterior seams 118, 116. As the flexible inner and outer sheets 112, 114 are deflected away from one another, the expanded chamber 113 tends to draw the exterior seam 116 inwards. Similarly, the expanded chamber 113 and the deflection of the exterior seam 116 tends to draw the interior seam 118 outwards. The approximate size of the expanded chamber 113 as defined by the interior and exterior seams 118, 116 is a dimension D, which is approximated by the following equation:

$$D = \frac{2}{\pi} D_0$$

where $D_0$ is the dimension between the interior seam 118 and the exterior seam 116 prior to expansion. The drawing of the interior and exterior seams 118, 116 tends to induce a stress into one or more of the flexible inner and outer sheets 112, 114. In some embodiments, this stress increases the tension on the interior panel 102, as will be discussed in greater detail below.

Referring now to FIGS. 20-22, cross-sectional views depict three vertical positions of the container 100 depicted in FIG. 18. Referring now to FIG. 20, a cross-sectional view of the container 100 at approximately mid-height is depicted. In the depicted embodiment, the container 100 includes the first and second sheet assembly portions 110, 120 that are joined to one another at the enclosure seam 104. The enclosure seam 104 maintains the position of the first and second sheet assembly portions 110, 120 relative to one another. The enclosure seam 104 also defines the product receiving volume 130 of the container 100.

As depicted in FIG. 20, portions of the expanded chambers 113, 123 formed by the flexible inner sheets 114, 124 may contact one another at positions inside of the product receiving volume 130. Further, the positioning of the expanded chambers 113, 123 relative to one another may induce deformation into the expanded chambers 113, 123. This deformation may be localized to positions where the expanded chambers 113, 123 contact one another. This deformation of the expanded chambers 113, 123 also may contribute to stresses in the first and second sheet assembly portions 110, 120. The stresses induced into the first and second sheet assembly portions 110, 120 by the expanded chambers 113, 123 are in equilibrium in the container 100. Thus, the stresses induced into the first and second sheet assembly portions 110, 120 by the expanded chambers 113, 123 may contribute to the structural reinforcement of the container 100.

As discussed hereinabove, the first and second sheet assembly portions 110, 120 are bookmatched relative to one another. In the depicted embodiment, the interior and exterior seams 118, 116 of the first sheet assembly portion 110 are positioned approximately evenly with the interior and exterior seams 128, 126 of the second sheet assembly portion 120, when evaluated through the thickness of the container 100. Such bookmatched positioning of the first and second sheet assembly portions 110, 120 may improve symmetry of the final-assembled container 100, as stresses induced between the first and second sheet assembly portions 110, 120 are evenly reacted, which may otherwise cause unevenness in surfaces of the container 100.

Further, as depicted in FIG. 20, each of the first and second sheet assembly portions 110, 120 includes an interior panel 102. In the embodiment depicted in FIGS. 15-22, the interior panel 102 is bounded by the expanded chambers 113, 123. The expanded chambers 113, 123 extend continuously around a periphery of the interior panel 102, such that all of the interior panel 102 is positioned inside of the expanded chamber 113, 123. In some embodiments, the interior panel 102 may be partially bounded by the expanded chamber 113, 123. In yet other embodiments, the interior panel 102 may be substantially bounded by the expanded chamber 113, 123. Other embodiments of the container 100 having different configurations will be described in greater detail below.

Referring now to FIG. 21, a cross-sectional view of the container 100 through a lower portion of the container 100 is depicted. In the embodiment depicted in FIG. 21, the gusset panel portion 105 is shown as positioned between the first and second sheet assembly portions 110, 120. Consistent with the description of the container 100 in regard to FIG. 20, the expanded chambers 113, 123 deform at regions of contact between the expanded chambers 113, 123. Further, as depicted in FIG. 21, regions of the expanded chambers 113, 123 may be spaced apart from one another due to the stresses induced to the first and second sheet assembly portions 110, 120. In the depicted embodiment, the spacing between the enclosure seam 104 along opposite sides of the container 100, along with the shape of the expanded chambers 113, 123, when evaluated in certain local positions, may contribute to stresses induced into the first and second sheet assembly portions 110, 120. Further, while the expanded chambers 113, 123 do not include an interior seam at the position corresponding to this cross-sectional view, the expanded chambers 113, 123 are spaced apart from the gusset panel portion 105 and each other at positions away from the exterior seam 116, 126.

Referring now to FIG. 22, a cross-sectional view of the container 100 through an upper portion of the container 100 is depicted. Similar to the discussion in regard to FIG. 21, the expanded chambers 113, 123 deform at regions of contact between the expanded chambers 113, 123. Further, as depicted in FIG. 22, regions of the expanded chambers 113, 123 may be spaced apart from one another due to the stresses induced to the first and second sheet assembly portions 110, 120. In the depicted embodiment, the spacing between the enclosure seam 104 and the expanded chambers 113, 123 may contribute to stresses induced into the first and second sheet assembly portions 110, 120. The localized stresses of the first and second sheet assembly portions 110, 120, along with a variation in spacing between the enclosure seam 104 and the expanded chambers 113, 123 may cause the expanded chambers 113, 123 to separate from one another. The separation of the expanded chambers 113, 123 may form the product dispensing path 132 of the container 100.

The container 100 may also include a product dispensing path 132 that passes between the expanded chambers 113, 123. In the embodiment depicted in FIG. 22, the product dispensing path 106 is in fluid communication with the product receiving volume 130. When flowable product is introduced to or dispensed from the product receiving volume 130, the flowable product passes through the product dispensing path 106 and the product dispensing opening 140 (as depicted in FIG. 18).

Referring again to FIG. 15, some embodiments of the container 100 may dispense flowable product with a manual application of force by a human user. Manual application of force by a human user may reduce the product receiving volume 130 of the container 100. Manual application of force by a human user may also increase the pressure inside the product receiving volume 130. In such embodiments, the interior panel 102 and the expanded chambers 113, 123 may be sized to accommodate a human hand. In other embodiments, the container 100 may dispense produce with a remote application of force, for example when force is applied to the interior panel 102 by a dispensing apparatus, as conventionally known.

Figure 23:
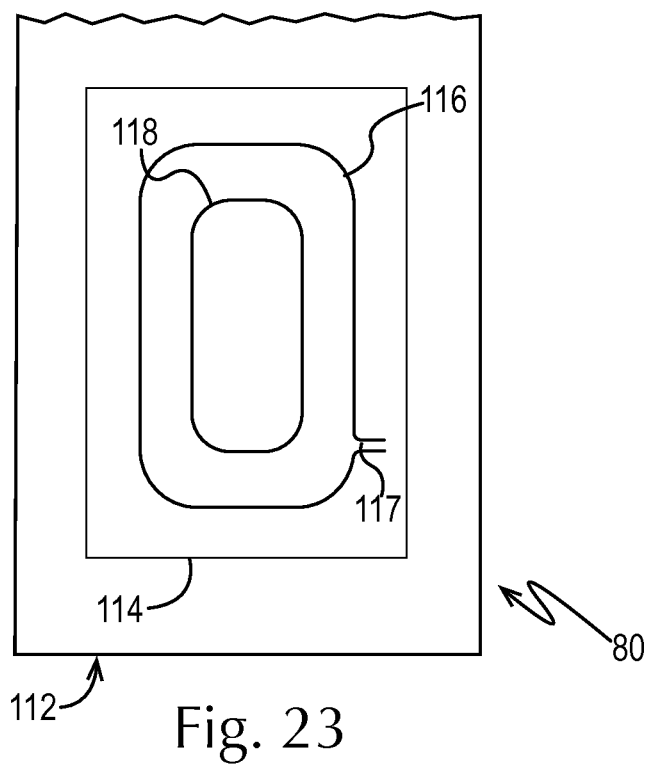
FIG. 23 schematically depicts a top view of an unfurled package preform for a film-based container according to one or more embodiments shown or described herein.
Figure 24:
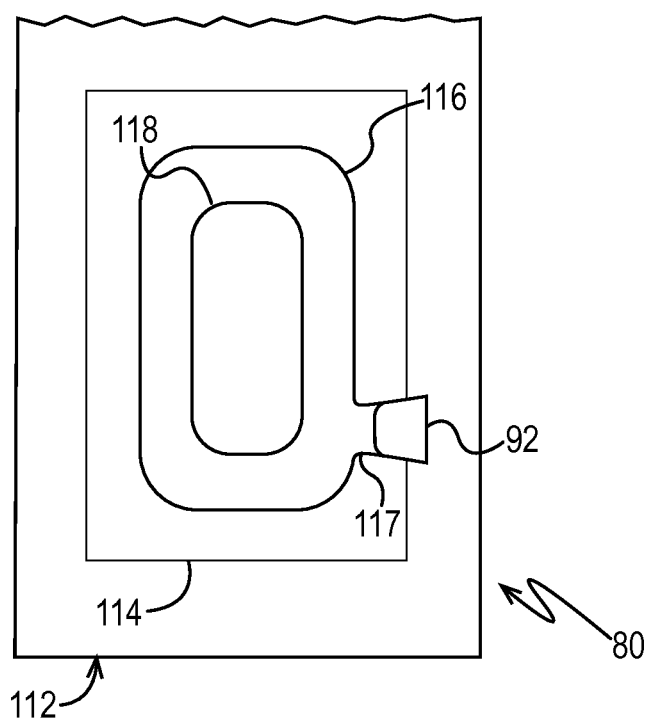
FIG. 24 schematically depicts a top view of an unfurled package preform for a film-based container according to one or more embodiments shown or described herein.

Referring now to FIGS. 23 and 24, other embodiments of seam opening 117 are depicted. Referring now to FIG. 23, the package preform 80 includes a seam opening 117 that is a gap formed in a discontinuous region of the exterior seam 116. Similar to the embodiment described above in regard to FIGS. 15-22, fluid may be introduced into the region defined by the interior and exterior seams 118, 116 through the seam opening 117, which is later joined.

Referring now to FIG. 24, this embodiment of the package preform 80 includes a one way valve 92 that is inserted into the seam opening 117. An example, without limitation, of a suitable one way valve 92 is described in U.S. Patent Publication No. 2003/0096068. The one way valve 92 may be coated with an ink or other coating that allows the one way valve 92 to be heat sealed to the flexible inner and outer sheets 112, 114 without sealing the one way valve 92 shut. Fluid is introduced into the region defined by the interior and exterior seams 118, 116 through the one way valve 92, which prevents the fluid from exiting the region defined by the interior and exterior seams 118, 116 and maintains the shape of the expanded chamber 113. In some embodiments, the flexible inner and outer sheets 112, 114 may be joined to one another around the one way valve 92 to incorporate the one way valve 92 into the container 100. In other embodiments, the flexible inner and outer sheets 112, 114 may be joined to one another in locations such that the one way valve 92 is separated from the expanded chamber 113. The one way valve 92 and excess material of the flexible inner and outer sheets 112, 114 may be trimmed away as scrap.

Figure 25:
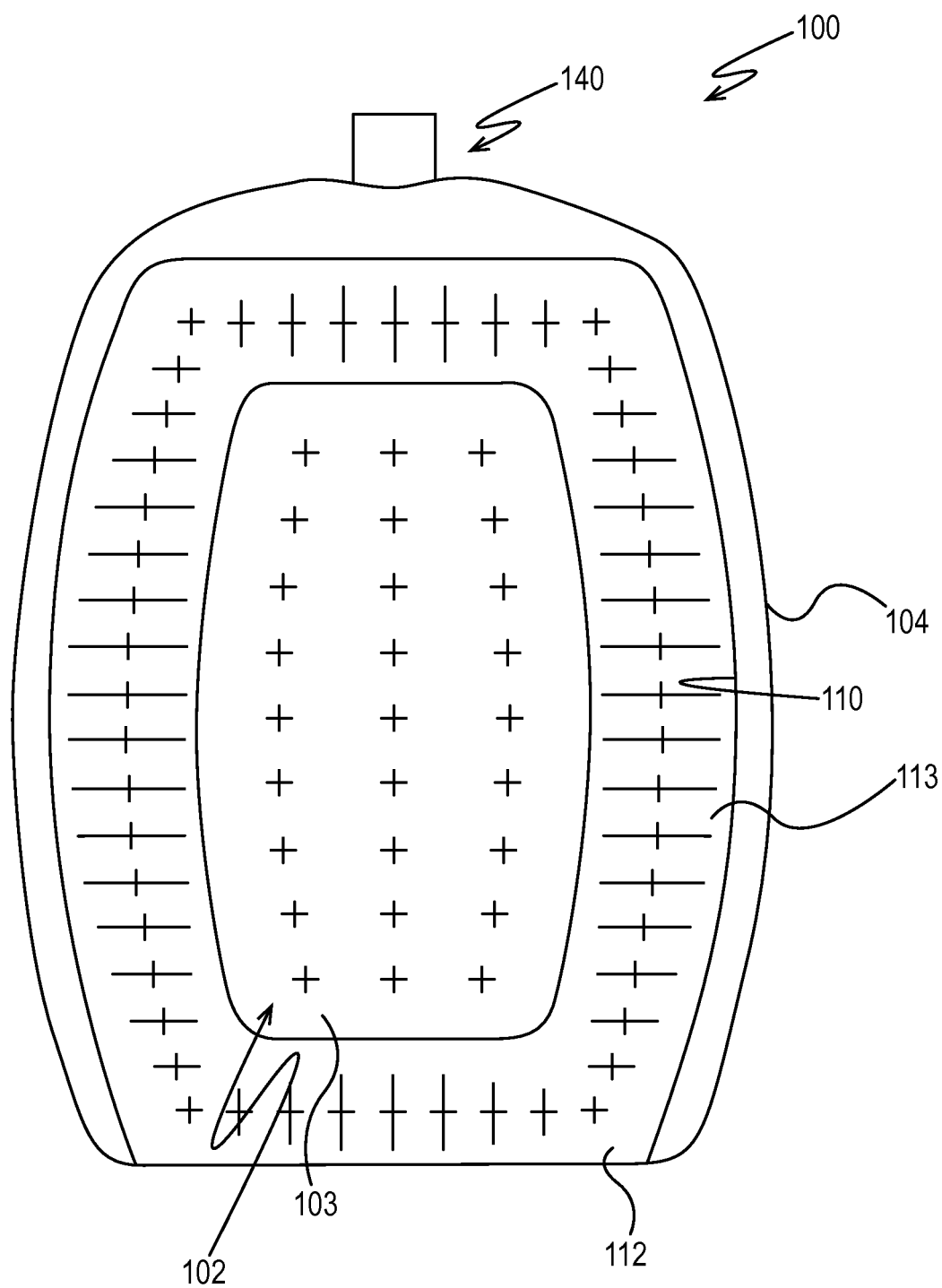
FIG. 25 schematically depicts a hypothetical stress diagram of a film-based container according to one or more embodiments shown or described herein.

Referring now to FIG. 25, a hypothetical stress diagram of one embodiment of the container 100 is depicted. The container 100 includes a first sheet assembly portion 110 having an interior panel 102 surrounded by an expanded chamber 113. In FIG. 25, the container 100 includes a plurality of stress indicators that are overlayed on portions of the container 100. The stress indicators are indicative of stress tensors in the container 100 at the plurality of locations induced into the container 100 during the assembly process. The length of the stress indicators corresponds to the induced stress in the containers 100. As depicted in FIG. 25, the stress tensors evaluated in regions corresponding to the expanded chamber 113 are greater than the stress tensors evaluated in regions corresponding to the interior panel 102. The increased stress tensors in positions corresponding to the expanded chamber 113 may be attributed to an increase in tension in the flexible outer sheet 112. Thus, as depicted, the flexible outer sheet 112 forming the interior panel 102 has a tension different than the flexible outer sheet 112 forming the expanded chamber 113.

The tension in the flexible outer sheet 112 at positions proximate to the expanded chamber 113 may be attributed to a combination of factors including, without limitation, the internal fluid pressure of the expanded chamber 113, the density of the fluid present in the expanded chamber 113, the thickness of the flexible outer and inner sheets 112, 114, or a combination thereof. Further, the tension in the flexible outer sheet 112 at positions proximate to the interior panel 102 may similarly be attributed to a combination of factors including, without limitation, the internal fluid pressure of the product receiving volume 130, the density of the flowable product present in the product receiving volume 130, the thickness of the flexible outer and inner sheets 112, 114, or a combination thereof.

Referring again to FIG. 15, embodiments of the container 100 may have a variety of product dispensing openings 140 through which flowable product may be filled and/or dispensed. In one embodiment, the container 100 may include a user-selectable reclosable opening 142. Such a reclosable opening 142 may include a threaded-cap or a snap-fit cap that allows a user of the container 100 to selectively open when the user desires to dispense flowable product from the container 100, and close when no dispensing of flowable product is desired. Such reclosable openings 142 may include injection molded plastic components, as are conventionally known, including, without limitation, fitments, flip-top snap-close fittings or threaded neck and screw-cap closures, squeeze valve, child resistant closures, precision dosing tips, and the like. In another embodiment, the container 100 may include a product dispensing nozzle that dispenses flowable product from the container 100 upon application of a force to the container 100 to increase the fluid pressure of the flowable product above the ambient pressure of the environment. In yet another embodiment, the container 100 may include a serpentine flow closure element, as described, for example, in U.S. Pat. No. 4,988,016. Such a serpentine flow closure element includes a channel having a winding flow path of relatively narrow width. Because of the relationship between the viscosity of the flowable product and the parameters of the flow path, flowable product is dispensed only upon an increase in pressure of the flowable product. In yet another embodiment, the container 100 may include a fluid actuated closure, as described in U.S. Pat. No. 7,207,717 B2. In some embodiments, the container may also include a vent that equalizes pressure between the container and the external environment.

While discussion above relates to positioning the product dispensing opening 142 along a top surface of the container 100, it should be understood that the product dispensing opening 142 may be positioned along any surface of the container 100 such that flowable product held within the container may be dispensed in any direction and orientation. In some embodiments, a fitment may be secured into any seam of the container 100. In other embodiments, any surface of the container 100 may be cut and the fitment secured at the location of the cut. In such embodiments, the fitment may include a gasket or seal that allows the fitment to provide a seal with the container 100 to control dispensing of flowable product from the container 100. In yet other embodiments, other dispensing elements may be installed onto the container 100 to provide desired dispensing of the flowable product from the container 100. Examples of such dispensing elements include, without limitation, pump heads, pumping foamers, spray dispensers, dose control elements integrated into the closure assembly, and the like.

Figure 26:
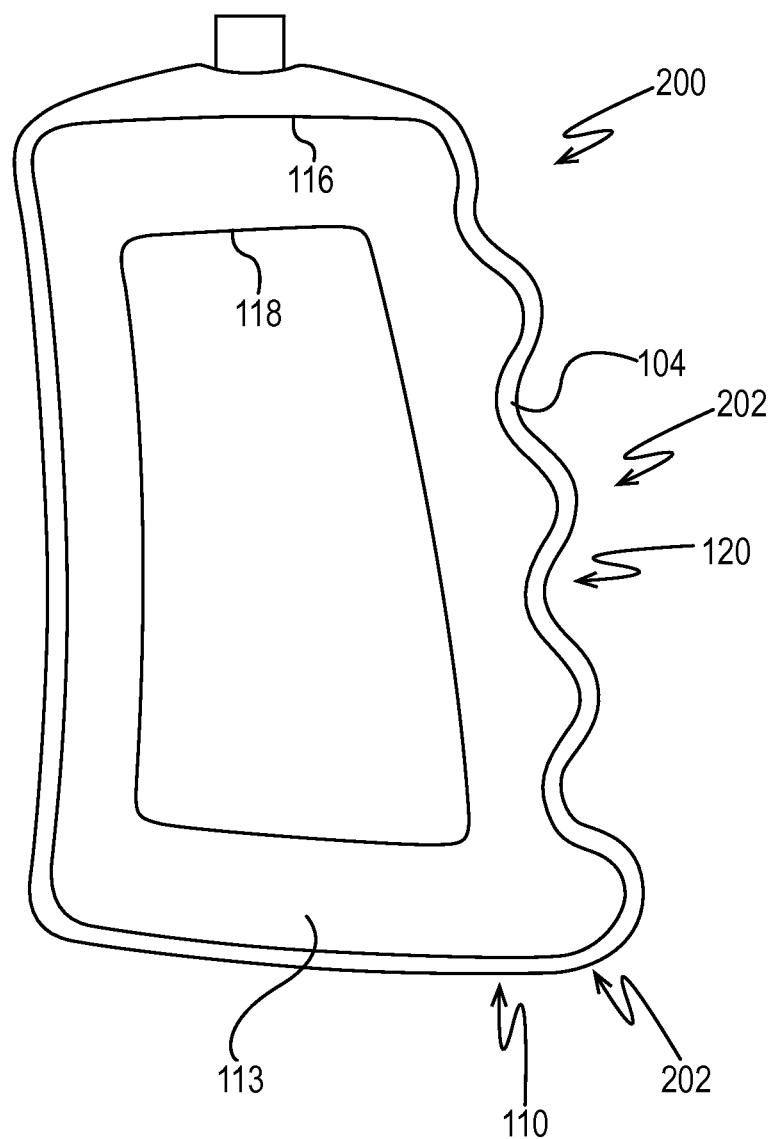
FIG. 26 schematically depicts a front view of a film-based container according to one or more embodiments shown or described herein.

Referring now to FIG. 26, another embodiment of a container 200 is depicted. The container 200 depicted is similar to the embodiment depicted in FIGS. 15-23, and includes a serrated section 202 along one side of the container 200. The serrated section 202 is formed in the first and second sheet assembly portion 110, 120, along with the enclosure seam 104 sealing the first and second sheet assembly portions 110, 120.

It should be understood that the shapes and orientations of the interior and exterior seams 118, 128, 116, 126 may be modified to create containers 100 having desired shapes of interior panels 102, expanded chambers 113, 123 and enclosure seams 104.

Figure 27:
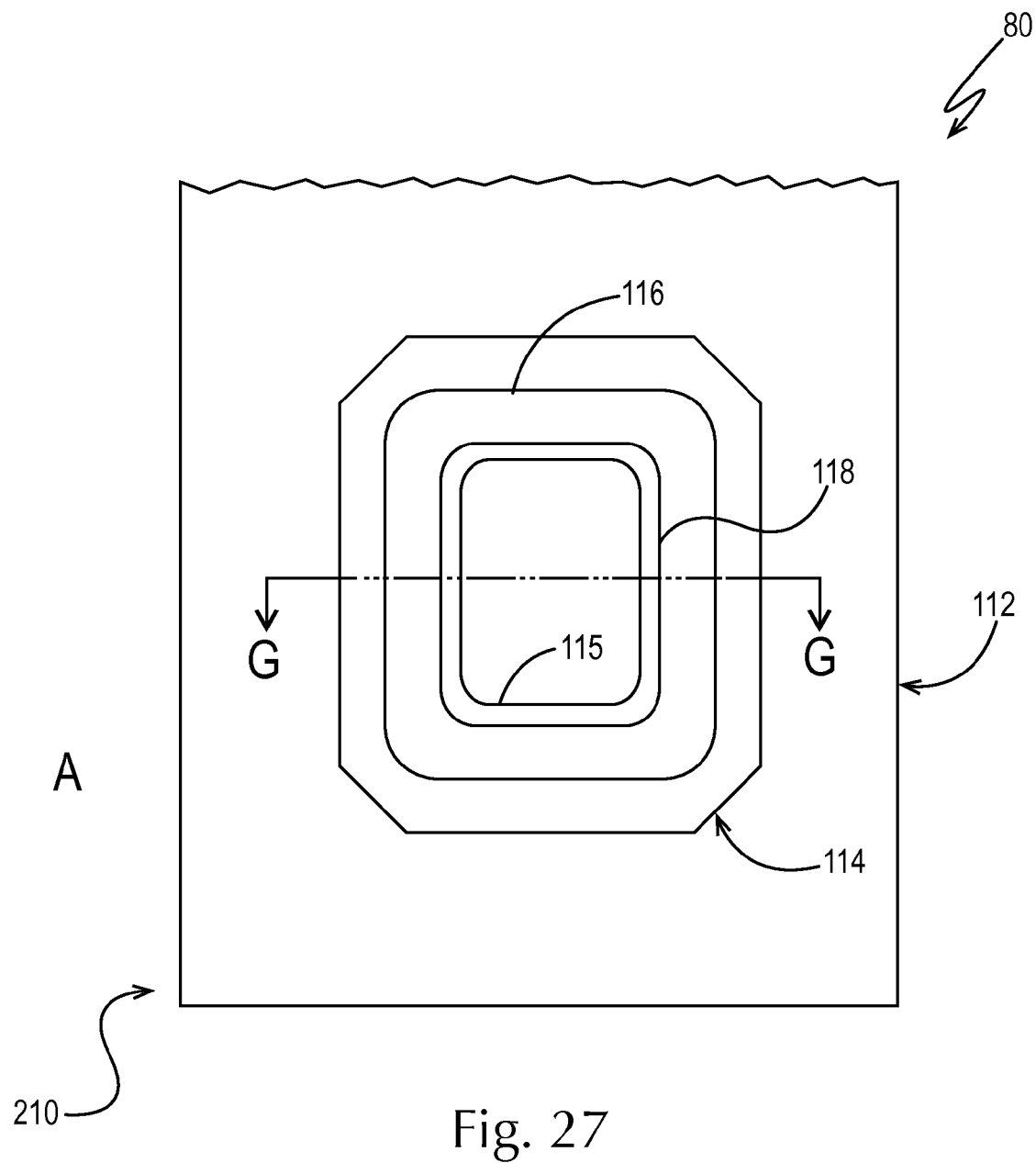
FIG. 27 schematically depicts a front view of portion of a package preform before assembly into a film-based container according to one or more embodiments shown or described herein.
Figure 28:
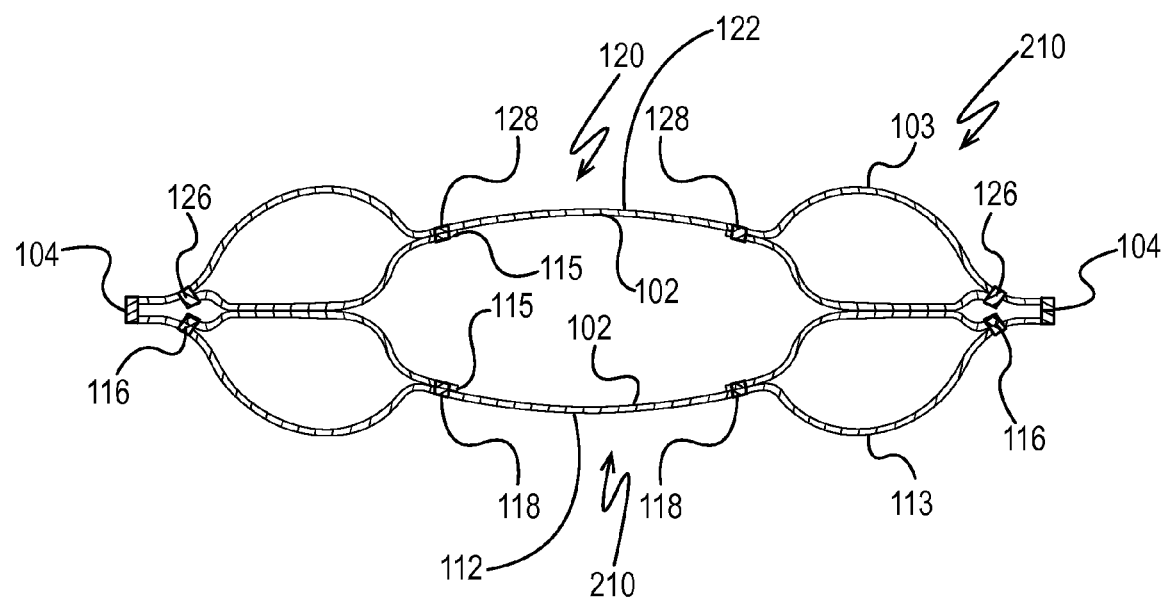
FIG. 28 schematically depicts a top sectional view of a film-based container according to one or more embodiments shown or described herein shown along line G-G of FIG. 27.

Referring now to FIGS. 27 and 28, another embodiment of the container 210 is depicted. The embodiment depicted in FIGS. 27 and 28 is similar to the embodiment of the container 100 depicted in FIGS. 15-22, however, the flexible inner sheet 114 of the first sheet assembly portion 110 has limited material positioned inside of the interior seam 118. The flexible inner sheet 114 includes a relief zone 115 positioned away from the outside edges of the flexible inner sheet 114. Material of the flexible inner sheet 115 is not present or removed at positions inside the relief zone 115. As depicted in FIG. 27, the relief zone 115 is positioned inside of the interior seam 118 between the flexible outer and inner sheets 112, 114. In the embodiment depicted in FIGS. 27 and 14, the interior panel 102 formed by the flexible outer and inner sheets 112, 114 includes a single wall along substantially all of the interior panel 102, as the flexible inner sheet 114 does not extend beyond the relief zone 115.

Figure 29:
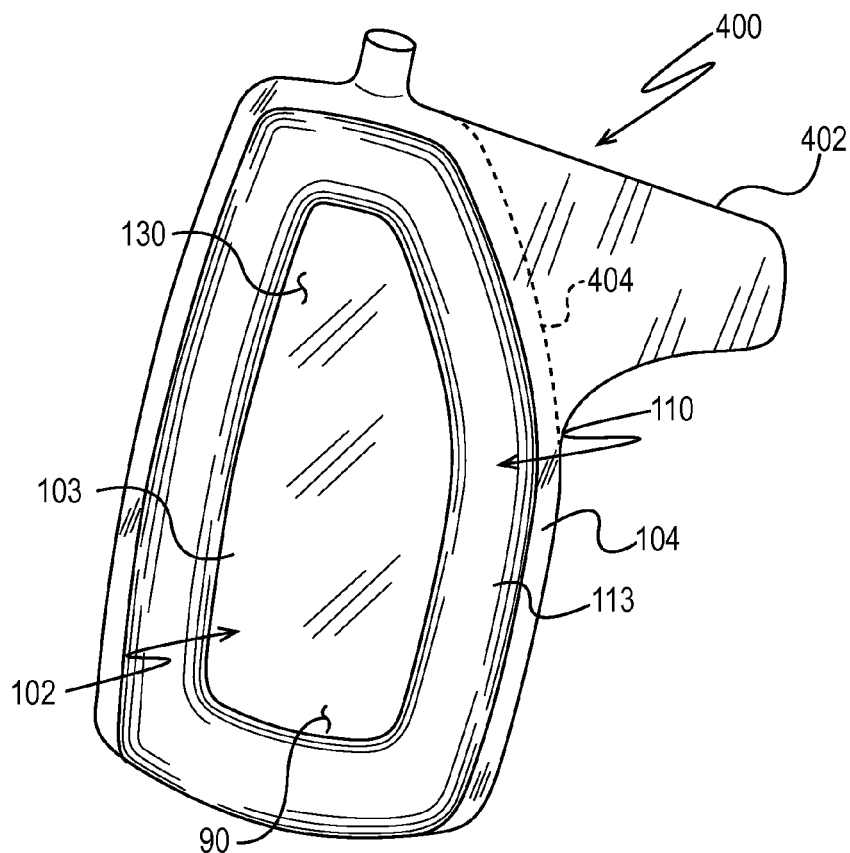
FIG. 29 schematically depicts a front view of a film-based container according to one or more embodiments shown or described herein.
Figure 30:
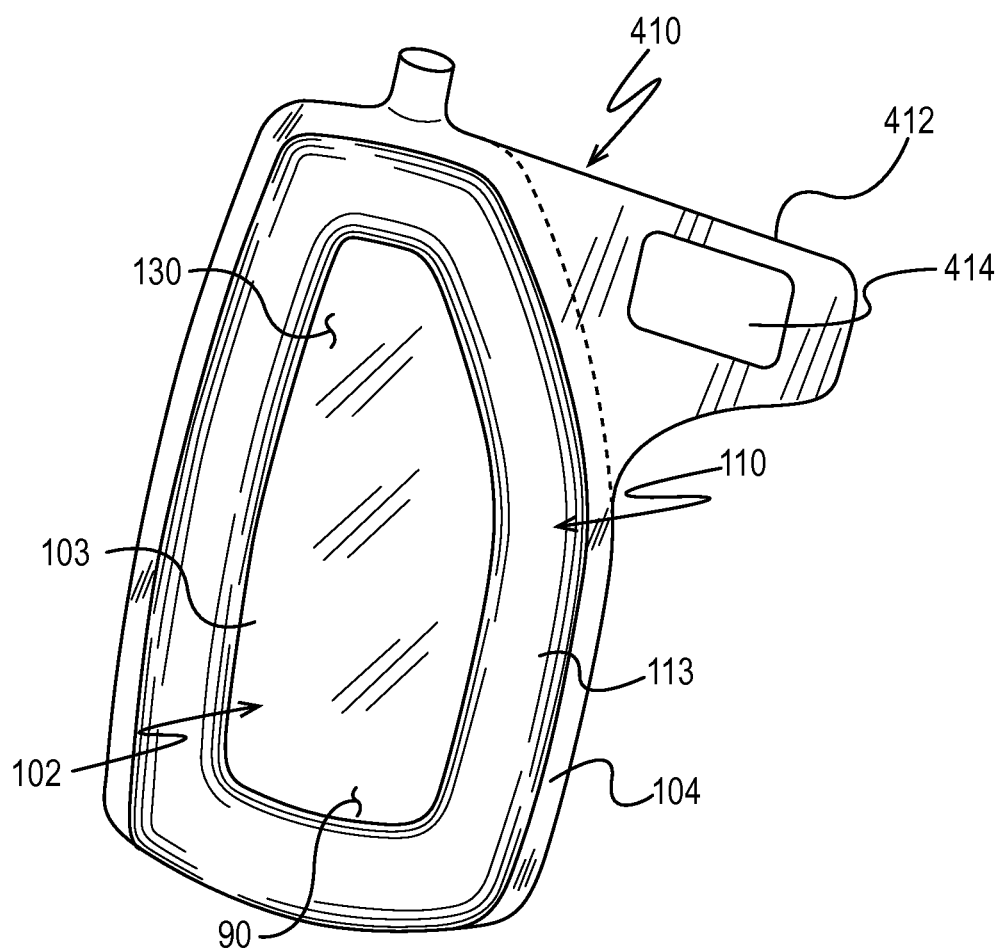
FIG. 30 schematically depicts a front view of a film-based container according to one or more embodiments shown or described herein.
Figure 31:
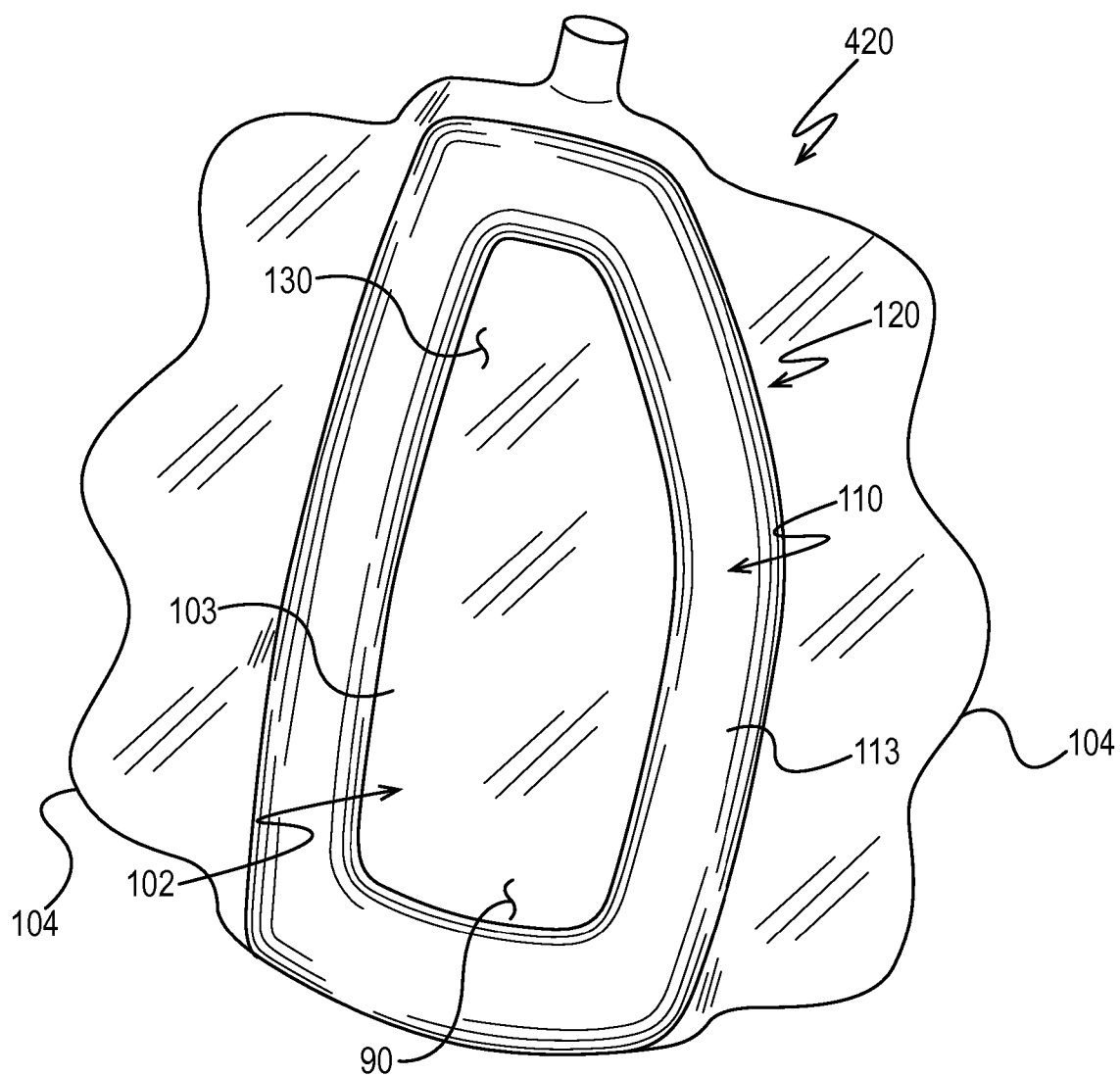
FIG. 31 schematically depicts a front view of a film-based container according to one or more embodiments shown or described herein.

Referring now to FIGS. 29-31, embodiments of the containers 400, 410, 420 may include a variety of enclosure seams 104 along the outer edges of the containers 400 that extend beyond the exterior seams 116 that define the expanded chamber 113. The enclosure seam 104 may be used for a variety of functional and/or marketing purposes. In the embodiment depicted in FIG. 29, the enclosure seam 104 extends away from the expanded chamber 113 to form a flag region 402. The flag region 402 may be separated from the expanded chamber 113 by a perforation 404. In one example, the flag may include a tear-away coupon that serves as a marketing offer for consumers.

Referring now to FIG. 30, this embodiment of the container 410 includes excess material, depicted herein as an extension of the enclosure seam 104, that extends away from the expanded chamber 113 to form a handle region 412. It should be understood that the excess material may take a variety of forms including a plurality of joined layers of film and/or a plurality of overlapping and non-joined layers of film, or a single layer of film. The handle region 412 may also include an expanded region that assists a user with gripping the container 410. The handle region 412 may also include a through-hole 414 that passes through the handle region 412, which provides the user with a finger-hold. Alternatively, the through-hole 414 may be used as a hanger for merchandising or for consumer use. The handle region 412 and the through hole 414 may be positioned at any position and orientation along the container 100.

Referring now to FIG. 31, this embodiment of the container 420 includes an enclosure seam 104 that extends away from the expanded chamber 113 to form a decorative region 422. The decorative region 422 may be printed according to methods described hereinabove to provide a visually appealing container 420 to consumers in a retail environment.

Figure 32:
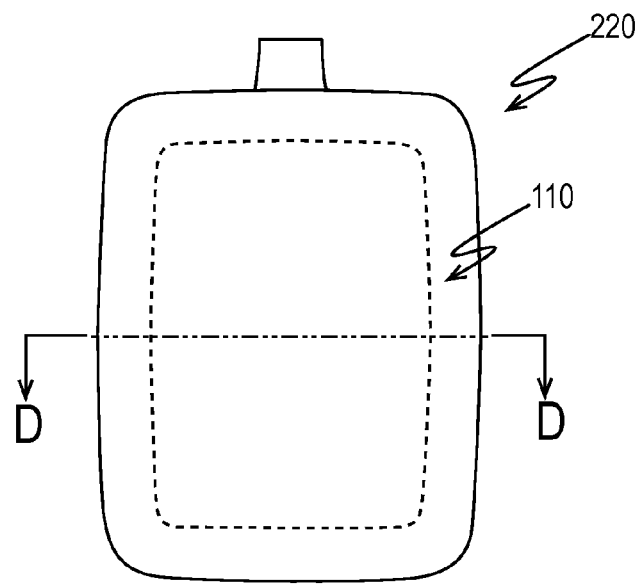
FIG. 32 schematically depicts a front view of a film-based container according to one or more embodiments shown or described herein.
Figure 33:
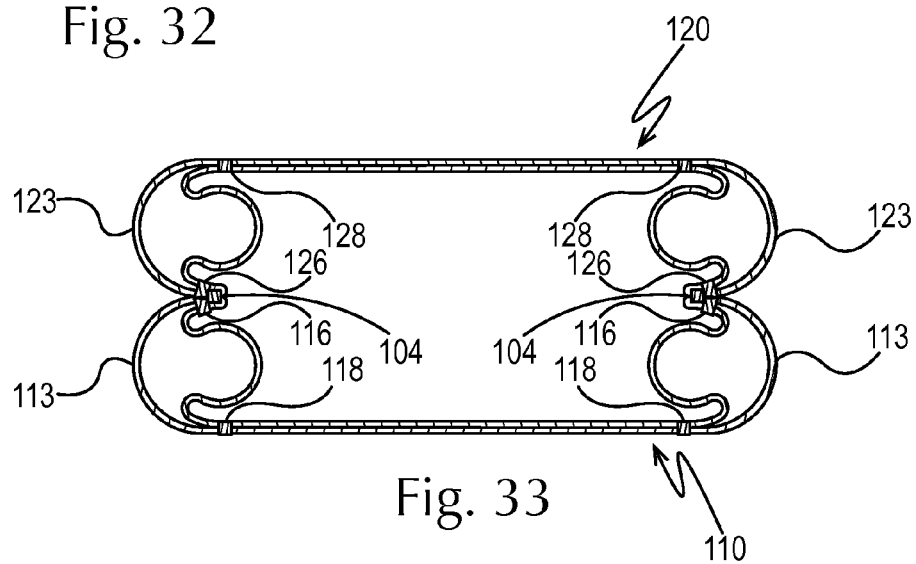
FIG. 33 schematically depicts a top sectional view of a film-based container according to one or more embodiments shown or described herein shown along line D-D of FIG. 32.

Referring now to FIGS. 32 and 33, another embodiment of the container 220 is depicted. This embodiment of the container 220 is similar to the container 100 depicted in FIGS. 15-22, however, the assembly operation includes an additional "inversion" step, whereby the first and second sheet assembly portions 110, 120 are drawn through an unjoined gap between the first and second sheet assembly portions 110, 120, which is later joined. As depicted in FIG. 33, the enclosure seam 104 is positioned proximate to the expanded chambers 113, 123, and spaced apart from the overall exterior perimeter of the container 220.

Referring now to FIG. 24, another embodiment of the container 230 is depicted. This embodiment of the container 230 is similar to the container 100 depicted in FIGS. 15-22, however, the container 230 includes a first sheet assembly portion 110 and a second sheet 232 that are joined together at an enclosure seam 104 to form a product receiving volume 130. Similar to the container 100 depicted in FIGS. 15-22, the first sheet assembly portion 110 includes a flexible outer sheet 112 and a flexible inner sheet 114 joined to one another at an exterior and an interior seam 116, 118. The exterior and interior seams 116, 118 define the expanded chamber 113. The second sheet 232 is secured to the first sheet assembly portion 110 at the enclosure seam 104, and contacts at least a portion of the expanded chamber 113.

Figure 35:
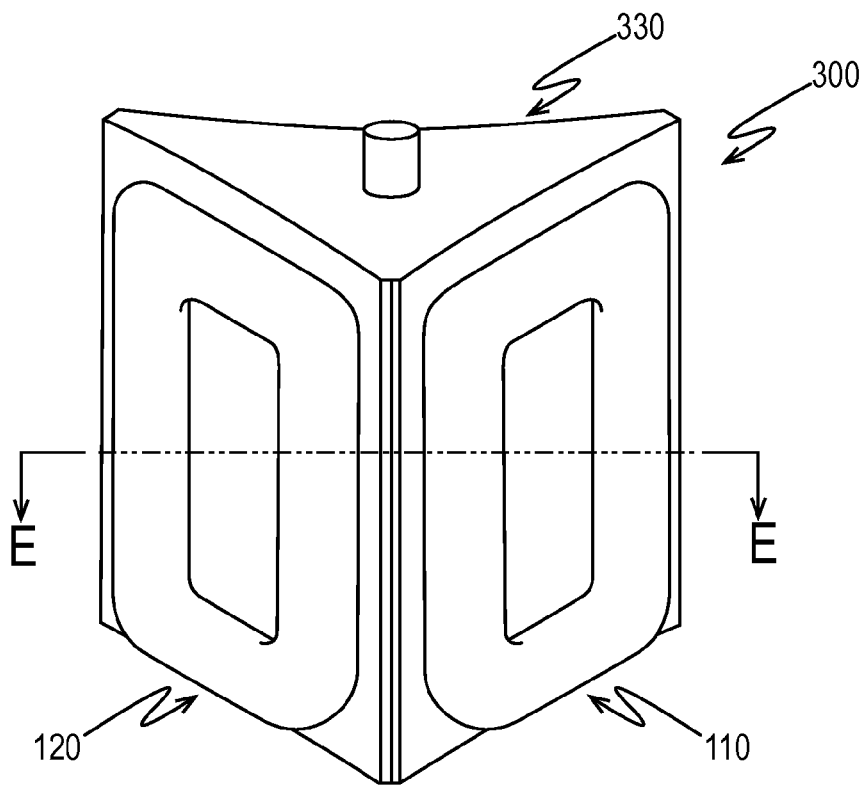
FIG. 35 schematically depicts a front perspective view of a film-based container according to one or more embodiments shown or described herein.
Figure 36:
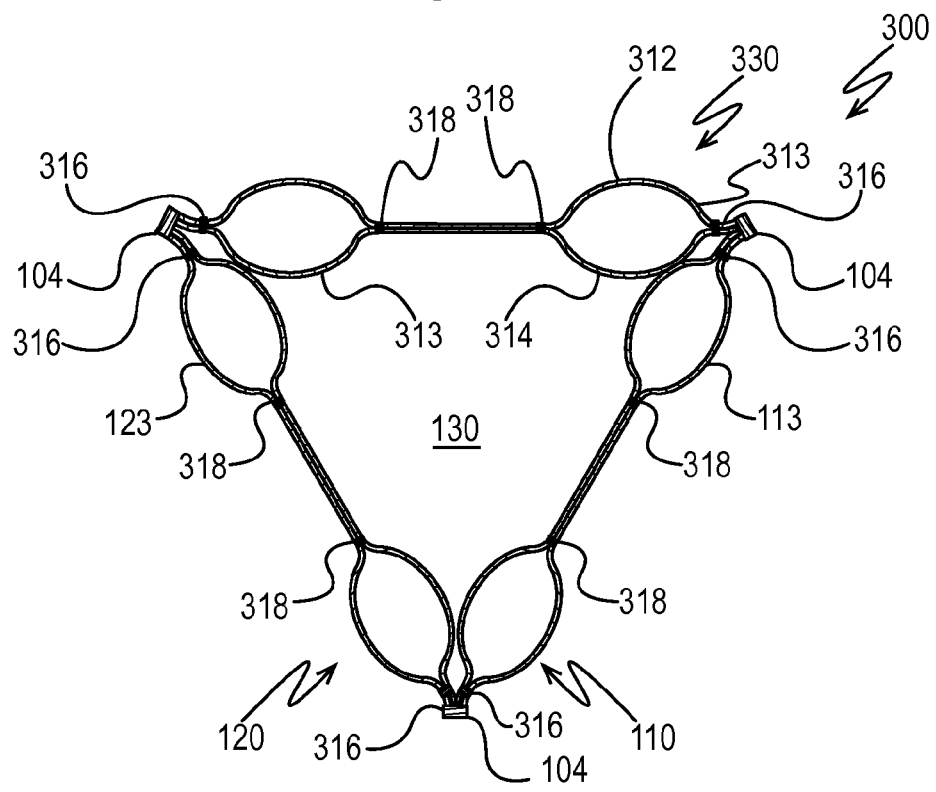
FIG. 36 schematically depicts a top sectional view of a film-based container according to one or more embodiments shown or described herein shown along line E-E of FIG. 35.

Referring now to FIGS. 35-36, another embodiment of the container 300 is depicted. This embodiment of the container 300 is similar to the container 100 depicted in FIGS. 15-22, however, the container 300 includes a first sheet assembly portion 110, a second sheet assembly portion 120, and a third sheet assembly portion 330 secured to one another at enclosure seams 104 to form the product receiving volume 130. The third sheet assembly portion 330 includes a flexible outer sheet 312 and a flexible inner sheet 314 that are joined to one another at outer and inner seams 316, 318. The flexible outer and inner sheets 312, 314 are separated from one another at positions between the outer and inner seams 316, 318 to form an expanded chamber 313.

Figure 41:
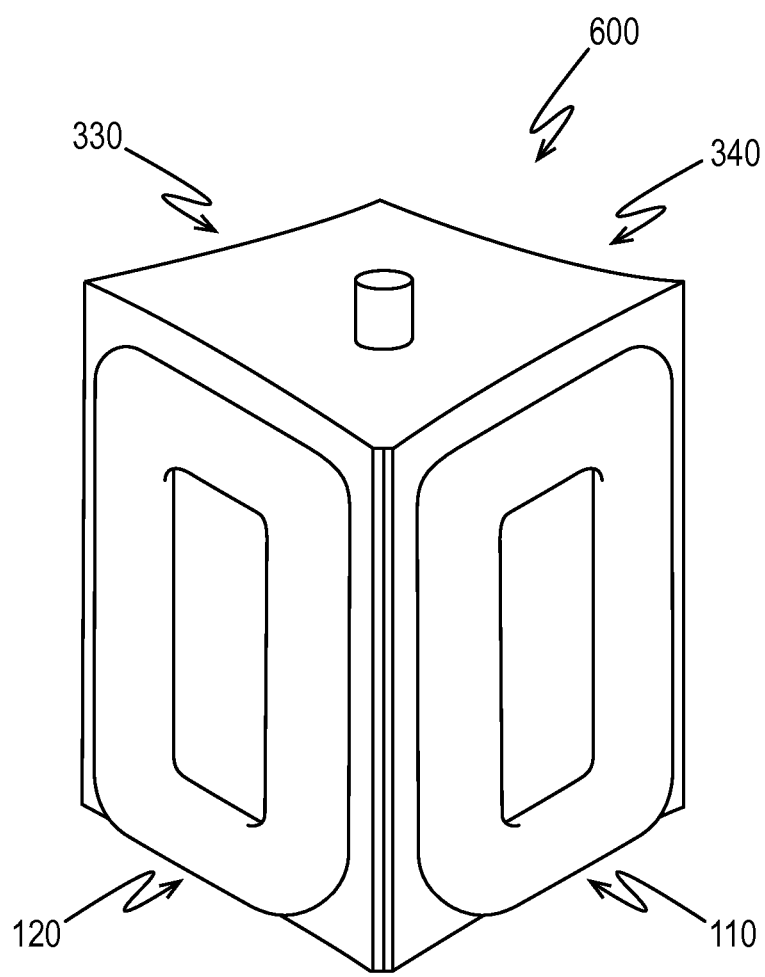
FIG. 41 schematically depicts a side perspective view of a film-based container according to one or more embodiments shown or described herein.
Figure 42:
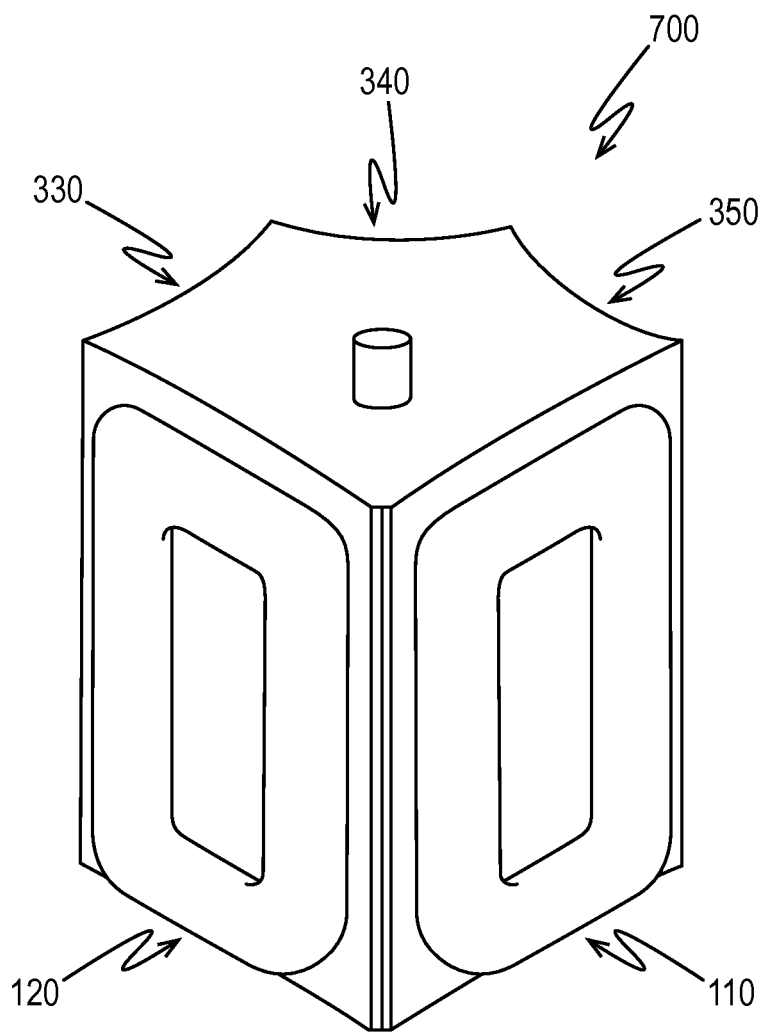
FIG. 42 schematically depicts a side perspective view of a film-based container according to one or more embodiments shown or described herein.

While FIGS. 35-36 depict an embodiment of the container 300 having three faces formed by the sheet assembly portions, it should be understood that containers may be manufactured according to the techniques described herein with any of a plurality of number of faces, as further depicted in FIGS. 41 and 42, without departing from the scope of this disclosure.

Figure 37:
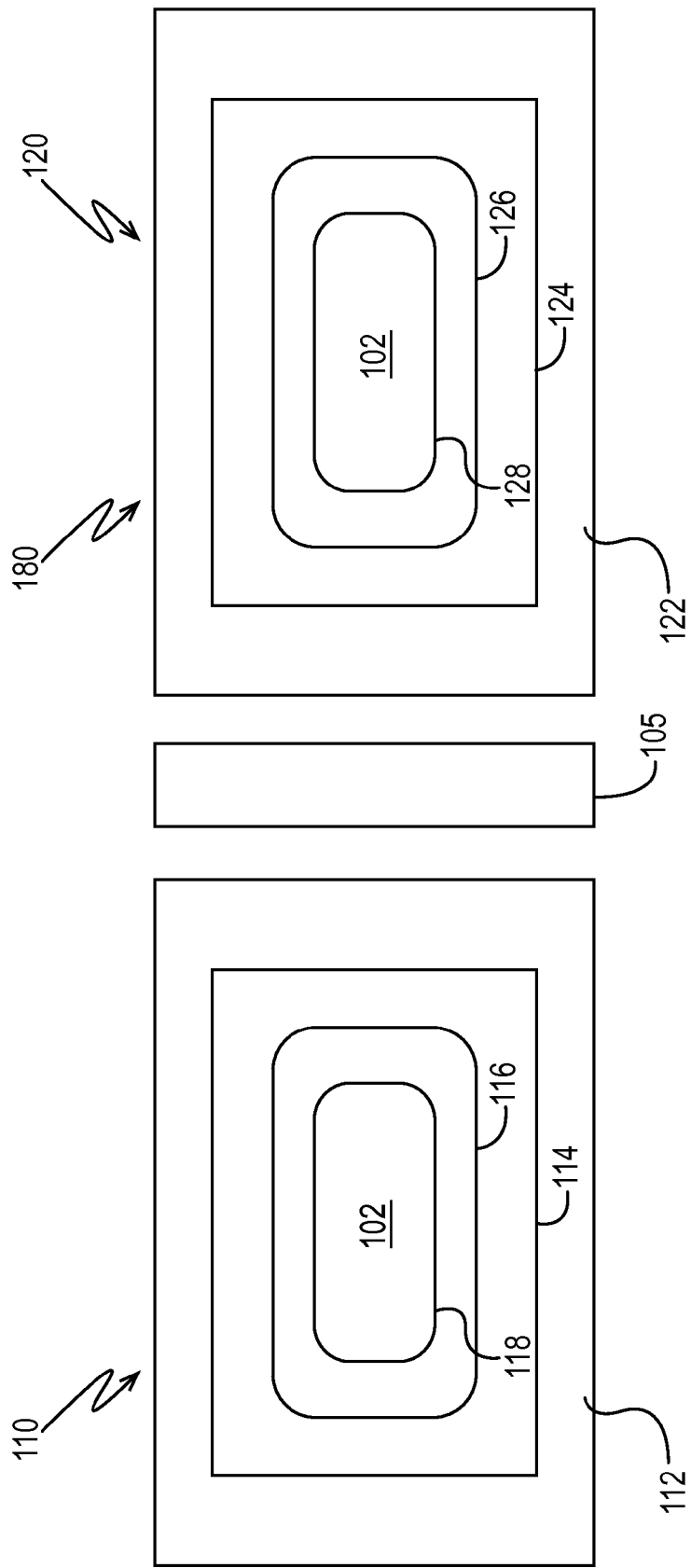
FIG. 37 schematically depicts a top view of an unfurled package preform for a film-based container according to one or more embodiments shown or described herein.
Figure 38:
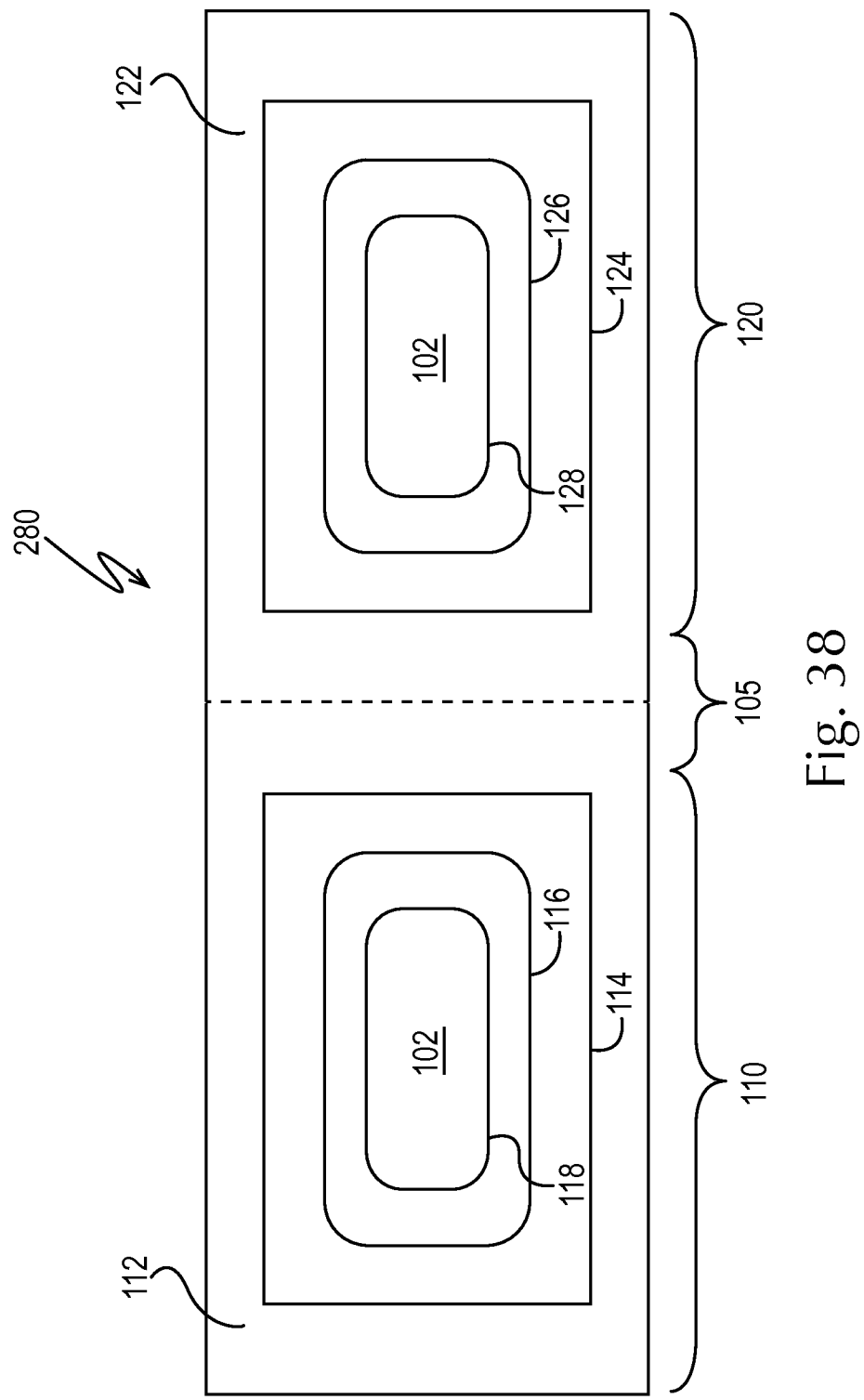
FIG. 38 schematically depicts a top view of an unfurled package preform for a film-based container according to one or more embodiments shown or described herein.

Referring now to FIGS. 37-38, other embodiments of the package preform 180, 280 are depicted. Referring to FIG. 37, in this embodiment, the package preform 180 includes a first and second sheet assembly portions 110, 120 having flexible outer sheets 112, 122 that are non-continuous sheet of material. In this embodiment, the flexible outer sheets 112, 122 of the first and second sheet assembly portions 110, 120 are initially independent of one another and are joined to the gusset panel portion 105 and to each other in an additional assembly operation. Referring to FIG. 38, in this embodiment, the package preform 280 includes a first and second sheet assembly portions 110, 120, where the flexible outer sheets 112, 122 are a continuous sheet of material and where the flexible inner sheets 114, 124 are a continuous sheet of material. It should be understood that any configuration of the package preform 80, 180, 280 may be utilized to form the container without departing from the scope of this disclosure.

Figure 39:
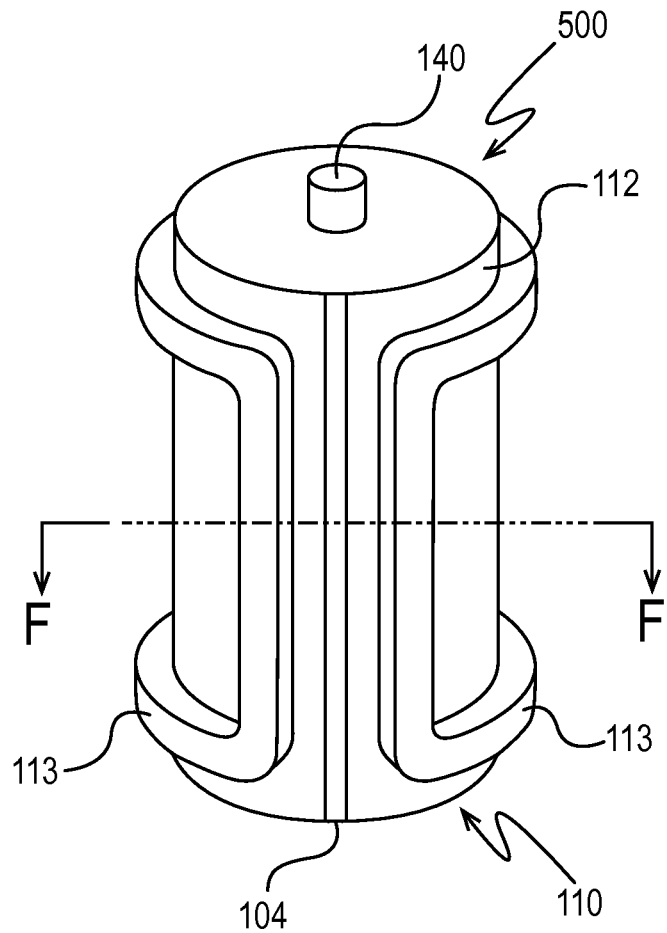
FIG. 39 schematically depicts a side perspective view of a film-based container according to one or more embodiments shown or described herein.
Figure 40:
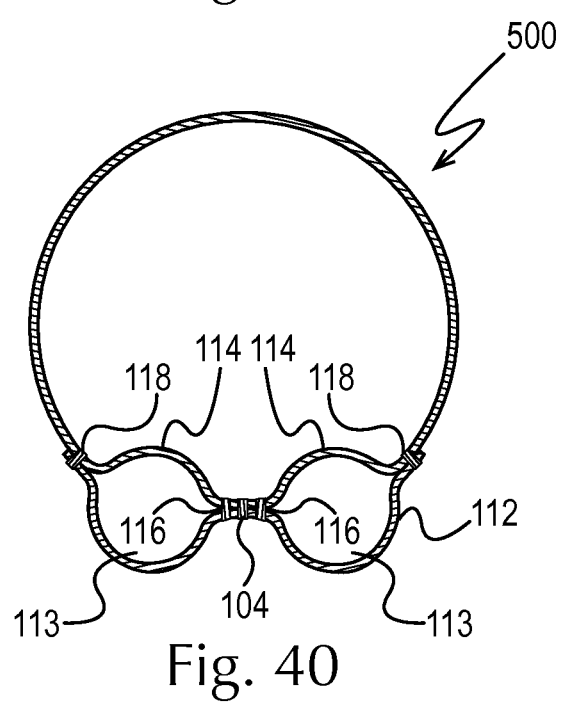
FIG. 40 schematically depicts a top sectional view of a film-based container according to one or more embodiments shown or described herein shown along line F-F of FIG. 39.

Referring now to FIGS. 39-40, another embodiment of the container 500 is depicted. In this embodiment, the container 500 has a generally cylindrical shape and is formed from a first sheet assembly 110 that is rolled onto itself to form the container 500. Referring to FIG. 40, the expanded chamber 113 is formed by the flexible inner and outer sheets 112, 114 that are separated from one another between the interior and exterior seams 118, 116. The flexible outer sheet 112 of the first sheet assembly 110 is joined onto itself at an enclosure seam 104 positioned along a side of the container 500 at a position between the expanded chamber 113.

Referring now to FIG. 41, another embodiment of the container 600 is depicted. In this embodiment, the container 600 includes a first, second, third, and fourth sheet assembly portions 110, 120, 330, 340 that are joined to one another to form the product receiving volume of the container 600. Referring now to FIG. 42, another embodiment of the container 700 is depicted. In this embodiment, the container 700 includes a first, second, third, fourth, and fifth sheet assembly portions 110, 120, 330, 340, 350 that are joined to one another to form the product receiving volume of the container 700.

Figure 43:
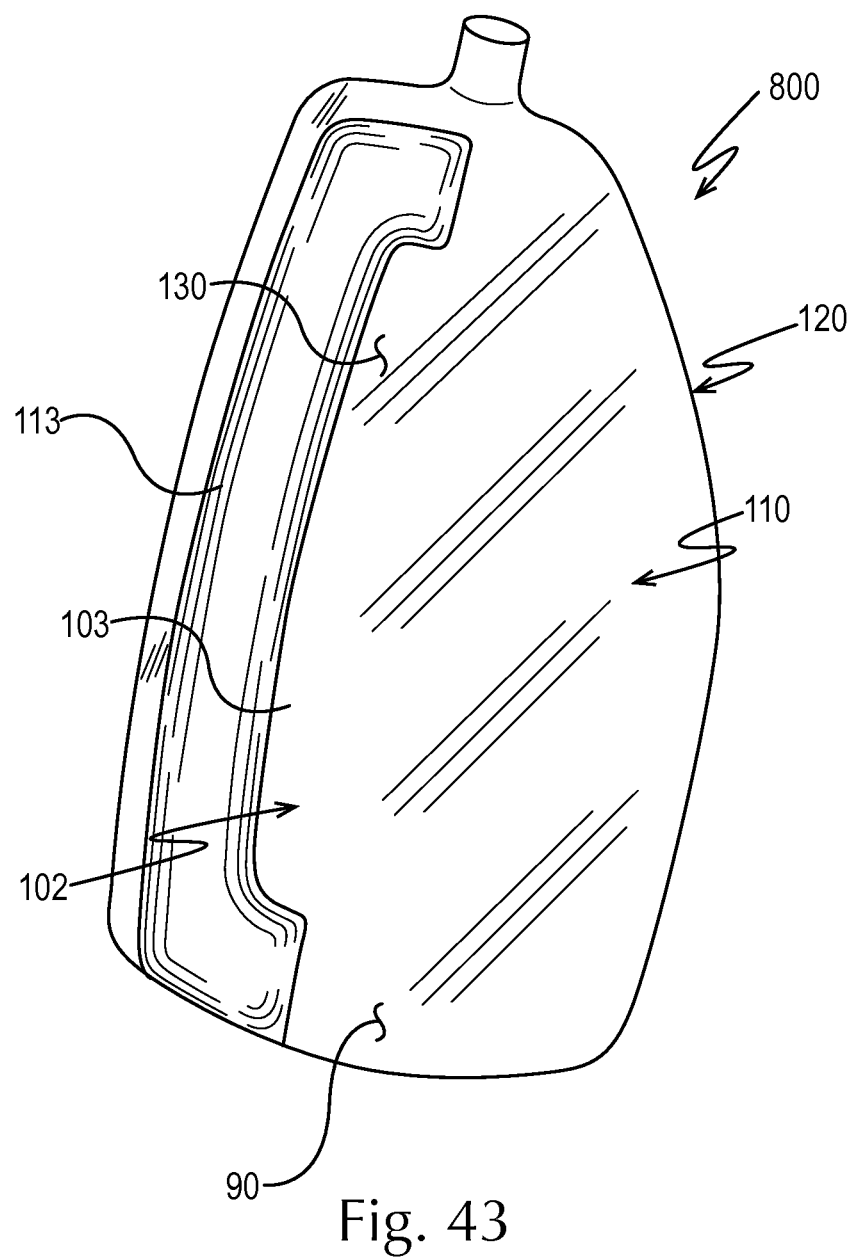
FIG. 43 schematically depicts a front view of a film-based container according to one or more embodiments shown or described herein.
Figure 44:
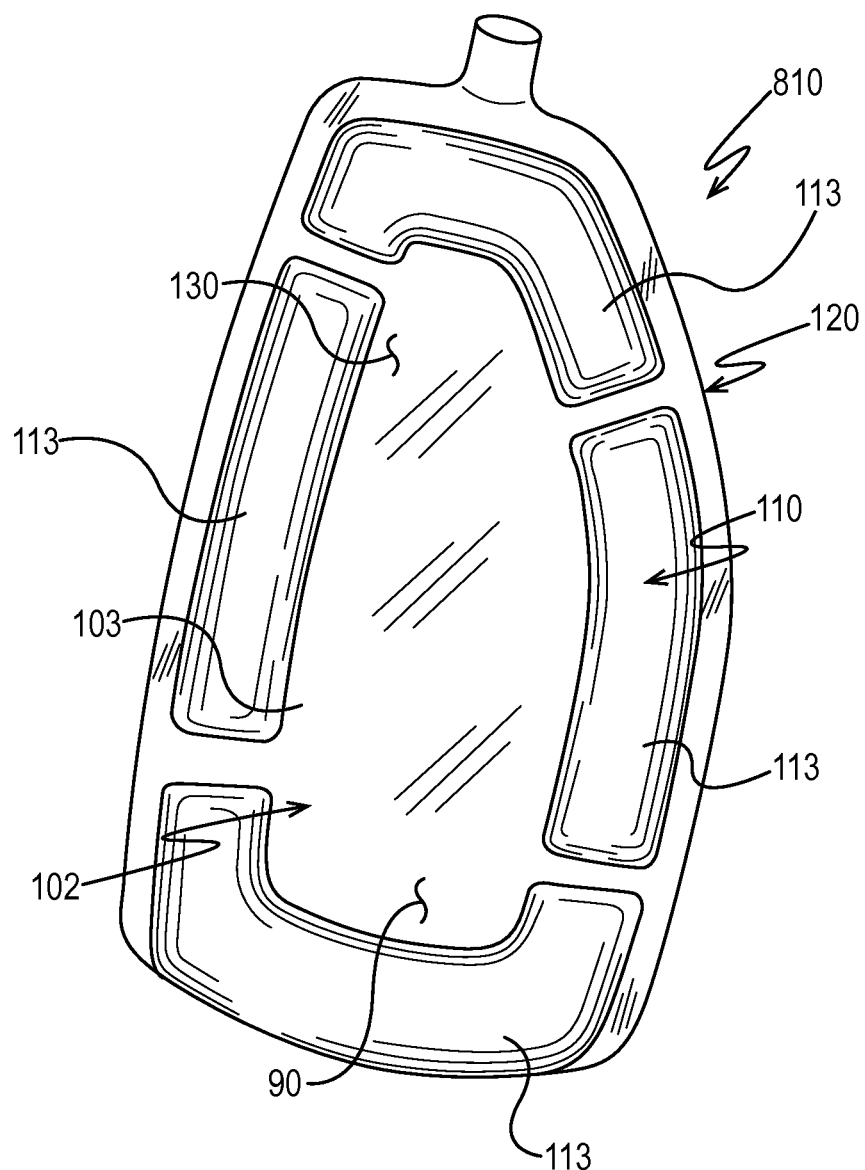
FIG. 44 schematically depicts a front view of a film-based container according to one or more embodiments shown or described herein.
Figure 45:
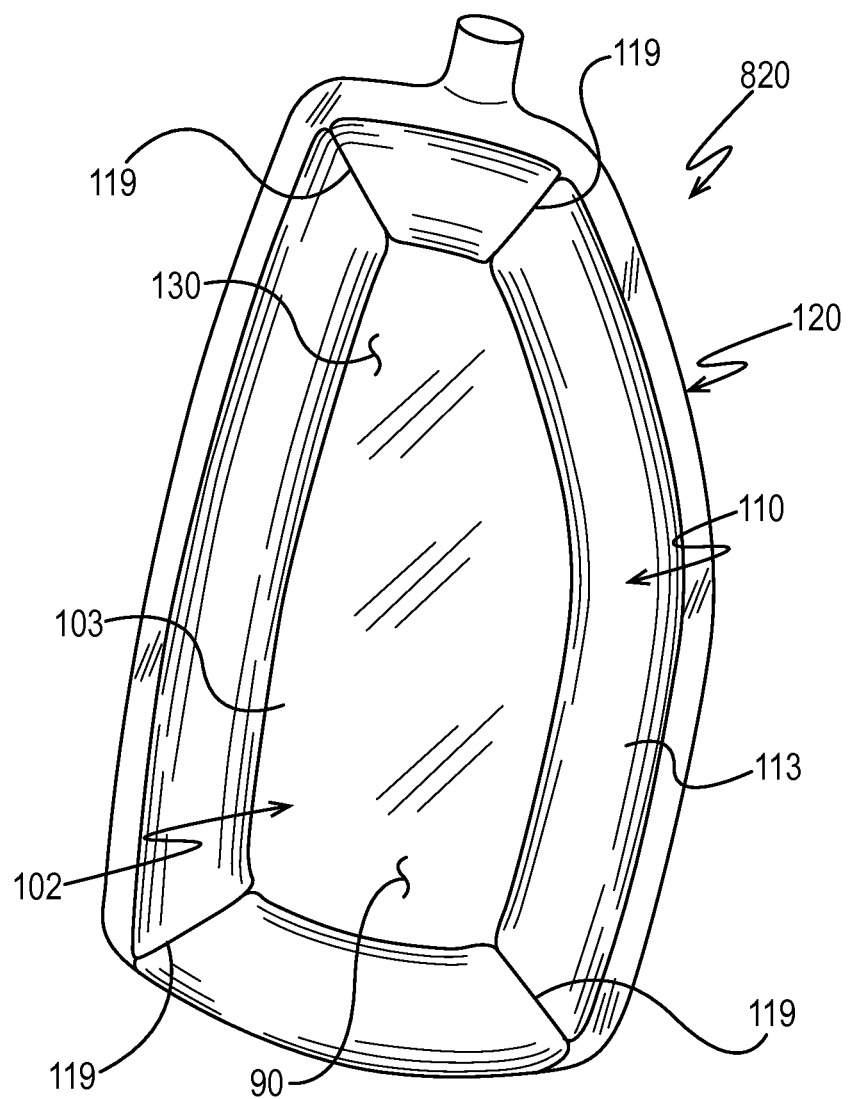
FIG. 45 schematically depicts a front view of a film-based container according to one or more embodiments shown or described herein.

Referring now to FIGS. 43-45, the expanded chamber 113 of the containers 800, 810, 820 may be segmented such that the expanded chamber 113 do not extend continuously around a periphery of the container 800, 810, 820. Referring now to FIG. 43, the embodiment of the container 800 includes the expanded chamber 113 that extends along only a portion of a side of the container 800. Referring now to FIG. 44, the embodiment of the container 810 includes a plurality of expanded chambers 113 that are positioned around the periphery of the container 810. The plurality of expanded chambers 113 are discontinuous around the interior panel 102, such that the plurality of expanded chambers 113 are spaced apart from one another along the first sheet assembly portion 110. Referring now to FIG. 45, this embodiment of the container 820 includes a plurality of intermediate seams 119 positioned along the expanded chamber 113, and extending between the interior and exterior seams 118, 116. The intermediate seams 119 may change the shape of the expanded chamber 113, as compared to embodiments of the container (i.e., the container 100 depicted in FIGS. 15-22) that exclude the intermediate seams 119.

Figure 34:
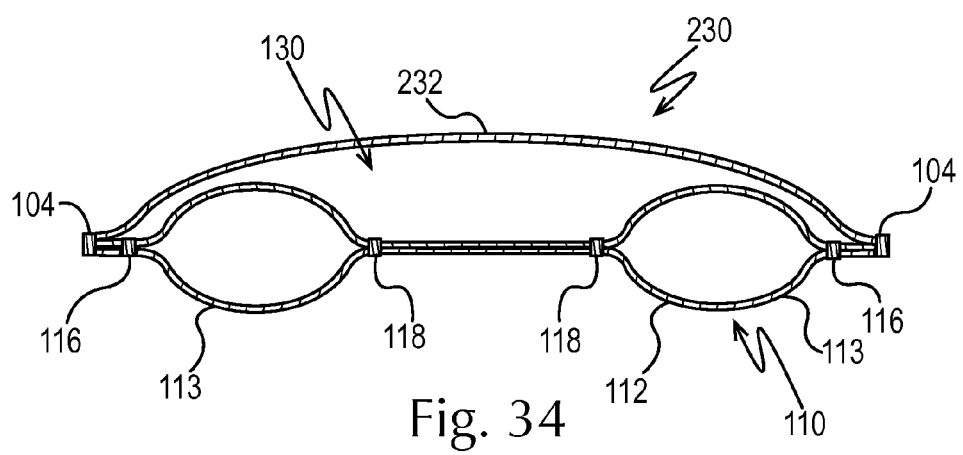
FIG. 34 schematically depicts a top sectional view of a film-based container according to one or more embodiments shown or described herein shown along line A-A of FIG. 18.

It should now be understood that features of any of the embodiments discussed herein may be incorporated into any of the containers 100, 200, 210, 220, 230, 300, 400, 410, 420, 500, 600, 700, 800, 810, 820 based on the requirements of a particular end-user application. For example, the single-wall panel of the container 220 depicted in FIG. 35 may be incorporated into at least one of the first, second, or third sheet assembly portions 110, 120, 310 of the embodiment of the container 300 depicted in FIGS. 34-35. It should further be understood that in certain embodiments, multiple chambers may be present in a sheet assembly. Further, in some embodiments, a single container may include multiple product volumes.

Containers according to the present disclosure may be manufactured according to a variety of methods. In one embodiment, the container depicted in FIGS. 15-22 was assembled according to the method described below. A first film (the flexible outer sheet 112, 122) and a second film (the flexible inner sheet 114, 124) were placed onto one another. A plurality of seams were formed by heat sealing. The seams formed by the heat sealing operation defined the expanded chambers 113, 124. To further define the expanded chambers 113, the heat seal die includes features that form seals about 0.325 inch thick arranged as follows: a first larger oval with a major axis of about 9 inches and a minor axis of about 4 inches; a second smaller oval inscribed within the first larger oval creating a separation of about 0.5 inch between the two ovals. The space between the two ovals will later be expanded to create the expanded chamber 113 in this embodiment.

Prior to heat sealing, a one-way film valve is placed between the first and second film such that the film valve spans across a location where the outer oval seam will be sealed, but not crossing the inner oval seam. One-way film valves are conventionally known and are described, for example, at U.S. Pat. Pub. No. 2006/0096068. The one-way film valve may include an ink or polymer material on at least a part of the film valve that enables the film valve to be sealed into the seams created by the heat seal die, but without sealing the film valve shut. With the one-way film valve positioned appropriately, the oval chambers were defined by the heat seal die.

The heat seal die was heated to a temperature of about 300° F., and the pressed into the first and second films at a pressure of 30 psi for 6 seconds to heat seal the two films together into a desired pattern, defining seams.

The first and second films were positioned relative to the heat seal die a second time to define a second expanded chamber 123. The second expanded chamber 123 was aligned with the first expanded chamber 113 and spaced about 3 inches away, evaluated from the bottom of the first expanded chamber 113 to the bottom of the second expanded chamber 123. Material of the first and second films between the expanded chambers 113, 123 is formed into the gusset panel portion 105 of the package 100.

After completion of the heat seal operation, the material of the first and second films was brought together and the material between the expanded chambers 113, 123 was folded inwards into a gusset. The sides of the first and second films were heat sealed together using a different heat seal die that has a profile to match the outer curve of the expanded chambers 113, 123.

With the container 100 formed into the general shape of the container, air was injected through the one-way film valves of the first and second expanded chambers 113, 123 to expand the chambers. Air was introduced at a pressure from about 15 psig to about 18 psig to fully expand the expanded chambers 113, 123 without risk of rupture of the first and second films by overpressure. With the container 100 formed, flowable product was introduced to the product receiving volume 130 of the container. A fitment was fitted to the container 100 to capture the flowable product within the container.

The method of manufacturing the container 100 may be modified to suit a variety of container 100 shapes and configurations, as well as films used to form the containers 100. As discussed hereinabove, in some embodiments, a minority of the exterior seam 116 formed in the heat seal operation remains un-joined that provides an opening for subsequent expansion of the expanded chambers 113, 123. As discussed hereinabove, in some embodiments, the expanded chambers 113, 123 may be bookmatched to one another prior to forming the enclosure seam 104. In some embodiments, the fold created between the first and second sheet assembly portions 110, 120 does not intersect the expanded chambers 113, 123. As discussed hereinabove, in some embodiments, the material of one or more of the flexible outer sheets 112, 122 and the flexible inner sheets 114, 124 positioned between the expanded chambers 113, 123 forms the gusset panel region 105 that is folded into a gusset in the container 100.

In some embodiments, a plurality of containers 100 may be formed from larger continuous sheets of material. In such embodiments, the containers 100 may be formed simultaneously. Excess material from the forming operation may be trimmed at a subsequent operation.

The above-listed industries, among others, may employ a variety of container forms that could may be constructed according to the present disclosure, including, for example and without limitation, bottles, tubes, tottles, cans, cartons, canisters, cartridges, flasks, vials, jug, tubs, tanks, jars, boxes, clamshell packaging, trays, blister packaging, and the like.

Part, parts, or all of any of the embodiments disclosed herein can be combined with part, parts, or all of other embodiments known in the art of flexible containers, including those described below.

Embodiments of the present disclosure can use any and all embodiments of materials, structures, and/or features for flexible containers, as well as any and all methods of making and/or using such flexible containers, as disclosed in the following US provisional patent applications: (1) application 61/643,813 filed May 7, 2012, entitled "Film Based Containers" (applicant's case 12464P); (2) application 61/643,823 filed May 7, 2012, entitled "Film Based Containers" (applicant's case 12465P); (3) application 61/676,042 filed Jul. 26, 2012, entitled "Film Based Container Having a Decoration Panel" (applicant's case 12559P); (4) application 61/727,961 filed Nov. 19, 2012, entitled "Containers Made from Flexible Material" (applicant's case 12559P2); (5) application 61/680,045 filed Aug. 6, 2012, entitled "Methods of Making Film Based Containers" (applicant's case 12579P); (6) application 61/780,039 filed Mar. 13, 2013, entitled "Flexible Containers with Multiple Product Volumes" (applicant's case 12785P); and (7) application filed Mar. 15, 2013, entitled "Flexible Materials for Flexible Containers" (applicant's case 12786P); each of which is hereby incorporated by reference.

Part, parts, or all of any of the embodiments disclosed herein also can be combined with part, parts, or all of other embodiments known in the art of containers for fluent products, so long as those embodiments can be applied to flexible containers, as disclosed herein. For example, in various embodiments, a flexible container can include a vertically oriented transparent strip, disposed on a portion of the container that overlays the product volume, and configured to show the level of the fluent product in the product volume.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or patent publication, is hereby incorporated herein by reference in its entirety unless expressly excluded or otherwise limited. The citation of any document is not an admission that it is prior art with respect to any document disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A non-durable self-supporting flexible container that has a top, a bottom comprising a base, a front, a back, and sides, said container comprising:
    a product volume, which is an enclosable three-dimensional space that directly contains one or more fluent products, said product volume having sides;
    an expanded structural support volume, which is a fillable space made from one or more flexible materials and is filled with one or more gases at a pressure greater than atmospheric pressure, wherein the one or more gases create tension in the one or more flexible materials;
    a sheet assembly portion having a flexible outer sheet and a flexible inner sheet, which is locally joined to the flexible outer sheet, to form:
        at least a portion of the structural support volume;
        a multi-wall panel, wherein:
            the multi-wall panel is bounded by seams that join the flexible inner sheet to the flexible outer sheet, wherein at least a portion of said seams overlie the product volume and are located inward of the sides of the product volume;
            the flexible inner sheet and the flexible outer sheet are in overlapping contact with each other between the seams, along substantially all of the multi-wall panel; and
            the multi-wall panel overlays the product volume; and
    at least a portion of the product volume.

2. The flexible container of claim 1, wherein the flexible outer sheet and the flexible inner sheet are independent from one another along the multi-wall panel.

3. The flexible container of claim 1, wherein the multi-wall panel is at least partially bounded by the structural support volume.

4. A non-durable self-supporting flexible container comprising:
    a product volume, which is an enclosable three-dimensional space that directly contains one or more fluent products;
    an expanded structural support volume, which is a fillable space made from one or more flexible materials and is filled with one or more gases at a pressure greater than atmospheric pressure, wherein the one or more gases create tension in the one or more flexible materials;
    a sheet assembly portion having a flexible outer sheet and a flexible inner sheet, which is locally joined to the flexible outer sheet, to form:
        at least a portion of the structural support volume;
        a multi-wall panel, wherein:
            the multi-wall panel is bounded by seams that join the flexible inner sheet to the flexible outer sheet;
            the flexible inner sheet and the flexible outer sheet are in overlapping contact with each other between the seams, along substantially all of the multi-wall panel; and
            the multi-wall panel overlays the product volume; and
    at least a portion of the product volume, wherein the multi-wall panel is fully bounded by the structural support volume.

5. The flexible container of claim 1, wherein the sheet assembly portion forms all of the structural support volume.

6. The flexible container of claim 1, wherein:
    the sheet assembly portion is a first sheet assembly portion;
    the flexible container includes a second sheet assembly portion, which is joined to the first sheet assembly portion, to form at least a portion of the product volume.

7. The flexible container of claim 6, wherein the first sheet assembly portion and the second sheet assembly portion together define the entire product volume.

8. The flexible container of claim 1, wherein:
    the sheet assembly portion is a first sheet assembly portion;
    the flexible container includes a second sheet assembly portion having a flexible inner sheet; and
    the flexible inner sheets are continuous.

9. The flexible container of claim 8, wherein:
    the second sheet assembly portion having a flexible outer sheet; and
    the flexible outer sheets are continuous.

10. The flexible container of claim 1, wherein:
    the sheet assembly portion is a first sheet assembly portion;
    the structural support volume is a first structural support volume;
    the multi-wall panel is a first multi-wall panel;
    the flexible container includes a second structural support volume; and
    the flexible container includes a second sheet assembly portion having a flexible outer sheet and a flexible inner sheet, which is locally joined to the flexible outer sheet, to form:

at least a portion of the second structural support volume;

a second multi-wall panel; and at least a portion of the product volume.

11. The flexible container of claim 10, wherein the first structural support volume contacts the second structural support volume.

12. The flexible container of claim 11, wherein the first structural support volume contacts the second structural support volume inside of the product volume.

13. The flexible container of claim 1, further comprising a structural support frame, which includes the structural support volume, wherein the structural support frame is configured to support the product volume.

14. The flexible container of claim 1, further comprising a dispenser in fluid communication with the product volume for dispensing a fluent product from the product volume.

15. The flexible container of claim 1, wherein the multi-wall panel is relatively flat.

16. The flexible container of claim 1 wherein the container has a height, and when a cross-sectional view of the container at approximately mid-height is shown, the expanded structural support volume appears to form four chambers that are disposed around said product volume.

17. A non-durable self-supporting stand up flexible container that has a top, a bottom comprising a base, a front, a back, sides, and an overall height, said container comprising:

a product volume, which is an enclosable three-dimensional space that directly contains one or more fluent products;

an expanded structural support volume, which is a fillable space made from one or more flexible materials and is filled with one or more gases at a pressure greater than atmospheric pressure, wherein the one or more gases create tension in the one or more flexible materials;

a sheet assembly portion having a flexible outer sheet and a flexible inner sheet, which is locally joined to the flexible outer sheet, to form:

at least a portion of the structural support volume;

a multi-wall panel, wherein:

the multi-wall panel is bounded by seams that join the flexible inner sheet to the flexible outer sheet;

the flexible inner sheet and the flexible outer sheet are in overlapping contact with each other between the seams, along substantially all of the multi-wall panel; and the multi-wall panel overlays the product volume; and at least a portion of the product volume, wherein when the base of said container is resting on a horizontal support surface, the container has its largest overall height.

18. The flexible container of claim 1, which is a disposable container.

* * * * *